United States Patent
Turner et al.

(10) Patent No.: US 9,953,196 B2
(45) Date of Patent: Apr. 24, 2018

(54) SYSTEM, APPARATUS AND METHODS FOR VARIABLE RATE ULTRA-WIDEBAND COMMUNICATIONS

(71) Applicant: ZIH Corp., Lincolnshire, IL (US)

(72) Inventors: Belinda Turner, Germantown, MD (US); Aitan Ameti, Rockville, MD (US); Edward A. Richley, Gaithersburg, MD (US); Alexander Mueggenborg, Arlington, VA (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 15/397,504

(22) Filed: Jan. 3, 2017

(65) Prior Publication Data

US 2017/0161530 A1 Jun. 8, 2017

Related U.S. Application Data

(63) Continuation of application No. 14/731,210, filed on Jun. 4, 2015.
(Continued)

(51) Int. Cl.
*G06K 7/10* (2006.01)
*H04W 4/00* (2018.01)
(Continued)

(52) U.S. Cl.
CPC ........ *G06K 7/10306* (2013.01); *G01S 5/0226* (2013.01); *G01S 5/14* (2013.01);
(Continued)

(58) Field of Classification Search
CPC ............ G06K 9/00335; G06K 7/10306; G01S 5/0226; G01S 5/14; H04W 4/008; H04W 4/026; H04W 4/027
See application file for complete search history.

(56) References Cited

U.S. PATENT DOCUMENTS 3,732,500 A 5/1973 Dishal et al.
4,270,145 A 5/1981 Farina
(Continued)

FOREIGN PATENT DOCUMENTS

EP 1235077 A2 8/2002
EP 1241616 A2 9/2002
(Continued)

OTHER PUBLICATIONS

International Search Report and Written opinion from International Application No. PCT/US2014/040881 dated Nov. 4, 2014.
(Continued)

*Primary Examiner* — Curtis Odom

(57) ABSTRACT

Systems, methods, apparatuses, and computer readable media are disclosed for providing variable blink rate ultra-wideband (UWB) communications. Some embodiments may provide for a radio frequency (RF) tag including a motion sensor, processing circuitry, and a UWB transmitter. The motion sensor may be configured to generate one or more motion data values indicating motion of the RF tag. The UWB transmitter may be configured to transmit blink data at variable blink rates. The processing circuitry may be configured to receive the one or more motion data values from the motion sensor, determine a blink rate for the UWB transmitter based on the one or more motion data values, and control the UWB transmitter to wirelessly transmit the blink data at the blink rate. In some embodiments, the RF tag may include a UWB receiver and the blink rate may be controlled remotely by a system.

20 Claims, 19 Drawing Sheets

Related U.S. Application Data

(60) Provisional application No. 62/008,270, filed on Jun. 5, 2014.

(51) Int. Cl.
*H04W 4/02* (2018.01)
*G01S 5/14* (2006.01)
*G01S 5/02* (2010.01)

(52) U.S. Cl.
CPC .......... *H04W 4/008* (2013.01); *H04W 4/026* (2013.01); *H04W 4/027* (2013.01)

(56) References Cited

U.S. PATENT DOCUMENTS

| | | |
|---|---|---|
| 5,046,133 A | 9/1991 | Watanabe et al. |
| 5,119,104 A | 6/1992 | Heller |
| 5,469,409 A | 11/1995 | Anderson et al. |
| 5,513,854 A | 5/1996 | Daver |
| 5,645,077 A | 7/1997 | Foxlin |
| 5,699,244 A | 12/1997 | Clark et al. |
| 5,901,172 A | 5/1999 | Fontana et al. |
| 5,920,287 A | 7/1999 | Belcher et al. |
| 5,930,741 A | 7/1999 | Kramer |
| 5,995,046 A | 11/1999 | Belcher et al. |
| 6,028,626 A | 2/2000 | Aviv |
| 6,121,926 A | 9/2000 | Belcher et al. |
| 6,176,837 B1 | 1/2001 | Foxlin |
| 6,204,813 B1 | 3/2001 | Wadell et al. |
| 6,366,242 B1 | 4/2002 | Boyd et al. |
| 6,380,894 B1 | 4/2002 | Boyd et al. |
| 6,593,885 B2 | 7/2003 | Wisherd et al. |
| 6,655,582 B2 | 12/2003 | Wohl et al. |
| 6,710,713 B1 | 3/2004 | Russo |
| 6,812,884 B2 | 11/2004 | Richley et al. |
| 6,836,744 B1 | 12/2004 | Asphahani et al. |
| 6,882,315 B2 | 4/2005 | Richley et al. |
| 7,009,638 B2 | 3/2006 | Gruber et al. |
| 7,190,271 B2 | 3/2007 | Boyd et al. |
| 7,263,133 B1 | 8/2007 | Miao |
| 7,667,604 B2 | 2/2010 | Ebert et al. |
| 7,671,802 B2 | 3/2010 | Walsh et al. |
| 7,710,322 B1 | 5/2010 | Ameti et al. |
| 7,739,076 B1 | 6/2010 | Vock et al. |
| 7,755,541 B2 | 7/2010 | Wisherd et al. |
| 7,899,006 B2 | 3/2011 | Boyd |
| 7,969,348 B2 | 6/2011 | Baker et al. |
| 8,009,727 B2 | 8/2011 | Hui et al. |
| 8,023,917 B2 | 9/2011 | Popescu |
| 8,077,981 B2 | 12/2011 | Elangovan et al. |
| 8,269,835 B2 | 9/2012 | Grigsby |
| 8,279,051 B2 | 10/2012 | Khan |
| 8,289,185 B2 | 10/2012 | Alonso |
| 8,457,392 B2 | 6/2013 | Cavallaro et al. |
| 8,477,046 B2 | 7/2013 | Alonso |
| 8,568,278 B2 | 10/2013 | Riley et al. |
| 8,665,152 B1 | 3/2014 | Kling et al. |
| 8,696,458 B2 | 4/2014 | Foxlin et al. |
| 8,705,671 B2 | 4/2014 | Ameti et al. |
| 8,775,916 B2 | 7/2014 | Pulsipher et al. |
| 8,780,204 B2 | 7/2014 | DeAngelis et al. |
| 8,795,045 B2 | 8/2014 | Sorrells et al. |
| 8,842,002 B2 | 9/2014 | Rado |
| 8,989,880 B2 | 3/2015 | Wohl et al. |
| 9,081,076 B2 | 7/2015 | DeAngelis et al. |
| 9,185,361 B2 | 11/2015 | Curry |
| 9,381,645 B1 | 7/2016 | Yarlagadda et al. |
| 9,531,415 B2 | 12/2016 | Stelfox et al. |
| 2001/0010541 A1 | 8/2001 | Fernandez et al. |
| 2001/0030625 A1 | 10/2001 | Doles et al. |
| 2002/0004398 A1 | 1/2002 | Ogino et al. |
| 2002/0041284 A1 | 4/2002 | Konishi et al. |
| 2002/0114493 A1 | 8/2002 | McNitt et al. |
| 2002/0116147 A1 | 8/2002 | Vock et al. |
| 2002/0130835 A1 | 9/2002 | Brosnan |
| 2002/0135479 A1 | 9/2002 | Belcher et al. |
| 2003/0090387 A1 | 5/2003 | Lestienne et al. |
| 2003/0095186 A1 | 5/2003 | Aman et al. |
| 2003/0128100 A1 | 7/2003 | Burkhardt et al. |
| 2003/0163287 A1 | 8/2003 | Vock et al. |
| 2003/0227453 A1 | 12/2003 | Beier et al. |
| 2004/0022227 A1 | 2/2004 | Lynch et al. |
| 2004/0062216 A1 | 4/2004 | Nicholls et al. |
| 2004/0108954 A1 | 6/2004 | Richley et al. |
| 2004/0178960 A1 | 9/2004 | Sun |
| 2004/0189521 A1 | 9/2004 | Smith et al. |
| 2004/0249969 A1 | 12/2004 | Price |
| 2004/0260470 A1 | 12/2004 | Rast |
| 2004/0260828 A1 | 12/2004 | Price |
| 2005/0026563 A1 | 2/2005 | Leeper et al. |
| 2005/0031043 A1 | 2/2005 | Paquelet |
| 2005/0059998 A1 | 3/2005 | Norte et al. |
| 2005/0073418 A1 | 4/2005 | Kelliher et al. |
| 2005/0075079 A1 | 4/2005 | Jei et al. |
| 2005/0093976 A1 | 5/2005 | Valleriano |
| 2005/0148281 A1 | 7/2005 | Sanchez-Castro et al. |
| 2005/0207617 A1 | 9/2005 | Sarnoff |
| 2006/0067324 A1 | 3/2006 | Kim |
| 2006/0139167 A1 | 6/2006 | Davie et al. |
| 2006/0164213 A1 | 7/2006 | Burghard et al. |
| 2006/0252476 A1 | 11/2006 | Bahou |
| 2006/0264730 A1 | 11/2006 | Stivoric et al. |
| 2006/0271912 A1 | 11/2006 | Mickle et al. |
| 2006/0281061 A1 | 12/2006 | Hightower et al. |
| 2007/0091292 A1 | 4/2007 | Cho et al. |
| 2007/0176749 A1 | 8/2007 | Boyd et al. |
| 2007/0296723 A1 | 12/2007 | Williams |
| 2008/0065684 A1 | 3/2008 | Zilberman |
| 2008/0106381 A1 | 5/2008 | Adamec et al. |
| 2008/0113787 A1 | 5/2008 | Alderucci |
| 2008/0129825 A1 | 6/2008 | DeAngelis et al. |
| 2008/0140233 A1 | 6/2008 | Seacat |
| 2008/0182724 A1 | 7/2008 | Guthrie |
| 2008/0186231 A1 | 8/2008 | Aljadeff et al. |
| 2008/0204248 A1 | 8/2008 | Winget et al. |
| 2008/0262885 A1 | 10/2008 | Jain et al. |
| 2008/0266131 A1 | 10/2008 | Richardson et al. |
| 2008/0269016 A1 | 10/2008 | Ungari et al. |
| 2008/0281443 A1 | 11/2008 | Rogers |
| 2008/0285805 A1 | 11/2008 | Luinge et al. |
| 2008/0291024 A1 | 11/2008 | Zhang et al. |
| 2009/0048044 A1 | 2/2009 | Oleson et al. |
| 2009/0141736 A1 | 6/2009 | Becker |
| 2009/0210078 A1 | 8/2009 | Crowley |
| 2009/0231198 A1 | 9/2009 | Walsh et al. |
| 2010/0026809 A1 | 2/2010 | Curry |
| 2010/0045508 A1 | 2/2010 | Ekbal et al. |
| 2010/0054304 A1 | 3/2010 | Barnes et al. |
| 2010/0060452 A1 | 3/2010 | Schuster et al. |
| 2010/0117837 A1 | 5/2010 | Stirling et al. |
| 2010/0150117 A1 | 6/2010 | Aweya et al. |
| 2010/0174506 A1 | 7/2010 | Joseph et al. |
| 2010/0228314 A1 | 9/2010 | Goetz |
| 2010/0250305 A1 | 9/2010 | Lee et al. |
| 2010/0278386 A1 | 11/2010 | Hoeflinger |
| 2010/0283630 A1 | 11/2010 | Alonso |
| 2010/0328073 A1 | 12/2010 | Nikitin et al. |
| 2011/0002223 A1 | 1/2011 | Gross |
| 2011/0025847 A1 | 2/2011 | Park et al. |
| 2011/0054782 A1 | 3/2011 | Kaahui et al. |
| 2011/0063114 A1 | 3/2011 | Ikoyan |
| 2011/0064023 A1 | 3/2011 | Yamamoto et al. |
| 2011/0084806 A1 | 4/2011 | Perkins et al. |
| 2011/0134240 A1 | 6/2011 | Anderson et al. |
| 2011/0140970 A1 | 6/2011 | Fukagawa et al. |
| 2011/0159939 A1 | 6/2011 | Heinrich et al. |
| 2011/0169959 A1 | 7/2011 | DeAngelis et al. |
| 2011/0188513 A1 | 8/2011 | Christoffersson et al. |
| 2011/0195701 A1 | 8/2011 | Cook et al. |
| 2011/0261195 A1 | 10/2011 | Martin et al. |
| 2011/0300905 A1 | 12/2011 | Levi |
| 2011/0320322 A1 | 12/2011 | Roslak et al. |
| 2012/0014278 A1 | 1/2012 | Ameti et al. |
| 2012/0015665 A1 | 1/2012 | Farley et al. |

(56) References Cited

U.S. PATENT DOCUMENTS

| | | |
|---|---|---|
| 2012/0024516 A1 | 2/2012 | Bhadurt et al. |
| 2012/0042326 A1 | 2/2012 | Jain et al. |
| 2012/0057634 A1 | 3/2012 | Shi et al. |
| 2012/0057640 A1 | 3/2012 | Shi et al. |
| 2012/0065483 A1 | 3/2012 | Chung et al. |
| 2012/0081531 A1 | 4/2012 | DeAngelis et al. |
| 2012/0112904 A1 | 5/2012 | Nagy et al. |
| 2012/0126973 A1 | 5/2012 | DeAngelis et al. |
| 2012/0139708 A1 | 6/2012 | Paradiso et al. |
| 2012/0184878 A1 | 7/2012 | Najafi et al. |
| 2012/0212505 A1 | 8/2012 | Burroughs et al. |
| 2012/0218301 A1 | 8/2012 | Miller |
| 2012/0225676 A1 | 9/2012 | Boyd et al. |
| 2012/0231739 A1 | 9/2012 | Chen et al. |
| 2012/0246795 A1 | 10/2012 | Scheffler et al. |
| 2012/0256745 A1 | 10/2012 | Plett et al. |
| 2012/0268239 A1 | 10/2012 | Ljung et al. |
| 2013/0003860 A1 | 1/2013 | Sasai et al. |
| 2013/0021142 A1 | 1/2013 | Matsui et al. |
| 2013/0021206 A1 | 1/2013 | Hach et al. |
| 2013/0040574 A1 | 2/2013 | Hillyard |
| 2013/0041590 A1 | 2/2013 | Burich et al. |
| 2013/0041775 A1 | 2/2013 | Rosenberg |
| 2013/0066448 A1 | 3/2013 | Alonso |
| 2013/0076645 A1 | 3/2013 | Anantha et al. |
| 2013/0096704 A1 | 4/2013 | Case |
| 2013/0115904 A1 | 5/2013 | Kapoor et al. |
| 2013/0138386 A1 | 5/2013 | Jain et al. |
| 2013/0138518 A1 | 5/2013 | White et al. |
| 2013/0142384 A1 | 6/2013 | Ofek |
| 2013/0257598 A1 | 10/2013 | Kawaguchi et al. |
| 2013/0268185 A1 | 10/2013 | Rabbath et al. |
| 2013/0339156 A1 | 12/2013 | Sanjay et al. |
| 2014/0038544 A1 | 2/2014 | Jones et al. |
| 2014/0055588 A1 | 2/2014 | Bangera et al. |
| 2014/0062728 A1* | 3/2014 | Soto .................. G01S 7/415 340/937 |
| 2014/0145828 A1 | 5/2014 | Bassan-Eskenazi |
| 2014/0156036 A1 | 6/2014 | Huang |
| 2014/0170607 A1 | 6/2014 | Hsiao et al. |
| 2014/0221137 A1 | 8/2014 | Krysiak et al. |
| 2014/0320660 A1 | 10/2014 | DeAngelis et al. |
| 2014/0361875 A1 | 12/2014 | O'Hagan et al. |
| 2014/0361906 A1 | 12/2014 | Hughes et al. |
| 2014/0361909 A1 | 12/2014 | Stelfox et al. |
| 2014/0364141 A1 | 12/2014 | O'Hagan et al. |
| 2014/0365194 A1 | 12/2014 | O'Hagan et al. |
| 2014/0365415 A1 | 12/2014 | Stelfox et al. |
| 2015/0002272 A1 | 1/2015 | Alonso et al. |
| 2015/0057981 A1 | 2/2015 | Gross |
| 2015/0085111 A1 | 3/2015 | Lavery |
| 2015/0097653 A1 | 4/2015 | Gibbs et al. |
| 2015/0148129 A1 | 5/2015 | Austerlade et al. |
| 2015/0355311 A1 | 12/2015 | O'Hagan et al. |
| 2015/0358852 A1 | 12/2015 | Richley et al. |
| 2015/0360133 A1 | 12/2015 | MacCallum et al. |
| 2015/0375041 A1 | 12/2015 | Richley et al. |
| 2015/0375083 A1 | 12/2015 | Stelfox et al. |
| 2015/0378002 A1 | 12/2015 | Hughes et al. |
| 2015/0379387 A1 | 12/2015 | Richley |
| 2016/0059075 A1 | 3/2016 | Molyneux et al. |
| 2016/0097837 A1 | 4/2016 | Richley et al. |
| 2016/0361595 A1 | 12/2016 | O'Hagan et al. |
| 2017/0056721 A1 | 3/2017 | Stelfox et al. |

FOREIGN PATENT DOCUMENTS

| | | |
|---|---|---|
| EP | 1253438 A2 | 10/2002 |
| EP | 1503513 A1 | 2/2005 |
| EP | 2474939 A1 | 11/2012 |
| WO | 98/05977 A1 | 2/1998 |
| WO | 99/61936 A1 | 12/1999 |
| WO | 01/08417 A1 | 2/2001 |
| WO | 2006/022548 A1 | 3/2006 |
| WO | 2010/083943 A1 | 7/2010 |
| WO | 2015/051813 A1 | 4/2014 |
| WO | 2014/197600 A1 | 12/2014 |

OTHER PUBLICATIONS

International Search Report and Written opinion from International Application No. PCT/US2014/040940 dated Dec. 17, 2014.

Complaint before the United States District Court of Massachusetts, Civil Action No. 1:15-cv-12297, *Lynx System Developers, Inc. et al.* V. *Zebra Enterprise Solutions Corporation et al.*, filed Jun. 10, 2015.

International Search Report and Written Opinion from International Application No. PCT/US2014/041062 dated Oct. 1, 2014.

International Search Report and Written Opinion from International Application No. PCT/US2014/040947 dated Oct. 9, 2014.

Fontana, R.J., Richley, E., Barney, J., "Commercialization of an Ultra Wideband Precision Assest Location System", 2003 IEEE Conference on Ultra Wideband Systems and Technologies, Nov. 16-19, 2003.

Guéziec, A., "Tracking Pitches for Broadcast Television," Computer, Mar. 2002, pp. 38-43 <http://www.trianglesoftware.com/pitch_tracking.htm>.

CattleLog Pro, eMerge Interactive, Inc., Sebastian, FL, 2004.

Marchant, J., "Secure Animal Indentification and Source Verification", JM Communications, UK, 2002.

"A guide to Using NLIS Approved Ear Tags and Rumen Boluses", National Livestock Identification Scheme, Meat & Livestock Australia Limited, North Sydney, Australia, May 2003.

King L., "NAIS Cattle ID Pilot Projects Not Needed, Since Proven Advanced Technology Already Exists", ScoringSystem, Inc., Sarasota, FL, Dec. 27, 2005. (www.prweb.com/releases2005/12prweb325888.htm).

"RFID in the Australian Meat and Livestock Industry", Alffiex Australia Pty Ltd., Capalaba, QLD (AU), Data Capture Suppliers Guide, 2003-2004.

Swedberg, Claire, "USDA Reseachers Develop System to Track Livestock Feeding Behavior Unobtrusively", RFID Journal, Jul. 18, 2013.

Invitation to Pay Additional Fees/Partial International Search Report for PCT/IB2015/054099 dated Oct. 6, 2015.

Swedberg, C., "N.J. Company Seeks to Market Passive Sensor RFID Tags," RFID Journal, Jun. 14, 2011, pp. 1-2 <http://www.rfidjournal.com/articles/pdf?8527>.

International Search Report and Written Opinion for International Application No. PCT/IB2015/054099 dated Dec. 9, 2015.

U.S. Appl. No. 14/296,703, filed Jun. 5, 2014; In re: Alonso et al., entitled Method and Apparatus for Associating Radio Frequency Identification Tags with Participants.

U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects."

International Search Report and Written Opinion for International Application No. PCT/IB2015/059264 dated Feb. 10, 2016.

Jinyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.

International Search Report and Written Opinion for International Application No. PCT/US2015/034267 dated Sep. 25, 2015.

International Search Report and Written Opinion for International Application No. PCT/IB2015/054103 dated Aug. 14, 2015.

Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484.

International Search Report and Written Opinion for International Application No. PCT/IB2015/054213 dated Aug. 6, 2015.

Wang, Y. et al., "An Algorithmic and Systematic Approach from Improving Robustness of TOA-Based Localization", 2013 IEEE 10th International Conference on High Performance Computing and Communications & 2013 IEEE, Nov. 2013, pp. 2066-2073.

(56) References Cited

OTHER PUBLICATIONS

Guvenc, I. et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.

International Search Report and Written Opinion for International Application PCT/IB2015/054102 dated Nov. 4, 2015.

"Seattleite wins top prize in Microsoft's Super Bowl tech Contest", San Francisco AP, Komonews.com, Feb. 5, 2016. <http://komonews.com/news/local/seattleite-wins-top-prize-in-microsofts-super-bowl-tech-contest>.

Bahle et al., "I See You: How to Improve Wearable Activity Recognition by Leveraging Information from Environmental Cameras," Pervasive Computing and Communications Workshops, IEEE International Conference, (Mar. 18-22, 2013).

Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).

Complaint before the United States District Court of Massachusetts, Civil Action No. 1:15-cv-12297, *Lynx System Developers, Inc. et al.* V. *Zebra Enterprise Solutions Corporation et al.*, filed Mar. 23, 2016.

Defendant's Answer to Complaint before the United States District Court of Massachusetts, Civil Action No. 1:15-cv-12297, *Lynx System Developers, Inc. et al.* V. *Zebra Enterprise Solutions Corporation et al.*, filed Apr. 6, 2016.

International Search Report and Written Opinion for International Application No. PCT/US2014/053647 dated Dec. 19, 2014.

International Search Report and Written Opinion for International Application No. PCT/US2016/035614 dated Sep. 15, 2016.

Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.

European Search Report for European Patent Application No. 14806811.7 dated Dec. 1, 2016.

\* cited by examiner

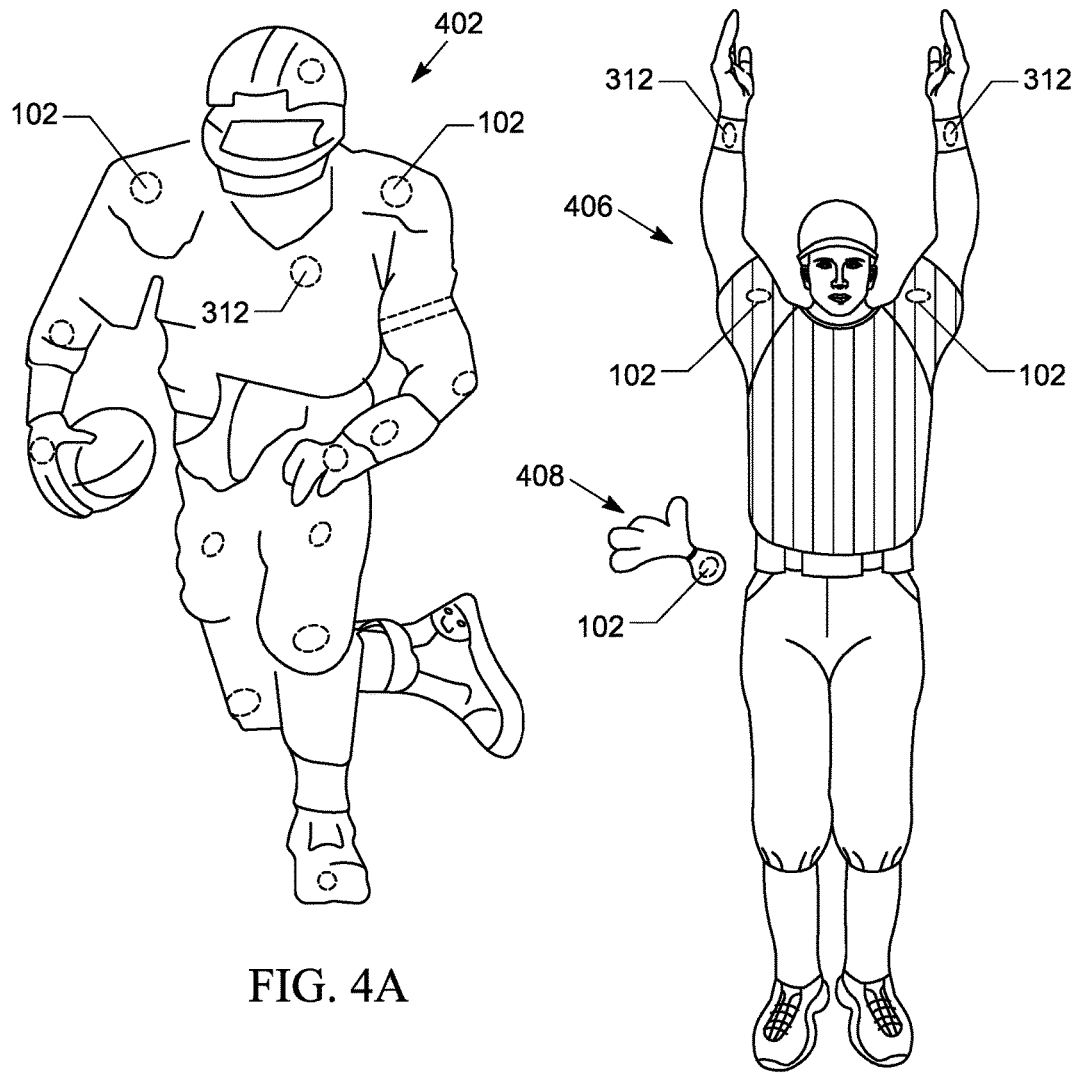
FIG. 4A
FIG. 4B
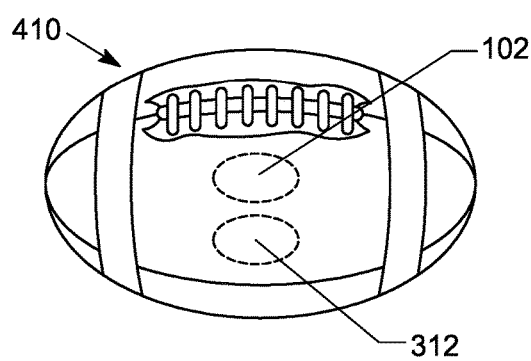
FIG. 4C

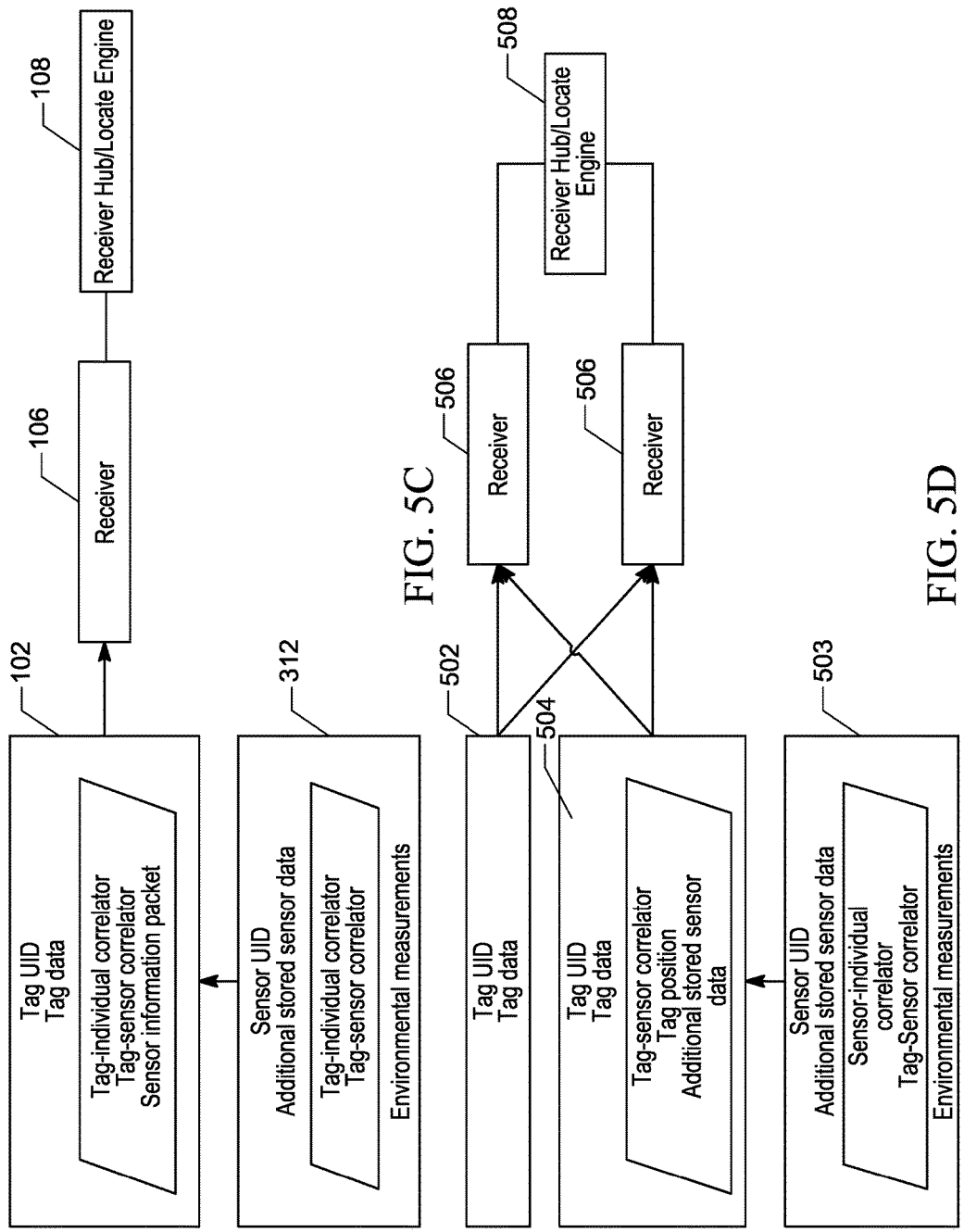

SYSTEM, APPARATUS AND METHODS FOR VARIABLE RATE ULTRA-WIDEBAND COMMUNICATIONS

CROSS-REFERENCE TO RELATED APPLICATIONS

This application is a continuation of U.S. patent application Ser. No. 14/731,210, filed on Jun. 4, 2015, and claims the benefit of U.S. Provisional Patent Application No. 62/008,270, titled "Systems, Apparatus And Methods For Variable Rate Ultra-Wideband Communications," filed Jun. 5, 2014, which are incorporated by reference herein in their entirety.

FIELD

Embodiments discussed herein are related to radio frequency (RF) communication and, more particularly, to systems, methods, apparatuses, computer readable media and other means for providing RF tags capable of providing ultra-wideband transmissions.

BACKGROUND

Ultra-wideband (UWB) is a radio technology that employs high-bandwidth communications using a large portion of the radio spectrum (e.g., bandwidths greater than 400 MHz). Notwithstanding the high bandwidths, UWB communications are capped by a channel capacity that defines a theoretical maximum possible number of bits per second of information that may be conveyed through one or more links in an area. As such, channel capacity may limit the number of UWB devices that can concurrently communicate within a particular area. In this regard, areas for improving current techniques have been identified.

BRIEF SUMMARY

Through applied effort, ingenuity, and innovation, solutions have been realized and are described herein. In particular, systems, methods, apparatuses, and computer readable media for variable rate UWB communications are described herein. Some embodiments may provide for a radio frequency (RF) tag including a motion sensor, a UWB transmitter and processing circuitry. The motion sensor may be configured to generate one or more motion data values indicating motion of the RF tag. The UWB transmitter may be configured to transmit blink data at variable blink rates. The processing circuitry may be configured to: receive the one or more motion data values from the motion sensor; determine a blink rate for the UWB transmitter based on the one or more motion data values; and control the UWB transmitter to wirelessly transmit the blink data at the blink rate. For example, the UWB transmitter may be configured to transmit the blink data at a first blink rate or a second blink rate, wherein the first blink rate is different than the second blink rate. The processing circuitry may be configured to control the UWB transmitter to wirelessly transmit the blink data at the first blink rate or the second blink rate based on the one or more motion data values.

In some embodiments, the UWB transmitter may be further configured to transmit the blink data at a third blink rate, wherein the third blink rate is different than the first blink rate and the second blink rate, and wherein the processing circuitry is configured to control the UWB transmitter to wirelessly transmit the blink data at the first blink rate, the second blink rate, or the third blink rate based on the one or more motion data values.

In some embodiments, the motion sensor may include an accelerometer, gyroscope, and/or compass (among other things) configured to generate the one or more motion data values.

In some embodiments, the processing circuitry may be further configured to determine the blink data. For example, the blink data may include at least one of a tag identifier, blink rate status change indication, an orientation status change indication, among other things.

In some embodiments, the motion sensor may include a three axis accelerometer configured to generate the one or more motion data values. The one or more motion data values may include an X axis acceleration value, a Y axis acceleration value, and a Z axis acceleration value. The processing circuitry may be further configured to control the UWB transmitter to wirelessly transmit the blink data at the first blink rate or the second blink rate by determining an acceleration magnitude value based on one or more of the X axis acceleration value, the Y axis acceleration value, and the Z axis acceleration value.

In some embodiments, the processing circuitry may be further configured to: determine an acceleration magnitude value based on the one or more motion data values; adjust the blink rate based on the acceleration magnitude value; and control the UWB transmitter to wirelessly transmit the blink data at the adjusted blink rate.

In some embodiments, the processing circuitry may be further configured to: determine an acceleration magnitude threshold value; determine whether the acceleration magnitude value exceeds the acceleration magnitude threshold value; and in response to determining that the acceleration magnitude value fails to exceed the acceleration magnitude threshold value, control the UWB transmitter to stop wirelessly transmitting the blink data. In some embodiments, the processing circuitry may be configured to, in response to determining that the acceleration magnitude value fails to exceed the acceleration magnitude threshold value, adjust the blink rate and wirelessly transmit the blink data at the adjusted blink rate.

In some embodiments, the UWB transmitter may be configured to wirelessly transmit the blink data via a tag signal having a bandwidth of greater than at least one of 500 MHz and 20% of a center frequency of the tag signal.

In some embodiments, the UWB transmitter may be configured to transmit the blink data at the first blink rate or the second blink rate via a tag signal recognizable by a receiver such that the location of the RF tag may be determined by a tag locating system.

In some embodiments, the RF tag may further include a receiver configured to receive blink rate control data. The processing circuitry may be further configured to determine first blink rate or the second blink rate for the UWB transmitter based on the blink rate control data.

In some embodiments, the processing circuitry is further configured to: determine a live motion signature based on motion data values received over time from the motion sensor; compare the live motion signature with one or more motion signatures, wherein the one or more motion signatures each includes one or more motion data threshold values and associated duration values; and in response to identifying a match between the live motion signature a first motion signature, control the UWB transmitter to wirelessly transmit the blink data at the first blink rate or the second blink rate.

Some embodiments may provide for a method of communicating with a wireless receiver. The method may include: receiving, by circuitry of an RF tag, one or more motion data values from a motion sensor, wherein the RF tag includes the motion sensor and a UWB transmitter; determining, by the circuitry and based on the one or more motion data values, a blink rate for the UWB transmitter; and controlling, by the circuitry, the UWB transmitter to wirelessly transmit the blink data at the blink rate. For example, the motion sensor may include an accelerometer, gyroscope, and/or compass configured to generate the one or more motion data values.

In some embodiments, the method may further include determining the blink data where the blink data includes at least one of a tag identifier, blink rate status change indication, an orientation status change indication, among other things.

In some embodiments, the motion sensor may include a three axis accelerometer configured to generate the one or more motion data values. The one or more motion data values may include an X axis acceleration value, a Y axis acceleration value, and a Z axis acceleration value. Determining the blink rate may further include: determining an acceleration magnitude value based on one or more of the X axis acceleration value, the Y axis acceleration value, and the Z axis acceleration value; and determining the blink rate based on the acceleration magnitude value.

In some embodiments, the method may further include: determining an acceleration magnitude value based on the motion data; adjusting the blink rate based on the acceleration magnitude value; and controlling the UWB transmitter to wirelessly transmit the blink data at the adjusted blink rate.

In some embodiments, the method may further include: determining an acceleration magnitude threshold value; comparing the acceleration magnitude value with the acceleration magnitude threshold value; and in response to determining that the acceleration magnitude value fails to exceed the acceleration magnitude threshold value, controlling the UWB transmitter to stop wirelessly transmitting the blink data. In some embodiments, the method may include, in response to determining that the acceleration magnitude value fails to exceed the acceleration magnitude threshold value, adjusting the blink rate and wirelessly transmitting the blink data at the adjusted blink rate.

In some embodiments, the method may further include wirelessly transmitting, by the UWB transmitter, the blink data via a tag signal having a bandwidth of greater than at least one of 500 MHZ and 20% of a center frequency of the tag signal. The method may additionally or alternatively include wirelessly transmitting, by the UWB transmitter, the blink data via tag signal recognizable by a receiver such that the location of the RF tag may be determined by a tag locating system.

In some embodiments, the method may further include: determining a live motion signature based on motion data values received over time from the motion sensor; comparing the live motion signature with one or more motion signatures, wherein the one or more motion signatures each includes one or more motion data threshold values and one or more associated duration values; and in response to identifying a match between the live motion signature a first motion signature, control the UWB transmitter to wirelessly transmit the blink data at the blink rate.

In some embodiments, the RF tag of the method may further include a UWB receiver. The method may further include: wirelessly receiving, with the UWB receiver, blink rate control data; and determining the blink rate for the UWB transmitter based on the blink rate control data.

Some embodiments may provide for a system. The system may include one or more RF tags, a receiver, and an apparatus (e.g., a server and/or other processing device). Each RF tag may include: a motion sensor configured to generate motion data values indicating motion of the RF tag; and a UWB transmitter configured to wirelessly transmit blink data at variable blink rates based on the motion data values. The receiver may be configured to wirelessly receive the blink data. The apparatus may be configured to: receive the blink data from the receiver; and determine tag location data indicating a location of an RF tag based on the blink data.

In some embodiments, the receiver may be further configured to: wirelessly receive first blink data from the RF tag at a first blink rate and wirelessly receive second blink data from a second RF tag at a second blink rate, wherein the first blink rate is different from the second blink rate.

In some embodiments, the apparatus may be further configured to: determine at least one of tag derived data and tag location data based on blink data from the RF tag; determine blink rate control data based on the at least one of tag derived data and tag location data; and provide the blink rate control data to the RF tag.

Some embodiments may include an apparatus for determining event data, comprising: processing circuitry configured to: correlate at least one RF tag to a participant; correlate at least one motion sensor of the at least one RF tag to the participant; receive blink data transmitted by the at least one tag; determine tag location data based on the blink data; receive motion data originating from the at least one motion sensor; and determine the event data based on comparing the tag location data with kinetic models and the motion data with motion signatures.

In some embodiments, the processing circuitry may be further configured to: determine a blink rate for an ultra-wideband (UWB) transmitter of the at least one RF tag based on the event data; and provide blink rate control data defining the blink rate to the at least one RF tag.

In some embodiments, the motion data may include an X axis acceleration value, a Y axis acceleration value, and a Z axis acceleration value. The processing circuitry may be further configured to: determine an acceleration magnitude value based on one or more of the X axis acceleration value, the Y axis acceleration value, and the Z axis acceleration value; and determine the blink rate based on the acceleration magnitude value.

In some embodiments, the blink data may include at least one of a blink rate status change indication and an orientation status change indication.

In some embodiments, the processing circuitry configured to compare the motion data with the motion signatures may include the processing circuitry being configured to: determine a live motion signature based on the motion data received from the at least one motion sensor; compare the live motion signature with the motion signatures, wherein the motion signatures each includes one or more motion data threshold values and associated duration values; and in response to identifying a match between the live motion signature and a first motion signature, determine the event data based at least in part on the first motion signature.

Some embodiments may include a method for determining event data, including: correlating, by processing circuitry of an apparatus, at least one RF tag to a participant; correlating, by the processing circuitry, at least one motion sensor of the at least one RF tag to the participant; receiving, by the processing circuitry, blink data transmitted by the at least one RF tag; determining, by the processing circuitry, RF tag location data based on the blink data; receiving, by the processing circuitry, motion data originating from the at least one motion sensor; and determining, by the processing circuitry, the event data based on the comparing the RF tag location data with kinetic models and the motion data with motion signatures.

In some embodiments, the method may further include, by the processing circuitry: determining a blink rate for an ultra-wideband (UWB) transmitter of the at least one RF tag based on the event data; and providing blink rate control data defining the blink rate to the at least one RF tag.

In some embodiments, the motion data may include an X axis acceleration value, a Y axis acceleration value, and a Z axis acceleration value. The method may further include, by the processing circuitry: determining an acceleration magnitude value based on one or more of the X axis acceleration value, the Y axis acceleration value, and the Z axis acceleration value; and determining the blink rate based on the acceleration magnitude value.

In some embodiments, the blink data may include at least one of a blink rate status change indication or an orientation status change indication.

In some embodiments, comparing the motion data with the motion signatures may include: determining a live motion signature based on the motion data received from the at least one motion sensor; comparing the live motion signature with the motion signatures, wherein the motion signatures each includes one or more motion data threshold values and associated duration values; and in response to identifying a match between the live motion signature and a first motion signature, determining the event data based at least in part on the first motion signature.

Some embodiments may include a system for determining event data, including: a plurality of RF tags; and an apparatus including processing circuitry configured to: correlate at least one RF tag of the plurality of RF tags to a participant; correlate at least one motion sensor of the at least one RF tag to the participant; receive blink data transmitted by the at least one RF tag; determine tag location data based on the blink data; receive motion data originating from the at least one motion sensor; and determine the event data based on the comparing the tag location data with kinetic models and the motion data with motion signatures.

In some embodiments, the processing circuitry may be further configured to: determine a blink rate for an ultra-wideband (UWB) transmitter of the at least one RF tag based on the event data; and provide blink rate control data defining the blink rate to the at least one RF tag.

In some embodiments, the motion data may include an X axis acceleration value, a Y axis acceleration value, and a Z axis acceleration value. The processing circuitry may be further configured to: determine an acceleration magnitude value based on one or more of the X axis acceleration value, the Y axis acceleration value, and the Z axis acceleration value; and determine the blink rate based on the acceleration magnitude value.

In some embodiments, the blink data may include at least one of a blink rate status change indication and an orientation status change indication.

In some embodiments, the processing circuitry configured to compare the motion data with the motion signatures may include the processing circuitry being configured to: determine a live motion signature based on the motion data received from the at least one motion sensor; compare the live motion signature with the motion signatures, wherein the motion signatures each includes one or more motion data threshold values and associated duration values; and in response to identifying a match between the live motion signature and a first motion signature, determine the event data based at least in part on the first motion signature.

In some embodiments, the at least one RF tag may include: the at least one motion sensor; an ultra-wideband (UWB) transmitter configured to transmit the blink data at variable blink rates; and tag processing circuitry configured to: receive the motion data from the at least one motion sensor; determine a blink rate for the UWB transmitter based on the motion data values; and control the UWB transmitter to wirelessly transmit the blink data at the blink rate.

In some embodiments, the at least one motion sensor may include an accelerometer configured to generate the motion data.

In some embodiments, the UWB transmitter may be configured to wirelessly transmit the blink data via a tag signal having a bandwidth of greater than at least one of 500 MHZ and 20% of a center frequency of the tag signal.

In some embodiments, the at least on RF tag may further include a receiver configured to receive blink rate control data from the apparatus; and the tag processing circuitry is further configured to determine the blink rate for the UWB transmitter based on the blink rate control data.

In some embodiments, the tag processing circuitry may be further configured to: determine a live motion signature based on the motion data; compare the live motion signature with one or more motion signatures, wherein the one or more motion signatures each includes one or more motion data threshold values and associated duration values; and in response to identifying a match between the live motion signature a first motion signature, control the UWB transmitter to wirelessly transmit the blink data at the blink rate.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

Some embodiments are illustrated in the appended figures and description below in relation to the sport of American football. However, as will be apparent to one of ordinary skill in the art in view of this disclosure, the inventive concepts herein described are not limited to football and may be applied to various other applications including, without limitation, other sports or group events (e.g., where multiple persons of interest may be tracked in an area having a channel capacity) such as baseball, basketball, golf, hockey, soccer, racing or motorsports, competitive events, and the like.

These characteristics as well as additional features, functions, and details of various embodiments are described below. Similarly, corresponding and additional embodiments are also described below.

BRIEF DESCRIPTION OF THE DRAWINGS

Figure 1:
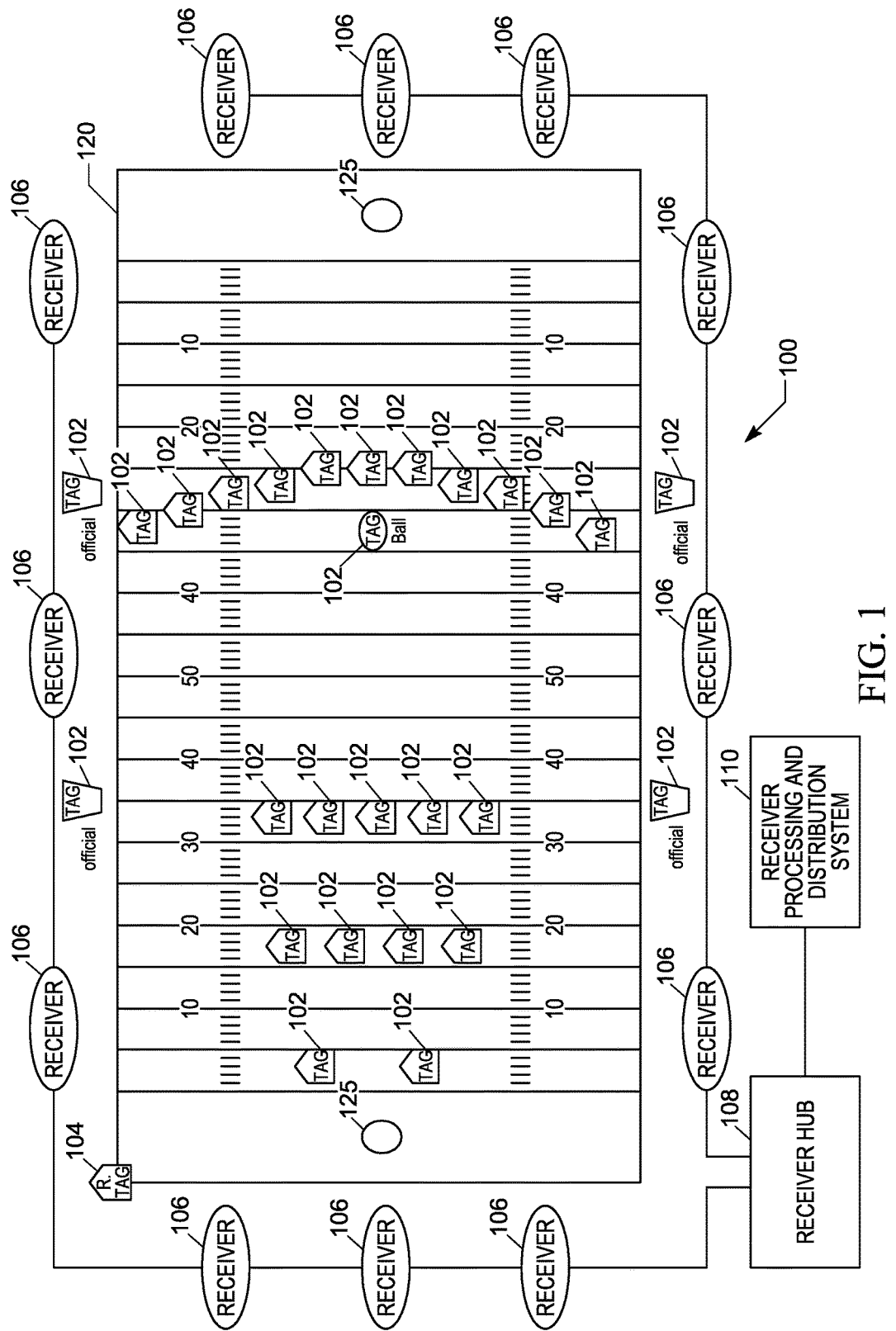
Figure 2:
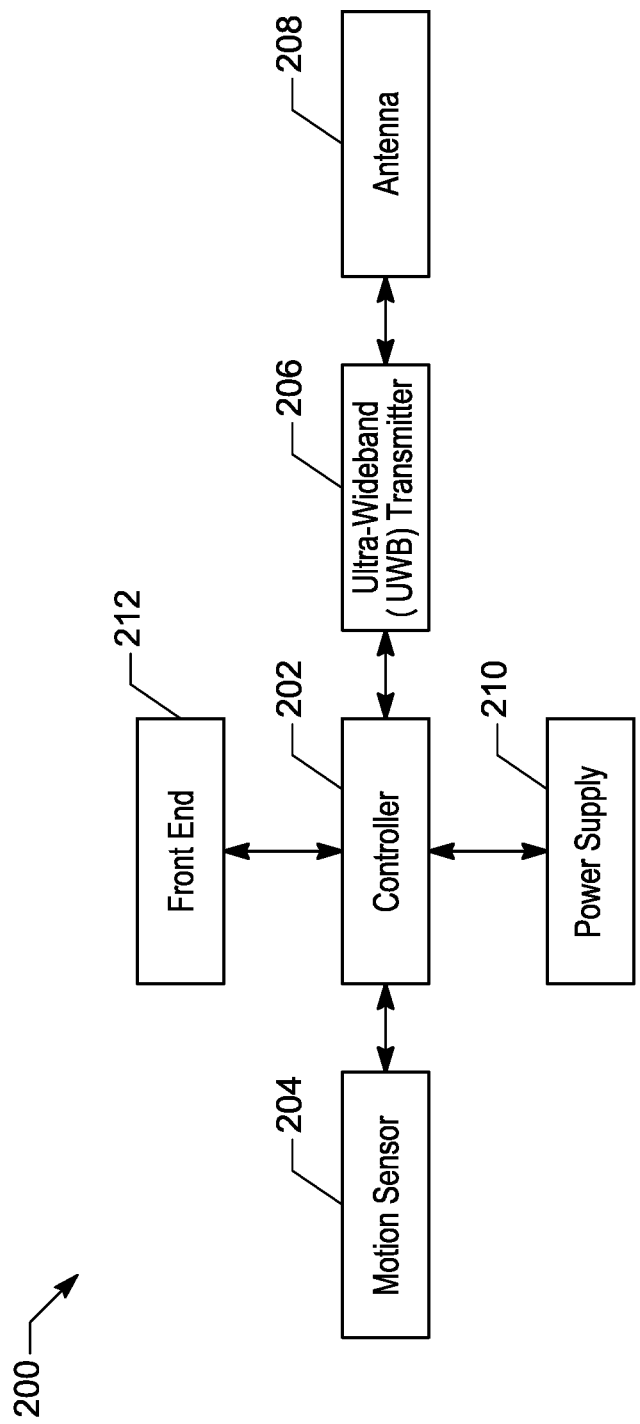
Figure 3:
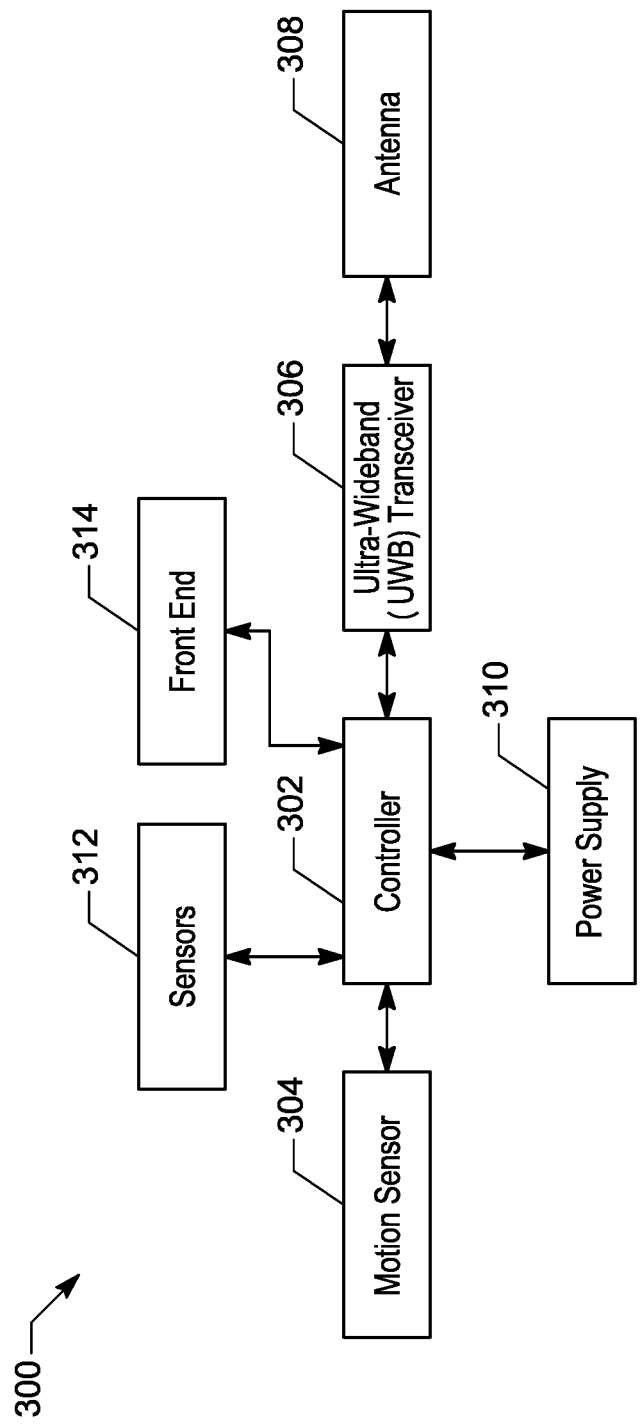
Figure 6:
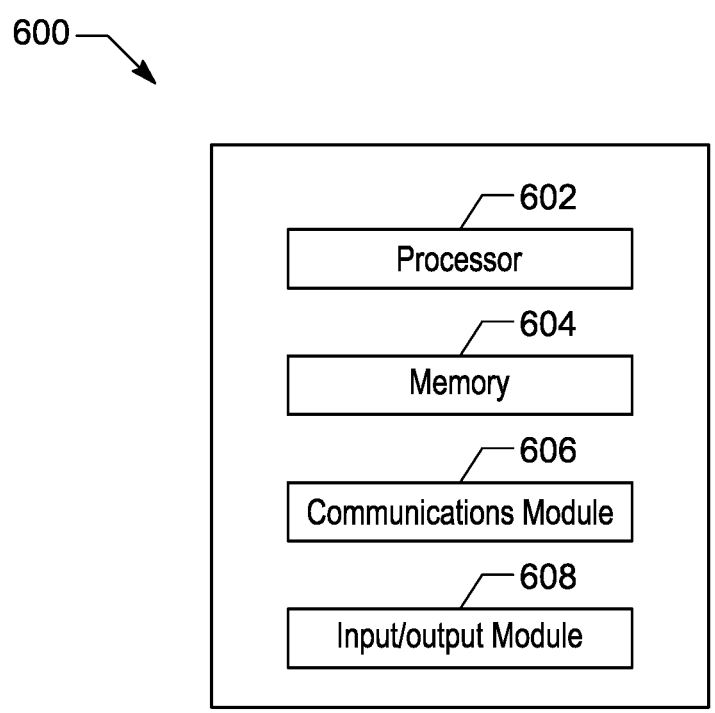
Figure 7:
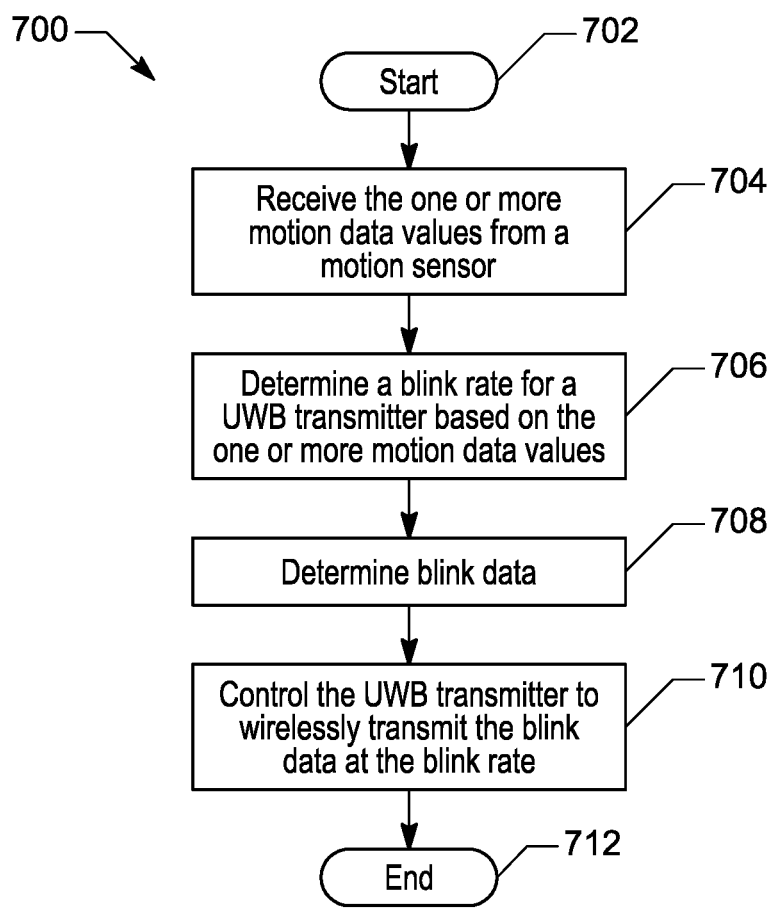
Figure 8:
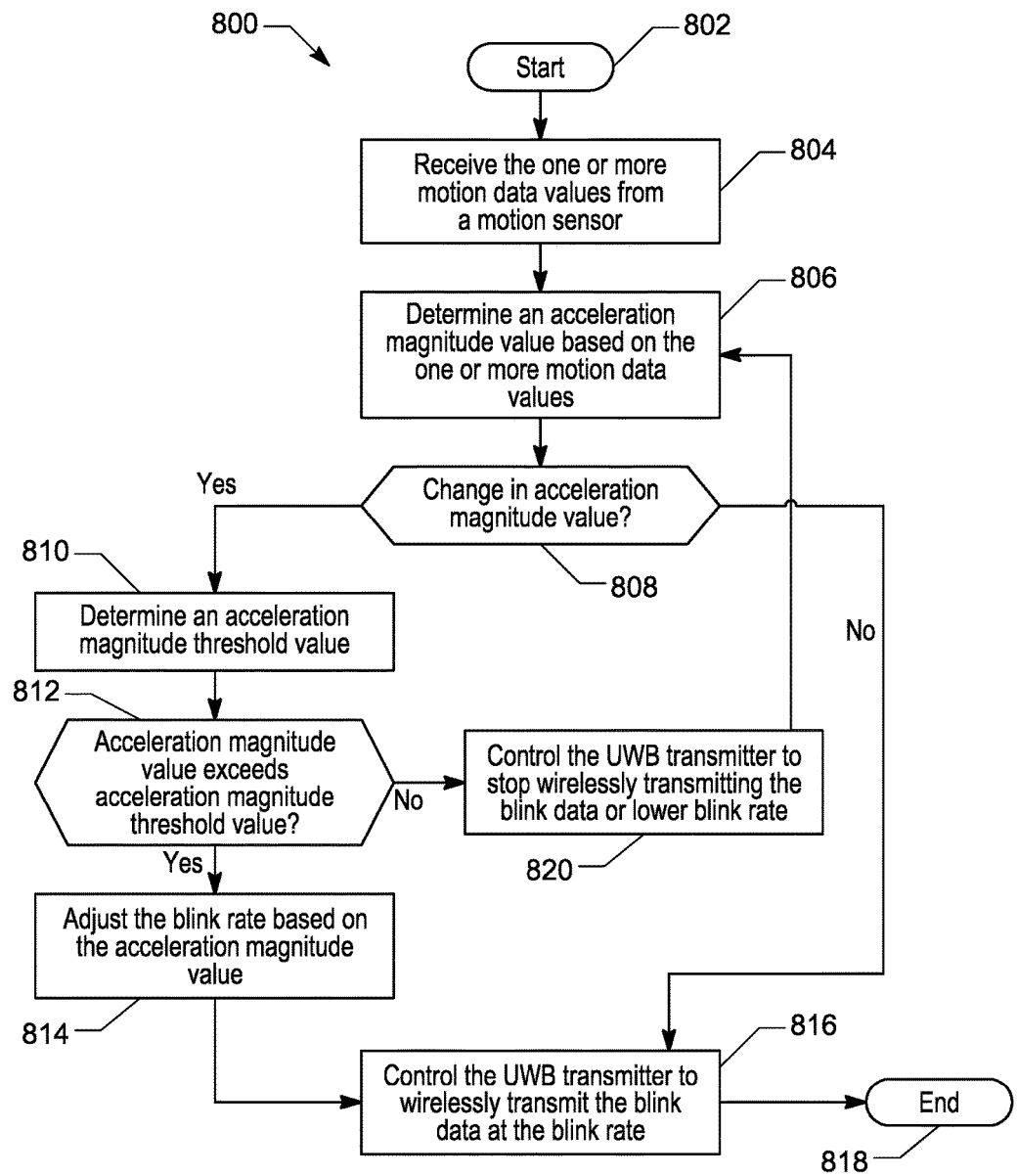
Figure 9:
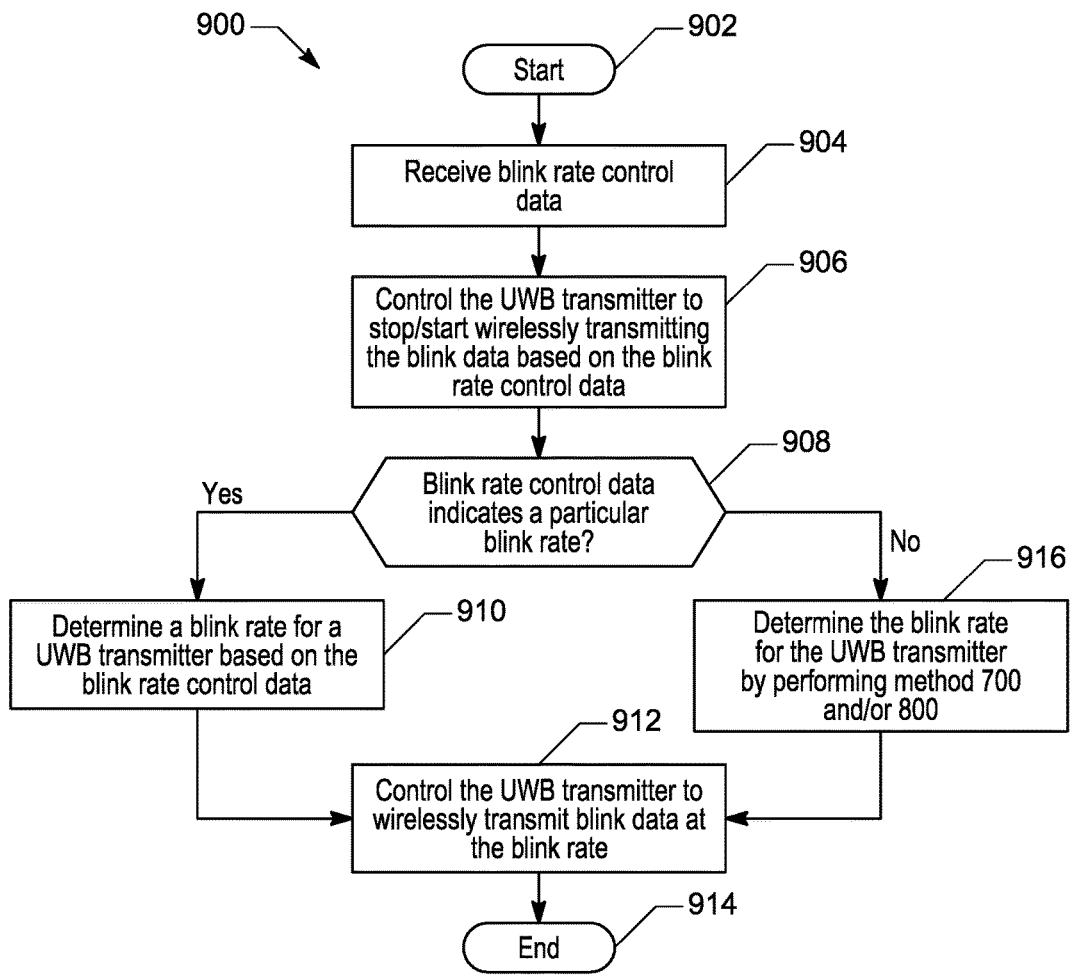
Figure 10:
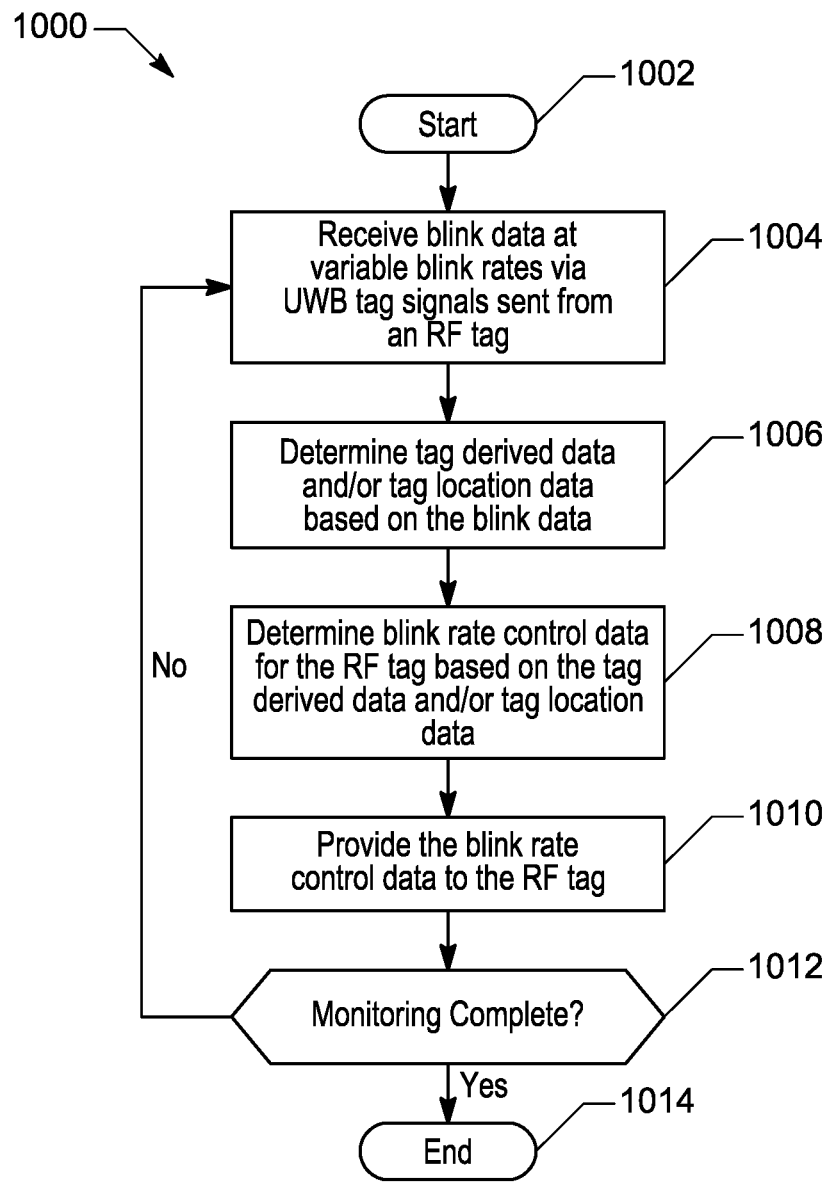
Figure 11:
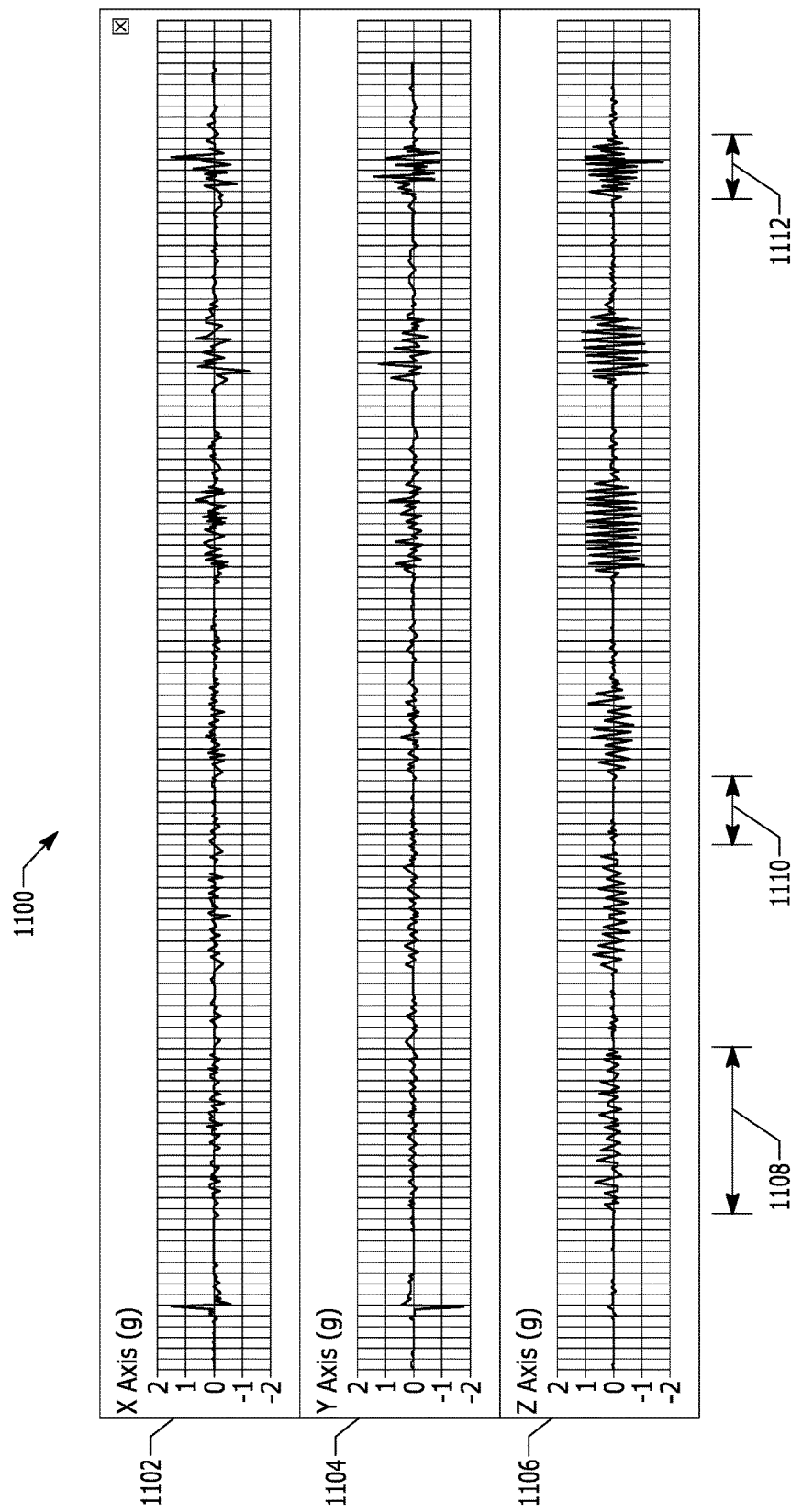
Figure 12:
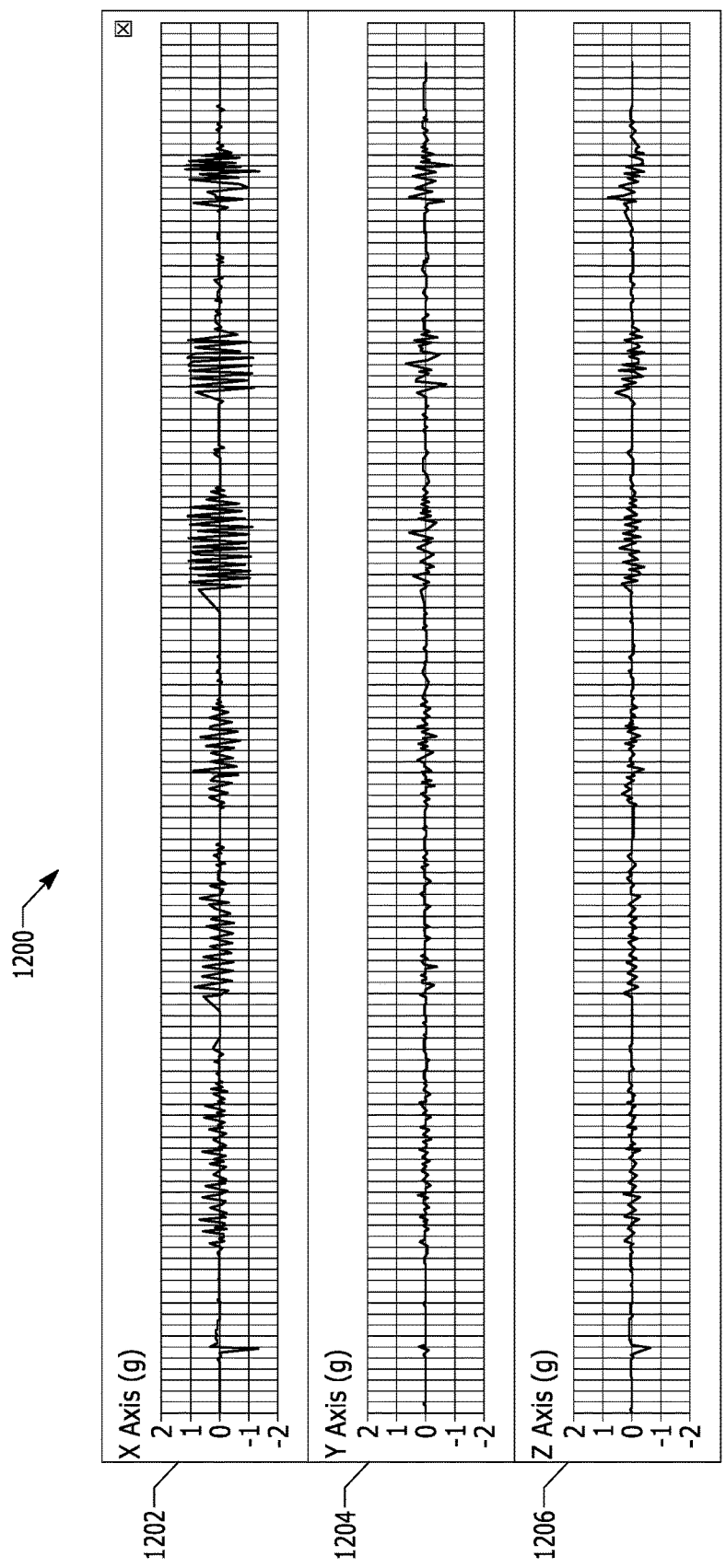
Figure 13:
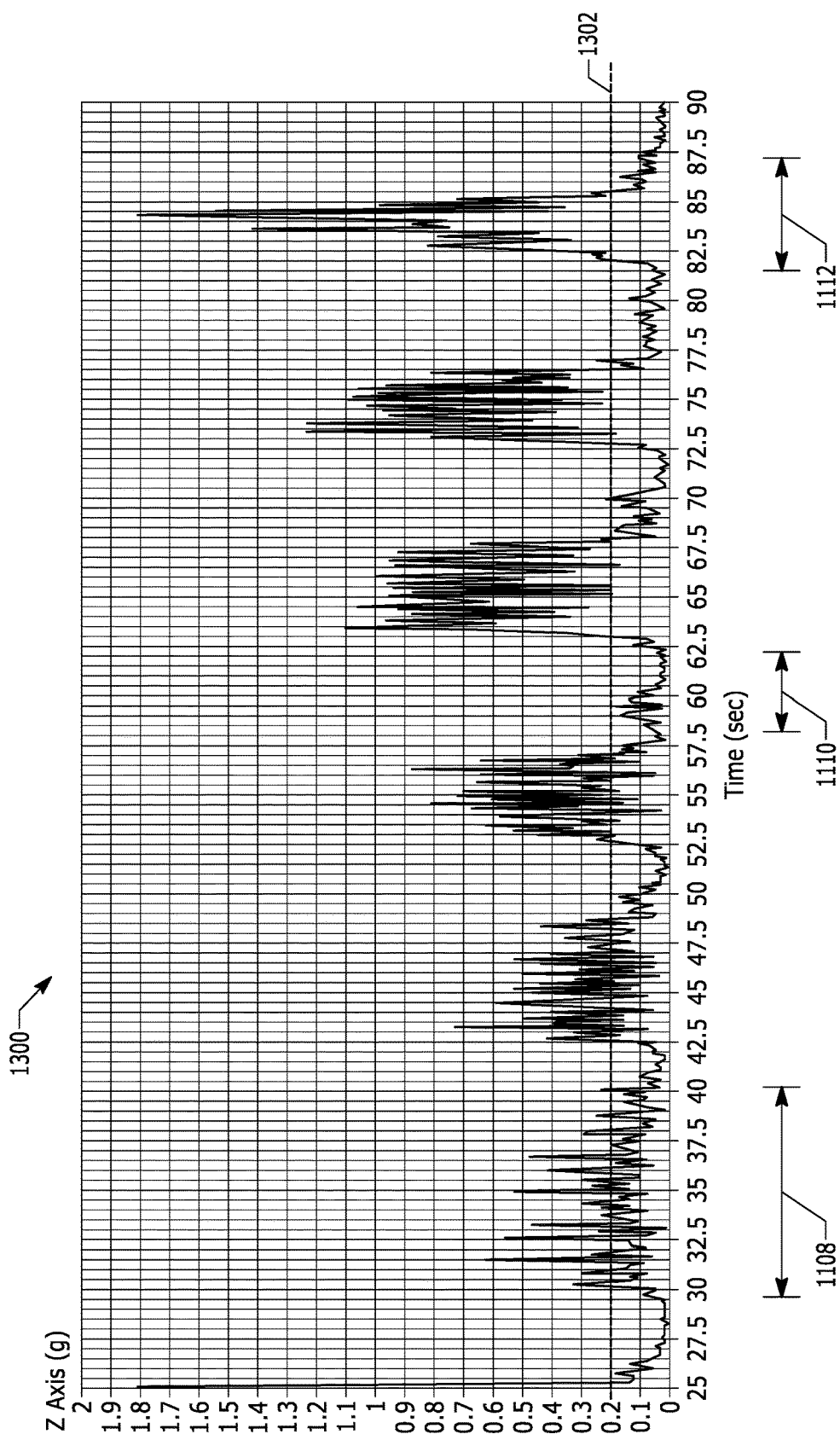

Having thus described some embodiments in general terms, reference will now be made to the accompanying drawings, which are not necessarily drawn to scale, and wherein:

FIG. 1 shows an example radio frequency locating system, in accordance with some embodiments;

FIG. 2 shows a schematic block diagram of an example radio frequency tag, in accordance with some embodiments;

FIG. 3 shows a schematic block diagram of an example radio frequency tag, in accordance with some embodiments;

FIGS. 4A-4C show example objects including attached radio frequency tags, in accordance with some embodiments;

FIGS. 5A-5E show example UWB transmission architectures, in accordance with some embodiments;

FIG. 6 shows a schematic block diagram of example circuitry, in accordance with some embodiments;

FIG. 7 shows a flowchart of an example method for communicating with a wireless receiver, in accordance with some embodiments;

FIG. 8 shows a flowchart of an example method for communicating with a wireless receiver, in accordance with some embodiments;

FIG. 9 shows a flowchart of an example method for remote system control of an RF tag blink rate, in accordance with some embodiments;

FIG. 10 shows a flowchart of an example method for remotely controlling the blink rate of an RF tag, in accordance with some embodiments;

FIG. 11 shows an example of motion data generated by a radio frequency tag, in accordance with some embodiments;

FIG. 12 shows an example of motion data generated by a radio frequency tag, in accordance with some embodiments;

FIG. 13 shows an example of acceleration magnitude values of a radio frequency tag, in accordance with some embodiments; and FIGS. 14A-18 show flowcharts of examples of methods that may be used in providing performance analytics in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

Methods, systems, apparatus and computer program products described herein are operable for providing monitoring of objects based on one or more RF tags attached to the objects. The RF tags may be configured to transmit ultra-wideband (UWB) tag signals that include blink data. To conserve channel capacity (e.g., when multiple tags are concurrently monitored), prevent signal interference and collisions, reduce power consumption, among other things, the RF tags may be configured to transmit the blink data at variable time intervals or blink rates.

In some embodiments, the variable blink rate may be controlled based on the output of a motion sensor attached to the object. The motion sensor may be part of the RF tag or may be separately housed on the object and configured to communicate with the RF tag via a wired or wireless transmission. For example, the motion sensor may include a three axis accelerometer and/or a 9D/6D/4D orientation sensor. The blink rate may be controlled based on motion data values generated by the motion sensor in a variety of ways. In some embodiments, the blink rate may be reduced when the motion data values indicate that the object is still and increased when the motion data values indicate that the object is in motion. In this regard, the RF tags of objects that are inactive and/or otherwise not of interest may be deactivated or turned down (e.g., via a reduced blink rate).

In some embodiments, the RF tag may include a UWB receiver and/or transceiver. The blink rate of the RF tag may be controlled remotely, such as by a remote server or system. For example, the system may be configured to determine and transmit blink rate control data to the RF tag that can activate, deactivate, and/or change the variable blink rate. The system may be configured to determine the blink rate control data based on various factors including sensor derived data extracted from the tag signal and/or blink data, such as tag location data that indicates a location of the RF tag. The system may be further configured to programmatically control RF tag blink rates to monitor objects of interest at particular times while reducing tag signal interference, collisions, power consumption, etc., that would otherwise be caused by RF tags that are not of interest (e.g., at a particular time) broadcasting tag signals (e.g., at a non-variable blink rate).

Example Architecture

FIG. 1 illustrates an exemplary locating system 100 useful for calculating a location by an accumulation of location data or time of arrivals (TOAs) at a central processor/Hub 108, whereby the TOAs represent a relative time of flight (TOF) from RTLS tags 102 as recorded at each receiver 106 (e.g., UWB reader, etc.). A timing reference clock is used, in some examples, such that at least a subset of the receivers 106 may be synchronized in frequency, whereby the relative TOA data associated with each of the RTLS tags 102 may be registered by a counter associated with at least a subset of the receivers 106. In some examples, a reference tag 104, preferably a UWB transmitter, positioned at known coordinates, is used to determine a phase offset between the counters associated with at least a subset of the receivers 106. The RTLS tags 102 and the reference tags 104 reside in an active RTLS field. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 106.

In some examples, the system comprising at least the tags 102 and the receivers 106 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 102 may operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dBi directional antenna is used at the receiver, but the projected range will depend, in other examples, upon receiver antenna gain. Alternatively or additionally, the range of the system allows for one or more tags 102 to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 1, the object to be located has an attached tag 102, preferably a tag having a UWB transmitter, that transmits blink data (e.g., multiple pulses at a 1 Mb/s burst rate, such as 112 bits of On-Off keying (OOK) at a rate of 1 Mb/s), and optionally, blink data comprising an information packet utilizing OOK that may include, but is not limited to, ID information, a sequential burst count or other desired information for object or personnel identification, inventory control, etc. In some examples, the sequential burst count (e.g., a packet sequence number) from each tag 102 may be advantageously provided in order to permit, at a Central Processor/Hub 108, correlation of TOA measurement data from various receivers 106.

In some examples, the tag 102 may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate or blink rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less than a regulated average power for a given time interval (e.g., a 1 msec time interval for an FCC regulated transmission).

Alternatively or additionally, additional sensor or telemetry data may be transmitted from the tag to provide the receivers 106 with information about the environment and/or operating conditions of the tag. For example, the tag may transmit a temperature to the receivers 106. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 102 may be programmed to intermittently transmit data to the receivers 106 in response to a signal from a magnetic command transmitter (not shown). The magnetic command transmitter may be a portable device, functioning to transmit a 125 kHz signal, in some example embodiments, with a range of approximately 15 feet or less, to one or more of the tags 102. In some examples, the tags 102 may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 104, may be positioned within and/or about a monitored region. In some examples, the reference tag 104 may be configured to transmit a signal that is used to measure the relative phase (e.g., the count of free-running counters) of non-resettable counters within the receivers 106.

One or more (e.g., preferably four or more) receivers 106 are also positioned at predetermined coordinates within and/or around the monitored region. In some examples, the receivers 106 may be connected in a "daisy chain" fashion to advantageously allow for a large number of receivers 106 to be interconnected over a significant monitored region in order to reduce and simplify cabling, provide power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 102 and one or more reference tags 104.

Each receiver 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Central Processor/Hub 108 having a central timing reference clock generator. The reference clock signal establishes a common timing reference for the receivers 106. Thus, multiple time measuring circuits of the respective receivers 106 are synchronized in frequency, but not necessarily in phase. While there typically may be a phase offset between any given pair of receivers in the receivers 106, the phase offset is readily determined through use of a reference tag 104. Alternatively or additionally, each receiver may be synchronized wirelessly via virtual synchronization without a dedicated physical timing channel.

In some example embodiments, the receivers 106 are configured to determine various attributes of the received signal. Since measurements are determined at each receiver 106, in a digital format, rather than analog in some examples, signals are transmittable to the Central Processor/Hub 108. Advantageously, because packet data and measurement results can be transferred at high speeds to a receiver memory, the receivers 106 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the Central Processor/Hub 108 (e.g., the data cables may enable a transfer speed of 2 Mbps). In some examples, measurement data is transferred to the Central Processor/Hub at regular polling intervals.

As such, the Central Processor/Hub 108 determines or otherwise computes tag location (i.e., object location) by processing TOA measurements relative to multiple data packets detected by the receivers 106. In some example embodiments, the Central Processor/Hub 108 may be configured to resolve the coordinates of a tag using nonlinear optimization techniques.

In some examples, TOA measurements from multiple receivers 106 are processed by the Central Processor/Hub 108 to determine a location of the transmit tag 102 by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 106. The distance between the surfaces of the respective spheres to the estimated location coordinates ($x_0$, $y_0$, $z_0$) of the transmit tag 102 represents the measurement error for each respective TOA, and the minimization of the sum of the squares of the TOA measurement errors from each receiver participating in the DTOA location estimate provides for both the location coordinates ($x_0$, $y_0$, $z_0$) of the transmit tag and of that tag's transmit time $t_0$.

In some examples, the system described herein may be referred to as an "over-specified" or "over-determined" system. As such, the Central Processor/Hub 108 may calculate one or more valid (i.e., most correct) locations based on a set of measurements and/or one or more incorrect (i.e., less correct) locations. For example, a location may be calculated that is impossible due the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting location for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\epsilon = \Sigma_{j=1}^{N}[[(x-x_j)^2+(y-y_j)^2+(z-z_j)^2]^{1/2}-c(t_j-t_0)]^2 \quad (1)$$

Where N is the number of receivers, c is the speed of light, ($x_j$, $y_j$, $z_j$) are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error $\epsilon$ in Equation 1 may be the Davidon-Fletcher-Powell (DFP) quasi-Newton algorithm, for example. In some examples, the optimization algorithm to minimize the error $\epsilon$ in Equation 1 may be a steepest descent algorithm. In each case, the algorithms may be seeded with an initial location estimate (x,y,z) that represents the two-dimensional (2D) or three-dimensional (3D) mean of the positions of the receivers 106 that participate in the tag location determination.

In some examples, the RTLS system comprises a receiver grid, whereby each of the receivers 106 in the receiver grid keeps a receiver clock that is synchronized, with an initially unknown phase offset, to the other receiver clocks. The phase offset between any receivers may be determined by use of a reference tag that is positioned at a known coordinate position $(x_T, y_T, z_T)$. The phase offset serves to resolve the constant offset between counters within the various receivers 106, as described below.

In further example embodiments, a number N of receivers 106 $\{R_j: j=1, \ldots, N\}$ are positioned at known coordinates $(x_{R_j}, y_{R_j}, z_{R_j})$, which are respectively positioned at distances $d_{R_j}$ from a reference tag 104, such as given in Equation 2:

$$d_{R_j} = \sqrt{(x_{R_j} - x_T)^2 + (y_{R_j} - y_T)^2 + (z_{R_j} - z_T)^2} \quad (2)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 3 by:

$$N_{R_j} = \beta\tau_R + O_j + \beta d_{R_j}/c \quad (3)$$

Where c is the speed of light and $\beta$ is the number of fine resolution count increments per unit time (e.g., one per nanosecond) Similarly, each object tag $T_i$ of each object to be located transmits a signal at an unknown time $\tau_i$ to produce a count $N_{ij}$, as given in Equation 4:

$$N_{ij} = \beta\tau_i + O_j + \beta d_{ij}/c \quad (4)$$

at receiver $R_j$ where $d_{ij}$ is the distance between the object tag $T_i$ and the receiver 106 $R_j$. Note that $\tau_i$ is unknown, but has the same constant value for all receivers. Based on the equalities expressed above for receivers $R_j$ and $R_k$ and given the reference tag 104 information, phase offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{R_j} - d_{R_k}$ remains constant, (which means the receivers and reference tag are fixed and there is no multipath situation) and $\beta$ is the same for each receiver. Note that $\Delta_{jk}$ is a known quantity, since $N_{R_j}, N_{R_k}, \beta$, $d_{R_j}/c$, and $d_{R_k}/c$ are known. That is, the phase offsets between receivers $R_j$ and $R_k$ may be readily determined based on the reference tag 104 transmissions. Thus, again from the above equations, for a tag 102 $(T_i)$ transmission arriving at receivers $R_j$ and $R_k$, one may deduce the following Equations 6a-b:

$$N_{ij} - N_{ik} = (O_j - O_k) + \beta\left(\frac{d_{ij}}{c} - \frac{d_{ik}}{c}\right) = \Delta_{jk} + \beta\left(\frac{d_{ij}}{c} - \frac{d_{ik}}{c}\right) \quad (6a)$$

Or, $$d_{ij} - d_{ik} = (c/\beta)[N_{ij} - N_{ik} - \Delta_{jk}] \quad (6b)$$

Each arrival time, $t_1$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0$').

Example RF Tags

FIG. 2 shows schematic block diagram of an example RF tag 200, in accordance with some embodiments. RF tag 200 may be configured to provide blink data at various blink rates, such as to a receiver 106 as shown in FIG. 1. The blink rates may be controlled based on detected motion of RF tag 200 such that the blink data is communicated at a slower blink rate when RF tag 200 is still (i.e., having motion below some predetermined threshold) and a relatively faster blink rate when RF tag 200 is in motion (i.e., having motion above some predetermined threshold). As such, a greater number of RF tags 200 may be used within monitored area 125 without of overtaxing channel capacity (e.g., resulting in collisions, interference, and/or loss of tag signal data) at monitored area 125. Furthermore, the variable blink rates may allow RF tag 200 to have lower average power consumption and a longer battery life because power can be conserved at the slower blink rates.

RF tag 200 may include controller 202, motion sensor 204, UWB transmitter 206, antenna 208, power supply 210, and analog front end 212. Controller 202 may be configured to perform one or more of the processing functionality disclosed herein for controlling the transmission of blink data by RF tag 200 at variable blink rates based on motion data (e.g., indicating motion of RF tag 200). For example, controller 202 may be configured to programmatically determine a blink rate based on one or more motion data values received from motion sensor 204. Controller 202 may be communicably connected with motion sensor 204 and UWB transmitter 206. In some embodiments, controller 202 may include a memory and/or other storage device configured to store the blink data (and/or associated packet data) to be transmitted at the determined blink rate.

Motion sensor 204 may be configured to generate one or more motion data values indicating motion of RF tag 200. In some embodiments, motion sensor 204 may include an accelerometer, such as a three axis accelerometer. In some embodiments, motion sensor 204 may further include an orientation sensor (e.g., a gyroscope and/or compass) configured to provide 9D/6D/4D orientation detection. For example, based on movement of RF tag 200 by an object to which RF tag 200 is attached, a three axis accelerometer may be configured to generate the one or more motion data values including an X axis acceleration value, a Y axis acceleration value, and a Z axis acceleration value. Controller 202 and/or motion sensor 204 may be configured to determine an acceleration magnitude value based on one or more of the X axis acceleration value, the Y axis acceleration value, and the Z axis acceleration value. Controller 202 may be configured to determine a blink rate based on the acceleration magnitude value and/or duration value indicating the duration of the determined acceleration magnitude value, as discussed in greater detail below. An acceleration magnitude value may provide an indication as to the amount and/or intensity of movement of RF tag 200, such as may be detected in a measurement cycle of motion sensor 204. In some embodiments, controller 202 and/or motion sensor 204 may be configured to track acceleration magnitude values for plurality of measurement cycles to determine the duration of (e.g., sequential) acceleration magnitude values of interest (e.g., those that exceed an acceleration magnitude threshold value for a duration that exceeds a duration threshold value).

In some embodiments, controller 202 and/or motion sensor 204 may be configured to determine motion blink rates based on motion data values indicating one or more motion events. One example of such a motion event may include user taps on the motion sensor 204, such as where one tap (e.g., defined by motion data values indicating a magnitude and duration of the tap) or more taps (e.g., defined by motion data values indicating magnitude and duration within a predetermined time window) may be used to trigger action such as the changing of the blink rate. Such an embodiments may be well-suited for stationary objects (e.g., where motion data values caused by tag movement does not interfere with tap detection) where a tag may be turned on/off or rates could be selected (e.g., cycled through) based on the number of taps received within the predetermined time window. In another example, an RF tag may be put into a hibernate mode (e.g., based on control data from a remote system or other device) and be awakened based on a tap. In general, a tap may be detected based on motion sensor 204 detecting movement in one or more of its axis and/or degrees of motion detection.

In some embodiments, motion sensor 204 may additionally or alternatively include processing circuitry (which may be the same or separate from controller 202) configured to generate motion data values indicating movement up to six degrees of freedom (e.g., forward/back, up/down, left/right, pitch, yaw, and roll). RF tag 200 may be configured to determine an acceleration magnitude value based on at least in part on rotational movements detected by motion sensor 204. In some embodiments, motion sensor 204 may include a jiggle switch and/or other motion detection device.

In some embodiments, motion sensor 204 may be configured to generate acceleration magnitude values, acceleration vectors, and/or perform other acceleration magnitude value-related determinations (e.g., in alternative to controller 202). For example, motion sensor 204 may include a memory configured to store motion data threshold values and/or duration values. In some embodiments, controller 202 may be configured to program motion sensor 204, such as based on motion data threshold values and/or duration values received from front end 212 and/or a UWB receiver/transceiver. Motion sensor 204 may be configured to provide an interrupt signal (e.g., via a controller pin of motion sensor 204) indicating that motion data values measured by motion sensor 204 has exceeded a motion data threshold value, such as for the duration defined by duration value associated with the motion data threshold value. For example, each of one or more motion data threshold values and associated duration values may be further associated with a different signal that motion sensor 204 may to provide to controller 202 for control of the variable blink rate.

UWB transmitter 206 may be configured to transmit blink data at variable blink rates. For example, UWB transmitter 206 may be configured to generate an electronic signal that includes the blink data. The electronic signal may include pulses that each occupy the UWB electromagnetic spectrum and contain the blink data. The pulses may be repeated at variable time intervals that define the variable blink rates of the blink data. UWB transmitter 206 may be connected with antenna 208 to provide the electronic signal to antenna 208 to radiate a wireless tag signal including the blink data at the variable blink rates. In some embodiments, controller 202 may be configured to perform some or all of the functionalities discussed herein for UWB transmitter 206, or vice versa. In some embodiments, UWB transmitter 206 may be configured to wirelessly transmit the blink data via a tag signal having a bandwidth of greater than at least one of (e.g., the lesser of) 500 MHz and 20% of a center frequency (e.g., for a −10 dB bandwidth). In another example, (e.g., for a −3 dB bandwidth), UWB transmitter 206 may be configured to wirelessly transmit the blink data via a tag signal having a bandwidth of greater than at least one of (e.g., the lesser of) 400 MHz and 20% of a center frequency. In some embodiments, the bandwidth may be set based on regulatory requirements for UWB communications (e.g., some regulations may allow for bandwidths that exceed 500 MHz). The tag signal may be recognizable by receiver 106 such that the location of the RF tag 200 may be determined by a tag locating system, such as receiver hub 108 and/or receiver processing and distribution system 110.

In some embodiments, the blink data may include characteristics of the tag signal that allow the tag signal to be recognized by receiver 106 so the location of RF tag 200 may be determined by the locating system. Blink data may also comprise one or more tag data packets. Such tag data packets may include any data from RF tag 200 that may be intended for transmission such as a tag identifier (or "tag unique identifier" or "UID"), tag data, and/or a tag-individual correlator. In some embodiments, the tag data packets may not include any individual data (e.g., the tag-individual correlator) and the association between individuals and tag identifiers may be performed downstream, such as by receiver hub 108 and/or system 110. In the case of time difference of arrival (TDOA) systems, the blink data may be or include a specific pattern, code, or trigger that receiver 106 (or downstream receiver processing and analytics system) detects to identify that the transmission is from a particular RF tag 200. In some embodiments, the blink data may include sensor data generated by one or more sensors (e.g., sensors 312 and 304 shown in FIG. 3 for RF tag 300), such as orientation data and/or motion data values. In some embodiments, the blink data may include status indicators such as a blink rate status change indication that may be included in one or more blink data pulses subsequent to a change in the blink rate. The blink rate status change indication may further indicate the adjusted blink rate. In another example, blink data may include orientation status change indication configured to indicate change in the orientation of the RF tag and/or the new orientation of the RF tag. The orientation status change indication may be included in one or more blink data pulses subsequent to a change in the orientation of the RF tag (e.g., as determined based on measurements from the motion sensor).

Antenna 208 may be configured to receive the electronic signal from UWB transmitter 206 to facilitate the transmission of the blink data at variable blink rates. Antenna 208 may include one or more radiating elements configured to radiate the UWB tag signal. In some embodiments, antenna 208 may include an antenna system configured to provide enhanced transmission range and/or higher throughputs, such as a multi-input and multi-output (MIMO) antenna system and/or other multiple antenna system.

Power supply 210 may be configured to provide power to some or all of the other components of RF tag 200. Power supply 210 may be connected with one or more components, although only a connection with controller 202 is shown in FIG. 2 to avoid unnecessarily overcomplicating the disclosure. Power supply 210 may include one or more batteries, one or more other energy storage devices, and/or power control circuitry (e.g., power converters, voltage boosts, voltage regulators, etc.). In some embodiments, RF tag 200 may be configured to receive primary and/or backup power from a solar panel, motion generator, and/or an RFID signal. In some embodiments, RF tag 200 may be configured to receive primary and/or backup power from the heat and/or moisture generated by an object attached with RF tag 200. For example, heat or moisture may be used to provide primary power, while power supply 210 (e.g., one or more batteries) may provide backup and/or auxiliary power.

In some embodiments, RF tag 200 may include front end 212. Front end 212 may include a wireless communication interface and/or a wired communication interface to allow configuration of RF tag 200 and its functionality. For example, front end 212 may be configured to provide a 125 KHz wireless receiver channel that allows for the configuration of controller 202 as discussed herein, such as via a wireless wand module, other tags (e.g., a wireless mesh network), receivers 106, and/or any other suitable source. Various suitable type of wireless receiver technology may be used for front end 212 including electromagnetic, Bluetooth, WiFi, UWB, near field communication, etc. In another example, front end 212 may include a universal serial bus (USB), Ethernet, and/or other wired power (e.g., to charge a power supply 210) and/or data interface that can be connected with another programming device. Some example types of data or configurations that may be provided via front end 212 may include the tag identifier and/or other tag data, blink rates, motion signatures, and/or data for controlling blink rates based on tag motion (e.g., associations between motion data values and/or signatures with various blink rates, blink rate control data, acceleration magnitude threshold values, tag-individual correlator, etc.).

FIG. 3 shows schematic block diagram of an example RF tag 300, in accordance with some embodiments. RF tag 300 may include controller 302, motion sensor 304, UWB transceiver 306, antenna 308, power supply 310 and sensors 312. Some or all of the discussion above of RF tag 200 may be applicable to RF tag 300.

Sensors 312 may include one or more of a proximity detector (e.g., a near field communication (NFC) sensor, a diagnostic device, a triangulation positioner, a proximity interrogator, an eye dilation sensor (e.g., positioned in glasses or a visor proximate to the eyes), a hydration sensor configured to monitor sweat loss or sweat loss rate (e.g., positioned in a body suit or shirt proximate the back), a heat sensor, an accelerometer for measuring acceleration (e.g., which may be the same or different component from motion sensor 304), an environmental sensor for measuring environmental measurements such as outside temperature, humidity, barometric pressure, wind speed, air quality or composition, a heart rate sensor, a blood pressure monitor, a blood chemistry sensor configured for monitoring levels of one or more of carbon dioxide, oxygen, potassium, calcium, sodium, hematocrit, temperature and pH, etc. In some embodiments, sensor data from sensor 312 may be transmitted (e.g., as blink data and/or as separate data) to a receiver.

Another type of sensor may include a triangulation positioner. A "triangulation positioner" is a type of sensor that senses position. In some embodiments, the triangulation positioner (also known as a global positioning system (GPS) receiver) may be configured to receive clock data transmitted by one or more geostationary satellites (a satellite in a known or knowable position) and/or one or more ground based transmitters (also in known or knowable positions), compare the received clock data, and compute a "position calculation". The position calculation may be included among sensor data that may be transmitted (e.g., as blink data via the UWB tag signal and/or as separate data) to a receiver.

In another embodiment, a triangulation positioner may include one or more cameras or image-analyzers that receive emitted or reflected light or heat, and then analyzes the received images to determine the location of an object or sensor. Although a triangulation positioner may transmit data wirelessly, it is not an RF tag because it does not transmit a TOA timing pulse or a tag signal that can be used by receiver hub 108 to calculate location. In contrast, a triangulation positioner senses position and computes a position calculation itself that may then be used by receiver hub 108 to enhance and/or improve its tag location data.

In some embodiments, one or more of sensors 312 may be co-located with RF tag 300 or may be located elsewhere on the individual or object attached with RF tag 300 As such, sensors 312 may provide sensor data for monitoring health, fitness, operation and/or performance, which is also referred to herein as health data. In some embodiments, sensor derived data from any type of sensor may leverage communications over the tag signal communication channel (e.g., a UWB communications channel), such as to receivers 106. In that sense, the system may be configured to backhaul some or all sensor data over the tag signal (e.g., UWB) communications channel.

UWB transceiver 306 may be configured to perform some or all of the functionality discussed herein for UWB transmitter 206. UWB transceiver 306 may further include a UWB receiver. In some embodiments, the receiver may be an RF receiver that does not use UWB signals. Here, the RF tag may include a UWB transmitter and a separate receiver. The UWB receiver (and/or other RF receiver) may be configured to wirelessly receive data (e.g., via antenna 308) from receiver 106, receiver hub 108, and/or receiver processing and distribution system 110, or some other communication source for server-side control of the variable blink rate of tag 300, among other things. For example, the UWB receiver may be configured to receive blink rate control data. Controller 302 may be further configured to determine the blink rate for the UWB transmitter based on the blink rate control data. In some embodiments, UWB transceiver 306 may include a separate UWB transmitter and UWB receiver circuitry and/or hardware.

In some embodiments, RF tag 300 may further include front end 314, for which the discussion above regarding front end 212 may be applicable. In some embodiments, such as where UWB transceiver 306 and/or other UWB receiver is used, front end 314 (e.g., as a wireless receiver) may be omitted. Similarly, where a front end is used to program RF tag 200, RF tag 200 may not include a UWB receiver or UWB transceiver.

Example Tag/Sensor Positioning and Participant Correlation

FIG. 1 shows a monitored area 120. Monitored area 120 may include a plurality of positions at one or more time epochs. The plurality of positions may be divided into one or more regions, called zones. Each zone may be described by one or more coordinate systems, such as a local NED (North-East-Down) system, a latitude-longitude system, or even a yard line system as might be used for an American football game. A location is a description of a position, or a plurality of positions, within the monitored area. For example, a field marker at the intersection of the south goal line and west out of bounds line at Bank of America Stadium in Charlotte, N.C. could be described as {0,0,0} in a local NED system, or 35.225336 N 80.85273 W longitude 751 ft. altitude on a latitude-longitude system, or simply "Panthers Goal Line" in a yard line system. Because different types of locating systems or different zones within a single locating system may use different coordinate systems, a Geographical Information System or similar monitored area database may be used to associate location data. One type of Geographical Information System describing at least a field of play may be called Field Data.

FIGS. 4A-C show some exemplary objects that may provide information to a performance analytics system in accordance with some embodiments. FIG. 4A shows a player 402 (e.g., a football player) wearing equipment having attached RF tags 102 in accordance with some embodiments. In particular, the depicted player 402 is wearing shoulder pads having tags 102 affixed to opposite sides thereof. This positioning may advantageously provide an elevated broadcast position for each RF tag 102 thereby increasing its communication effectiveness.

Additional sensors 312 may be attached to equipment worn by player 402, such as accelerometers, magnetometers, time-of-flight sensors, health monitoring sensors (e.g., blood pressure sensors, heart monitors, respiration sensors, moisture sensors, temperature sensors, etc.), light sensors, among other things. The additional sensors 312 may be affixed to shoulder pads, the helmet, the shoes, rib pads, elbow pads, the jersey, the pants, a bodysuit undergarment, gloves, arm bands, wristbands, and the like. In some embodiments, motion sensor 304 may alternatively or additionally be located separate from tag 102, such as in the locations discussed herein for sensors 312.

Sensors 312 (and/or motion sensor 304) may be configured to communicate with receivers (e.g., receivers 106 of FIG. 1) directly and/or indirectly through RF tags 102 or other transmitters. For example, in one embodiment, a sensor 312 may be connected, wired (e.g., perhaps through wires sewn into a jersey or bodysuit undergarment) or wirelessly, to RF tags 102 to provide sensor data to RF tags 102, which is then transmitted to receivers 106 as blink data of the tag signal. In some embodiments, a plurality of sensors (not shown) may be connected to a dedicated antenna and/or transmitter (e.g., positioned in the helmet) which may transmit the sensor data to one or more receivers.

FIG. 4B shows a game official 406 wearing equipment having attached RF tags 102 and sensors 312 in accordance with some embodiments. In the depicted embodiment, RF tags 102 may be attached to the official's jersey proximate opposite shoulders. Sensors 312 may be positioned in wristbands worn on the official's wrists as shown. Sensors 312 may be configured to communicate with receivers (e.g., receivers 106 of FIG. 1) directly or indirectly through RF Tags 102 and/or other transmitters as discussed above in connection with FIG. 4A.

As discussed in greater detail below, the positioning of sensors 312 (e.g., an accelerometer) proximate the wrists of the official may allow the receiver processing and distribution system 110 to determine particular motions, movements, or activities of official 406 for use in determining events (e.g., winding of the game clock, first down, touchdown, or the like). Official 406 may also carry other equipment, such as penalty flag 408, which may also include an RF tag 102 attached to provide additional data to receiver processing and distribution system 110. For example, receiver processing and distribution system 110 may use tag location data from the penalty flag 408 to determine when the official is merely carrying the penalty flag 408 versus when the official is using the penalty flag 408 to indicate an event, such as a penalty (e.g., by throwing the penalty flag 408).

FIG. 4C shows an example of a ball 410 having tags 102 attached or embedded in accordance with some embodiments. Additionally, sensors 312 may be attached to or embedded in ball 410, such as accelerometers, time-of-flight sensors, etc. In some embodiments, the sensor 312 may be connected, wired or wirelessly, to RF tag 102 to provide sensor data to RF tag 102 which is then transmitted to the receivers 106 (e.g., as part of the blink data of the UWB tag signal). In some embodiments, sensor 312 may transmit sensor data to receivers separately from the tag 102, such as described above in connection with FIG. 4A.

In some embodiments, subsequent to RF tags 102 and/or sensors 312 of FIGS. 4A-4C are attached to objects, they may be correlated to such objects. For example, in some embodiments, tag identifier and/or sensor identifiers ("unique IDs") may be correlated to an object profile (or "participant profile," where the object is a participant) (e.g., John Smith—running back, Fred Johnson—line judge official, or ID 027—one of several game balls, etc.) and stored to a remote database accessible to the performance analytics system as discussed in greater detail below. Each participant profile may further include or be correlated with a variety of data including, but not limited to, biometric data (e.g., height, weight, health data, etc.), role data, team ID, performance statistics, among other things.

In some embodiments, such participant profile or role data may be pre-defined and stored in association with the unique tag or sensor identifiers. In other embodiments, the participant profile or role data may also be "learned" by the system as a result of received tag or sensor data, formation data, play data, event data, and/or the like. For example, in some embodiments the system may determine that a tag or sensor is not correlated to a participant profile and may analyze data received from the tag and/or sensor to determine possible participant roles, etc., which may be ranked and then selected/confirmed by the system or by a user after being displayed by the system. In some embodiments, the system may determine possible participant roles (i.e., participant role data) based on determined participant location data (e.g., movement patterns, alignment position, etc.).

In some embodiments, as described in greater detail below, the participant profile or role data may also be updated by the system (i.e., to produce a data set for the participant that is far more robust than that established at initial registration) as a result of received tag or sensor data, formation data, play data, event data, and/or the like. In some embodiments, the participant profile and/or role data may be used in a performance analytics system to weight the actions of the participants during analysis to assist in qualifying what is occurring, such as in determining formations, plays, events, etc.

Tag ID and Sensor Data Transmission Architecture

FIGS. 5A-5E show block diagrams of various different architectures that may be utilized in transmitting signals from one or more tags and sensors to one or more receivers of a receiver processing and analytics system in accordance with embodiments of the invention. In some embodiments, the depicted architectures may be used in connection with receiver processing and analytics system 110 of FIG. 1. In some embodiments, one or more of these architectures may be used together in a single system.

Figure 5A:
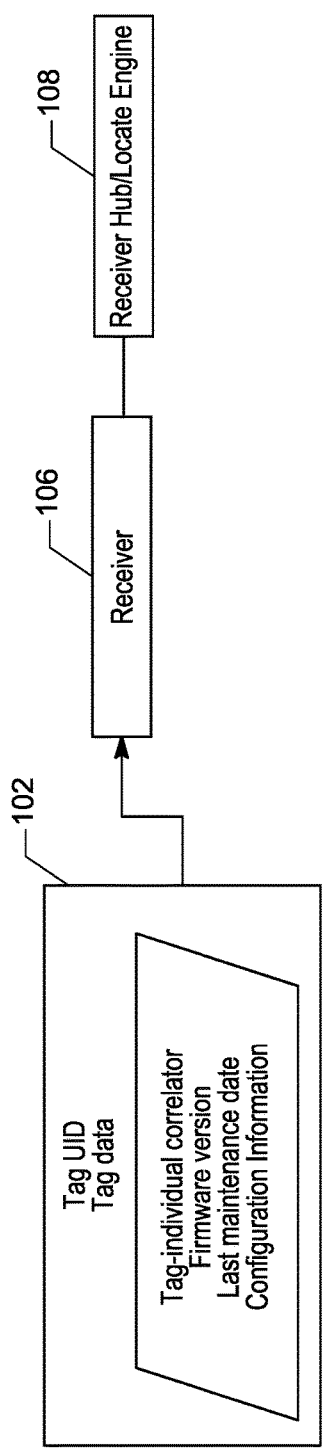

FIG. 5A shows RF tag 102 which may be configured to transmit a tag signal to one or more receivers 106 (e.g., as also shown in FIG. 1). The one or more receivers 106 may transmit a receiver signal to the receiver hub/locate engine 108.

RF tag 102 may generate and/or store (e.g., in a memory) a tag identifier ("tag UID") and/or tag data as shown. The tag data may include useful information such as version information (e.g., installed firmware version), maintenance information (e.g., last tag maintenance date), configuration information, and/or a tag-individual correlator. The tag-individual correlator may comprise data that indicates that a monitored object (e.g., participant) is associated with a particular RF tag 102 (e.g. name, uniform number and team, biometric data, tag position on individual, i.e., right wrist). In some embodiments, the tag-individual correlator may be stored by RF tag 102 when the tag is registered or otherwise associated with an individual. While shown as a separate field for illustration purposes, one of ordinary skill in the art may readily appreciate that the tag-individual correlator may be part of any tag data or even omitted from the tag data.

The tag signal transmitted from RF location tag 102 to receiver 106 may include "blink data" as it is transmitted at selected intervals. This "blink rate" may be set by the tag designer or the system designer to meet application requirements and/or may be variable as described herein. In some embodiments, the variable blink rates may be consistent for one or all tags and/or may be data dependent. Blink data, as discussed above, may include characteristics of the tag signal that allow the tag signal to be recognized by receiver 106 so the location of the RF location tag 102 may be determined by the locating system. Blink data may also comprise one or more tag data packets. Such tag data packets may include any data from the tag 102 that is intended for transmission such as, for example in the embodiment shown in FIG. 5A, a tag UID, tag data, and/or a tag-individual correlator. The blink data may be or include a specific pattern, code, or trigger that the receiver 106 (or downstream receiver processing and analytics system) detects to identify that the transmission is from an RF tag 102 (e.g., a UWB tag).

Receiver 106 may be configured to wirelessly receive the tag signal, which may include the blink data and tag data as discussed above. In some embodiments, receiver 106 may pass the received tag signal directly to the receiver hub/locate engine 108 as part of its receiver signal. In some embodiment, the receiver 106 may perform processing on the received tag signal. For instance, the receiver could extract blink data and/or tag data from the tag signal and transmit the blink data and/or tag data to receive hub/locate engine 108. The receiver may transmit a time measurement to receive hub/locate engine 108 such as a TOA measurement and/or a TDOA measurement. The time measurement could be based on a clock time generated or calculated in the receiver, it could be based on a receiver offset value as explained above, it could be based on a system time, and/or it could be based on the time difference of arrival between the tag signal of RF tag 102 and the tag signal of an RF reference tag (e.g., tag 104 of FIG. 1). Receiver 106 may be configured to additionally or alternatively determine a signal measurement from the tag signal (such as a received signal strength indication (RSSI), a direction of signal, signal polarity, or signal phase) and transmit the signal measurement to receive hub/locate engine 108.

Figure 5B:
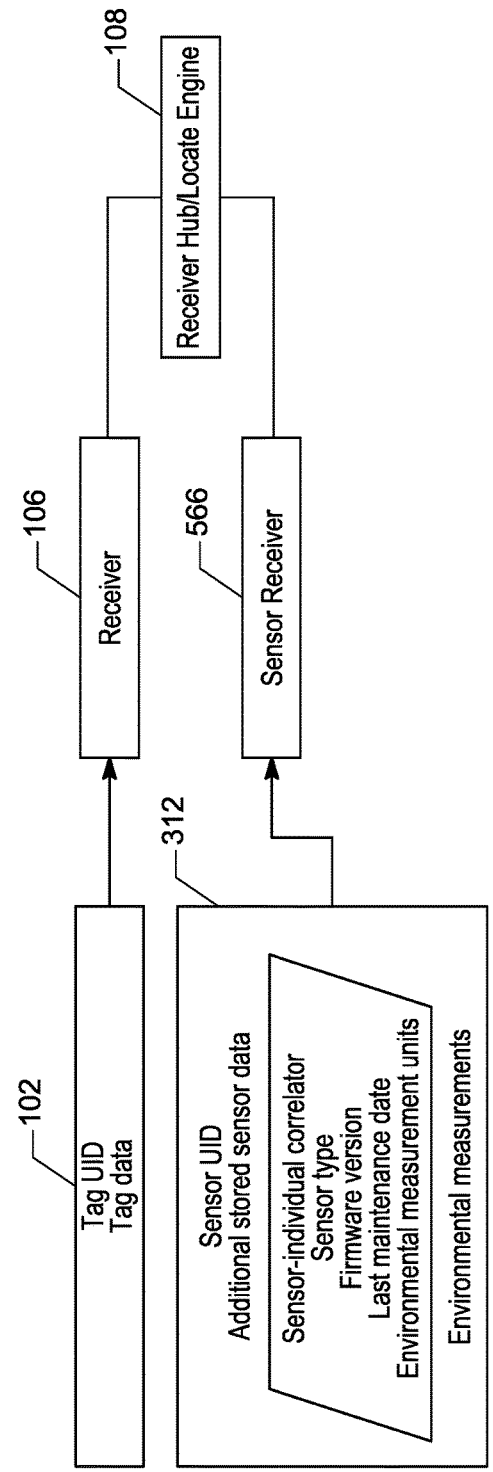

FIG. 5B shows RF tag 102 and sensor 312, which may be configured to transmit tag signals and sensor signals, respectively, to one or more receivers 106 and 566. Receivers 566 may include receivers that are dedicated for receiving sensor data while receiver 106 may be configured to receive tag data. The one or more receivers 106 and 566 may then transmit receiver signals to receiver hub/locate engine 108. In some embodiments, one or more receivers 106 and/or 566 may share physical components, such as a housing and/or antenna.

The depicted RF tag 202 may comprise a tag UID and tag data (such as a tag-individual correlator) and transmit a tag signal comprising blink data as discussed in connection with FIG. 5A above. Sensor 312 may generate and/or store a sensor UID, sensor metadata (e.g. a sensor-individual correlator, sensor type, sensor firmware version, last maintenance date, the units in which environmental measurements are transmitted, etc.), and (e.g., measured) sensor data. In some embodiments, the "additional stored sensor data" of the sensor 312 may include any data that is intended for transmission, such as to RF tag 102, a reference tag (e.g., 104 of FIG. 1), a sensor receiver 566, a receiver 106, and/or the receiver/hub locate engine 108.

Sensors such as sensor 312 may be configured to sense and/or determine one or more environmental conditions (e.g., temperature, pressure, pulse, heartbeat, rotation, velocity, acceleration, radiation, position, chemical concentration, voltage, motion) and store or transmit the "environmental measurements" as sensor data that is indicative of such conditions. To clarify, the term "environmental measurements" includes measurements concerning the environment proximate the sensor including, without limitation, ambient information (e.g., temperature, position, humidity, etc.), information concerning an individual's health, fitness, operation, and/or performance, and/or the motion data values (e.g., indicating motion of the RF tag) captured by a motion sensor. Environmental measurements may be stored or transmitted in either analog or digital form and may be transmitted as individual measurements, as a set of individual measurements, and/or as summary statistics. For example, temperature in degrees Celsius may be transmitted as {31}, or as {33, 32, 27, 22, 20, 23, 27, 30, 34, 31}, or as {27.9}. In some embodiments, the sensor-individual correlator could be determined at least in part from one or more environmental measurements.

As shown in FIG. 5B, RF tag 102 may be configured to transmit the tag signal to receiver 106 and sensor 203 may be configured to transmit a sensor signal to sensor receiver 566. The sensor signal may comprise one or more sensor information packets. Such sensor information packets may include any sensor data or information from the sensor 312 that may be intended for transmission such as, for example in the depicted embodiment, sensor UID, additional stored sensor data, sensor-individual correlator, and/or environmental measurements (e.g., including motion data values). A receiver signal from receiver 106 and a sensor receiver signal from sensor receiver 566 may be transmitted via wired or wireless communication to receiver hub/locate engine 108 as shown.

FIG. 5C depicts sensor 312 communicating through RF tag 102 in accordance with some embodiments. In some embodiments, one or more sensors 312 may be part of (i.e., reside in the same housing or assembly structure) of RF tag 102. For example, motion sensor 204 may reside in an assembly structure of RF tag 200 that includes (e.g., among other things) controller 202, UWB transmitter 206, and/or antenna 208. Alternatively or additionally, one or more sensor 203 may be distinct from (i.e., not resident in the same housing or assembly structure) RF tag 102 but configured to communicate wirelessly or via wired communication with RF tag 102.

In some embodiments, RF tag 102, the sensor 312, or both, may generate and/or store a tag-sensor correlator that indicates an association between an RF tag 102 and a sensor 312 (e.g., tag UID/sensor UID, distance from tag to sensor in a particular stance, set of sensors associated with a set of tags, sensor types associated with a tag, etc.). In some embodiments, both RF tag 102 and sensor 312 may be configured to store the tag-sensor correlator.

In some embodiments, sensor 312 may be configured to transmit sensor data (e.g., stored and/or measured) via a sensor signal to RF tag 102. The sensor signal may comprise one or more sensor information packets. For example, the sensor information packets may comprise the sensor UID, a sensor-individual correlator, additional stored sensor data, the tag-sensor correlator, and/or the environmental measurements. RF tag 102 may be configured to store some portion of, or all of, the sensor information packets locally and may package the sensor information packets into one or more tag data packets for transmission to receiver 106 as part of a tag signal or simply pass them along as part of the tag signal. In that sense, blink data that is transmitted by tag 102 at variable blink rates may include sensor data received from one or more sensors (e.g., motion sensor 304 and/or sensors 312 of FIG. 3).

FIG. 5D illustrates an example communication structure for a reference tag 504 (e.g., reference tag 104 of FIG. 1), an RF location tag 502, a sensor 503, and two receivers 506 in accordance with one embodiment. The depicted reference tag 504 is an RF location tag and thus may include tag data, a tag UID, and is capable of transmitting tag data packets. In some embodiments, the reference tag 504 may form part of a sensor and may thus be capable of transmitting sensor information packets.

The depicted sensor 503 transmits a sensor signal to RF reference tag 504. The RF reference tag 504 may store some portion or some or all of the sensor information packets locally and may package the sensor information packets into one or more tag data packets for transmission to receiver 506 as part of a tag signal, or simply pass them along as part of its tag signal.

As was described above in connection with FIG. 1, the receivers 506 of FIG. 5D are configured to receive tag signals from the RF location tag 502 and the reference tag 504. Each of these tag signals may include blink data, which may comprise tag UIDs, tag data packets, and/or sensor information packets. The receivers 506 each transmit receiver signals via wired or wireless communication to the receiver hub/locate engine 508 as shown.

Figure 5E:
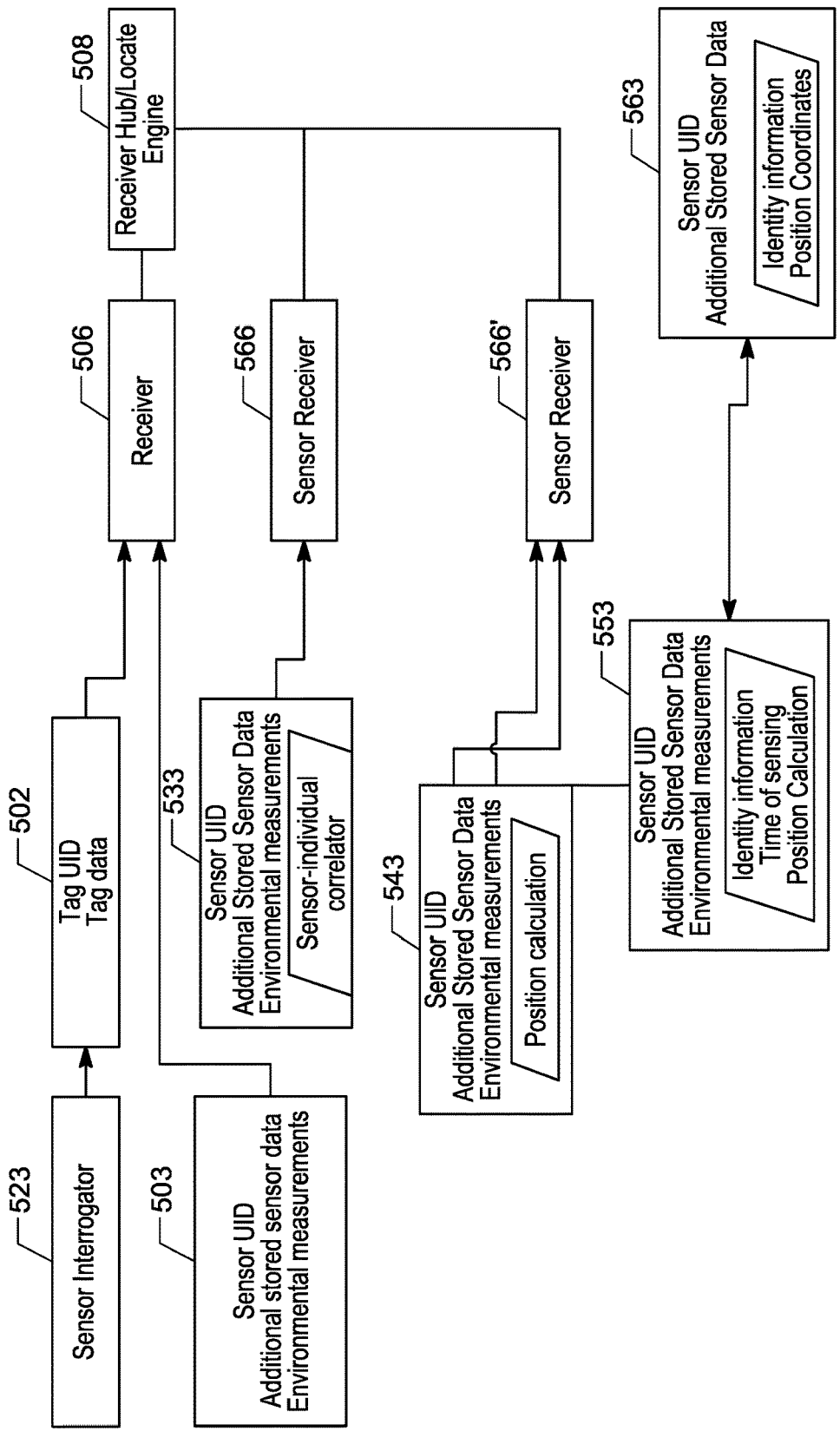

FIG. 5E illustrates an example communication structure between an RF location tag 502, a plurality of receivers 506, and a variety of sensor types including, without limitation, a sensor 503, a diagnostic device 533, a triangulation positioner 543, a proximity positioner 553, and a proximity label 563 in accordance with various embodiments. In the depicted embodiment, none of the sensors 503, 533, 543, 553 form part of an RF location tag 502 or reference tag 504. However, each may comprise a sensor UID and additional stored sensor data. Each of the depicted sensors 503, 533, 543, and 553 transmits sensor signals comprising sensor information packets.

In the depicted embodiment, receiver 506 is configured to receive a tag signal from RF location tag 502 and a sensor signal directly from sensor 503. In such embodiments, sensor 503 may be configured to communicate in a communication protocol that is common to RF location tag 502 as will be apparent to one of ordinary skill in the art in view of this disclosure.

FIG. 5E depicts one type of sensor referred to herein as a "proximity interrogator". The proximity interrogator 523 can include circuitry operative to generate a magnetic, electromagnetic, or other field that is detectable by an RF location tag 502. While not shown in FIG. 3E, a proximity interrogator 523 may include a sensor UID and other tag and sensor derived data or information as discussed above.

In some embodiments, the proximity interrogator 523 is operative as a proximity communication device that can trigger an RF location tag 502 (e.g., when the RF location tag 502 detects the field produced by the proximity interrogator 523) to transmit blink data under an alternate blink pattern or blink rate. The RF location tag can initiate a preprogrammed (and typically faster) blink rate to allow more location points for tracking an individual. In some embodiments, the RF location tag may not transmit a tag signal until triggered by the proximity interrogator 523. In some embodiments the RF location tag 502 may be triggered when the RF location tag 502 moves near (e.g., within communication proximity to) a proximity interrogator 523. In some embodiments, the RF location tag may be triggered when the proximity interrogator 523 moves near to the RF location tag 502.

In other embodiments, the RF location tag 502 may be triggered when a button is pressed or a switch is activated on the proximity interrogator 523 or on the RF location tag itself. For example, a proximity interrogator 523 could be placed at the start line of a racetrack. Every time a car passes the start line, a car-mounted RF location tag 502 senses the signal from the proximity interrogator and is triggered to transmit a tag signal indicating that a lap has been completed. As another example, a proximity interrogator 523 could be placed at a Gatorade cooler. Each time a player or other participant fills a cup from the cooler a participant-mounted RF location tag 502 senses the signal from the proximity interrogator and is triggered to transmit a tag signal indicating that Gatorade has been consumed. As another example, a proximity interrogator 523 could be placed on a medical cart. When paramedics use the medical cart to pick up a participant (e.g., a player) and move him/her to the locker room, a participant-mounted RF location tag 502 senses the signal from the proximity interrogator and is triggered to transmit a tag signal indicating that they have been removed from the game. As explained, any of these post-triggered tag signals may differ from pre-triggered tag signals in terms of any aspect of the analog and/or digital attributes of the transmitted tag signal.

FIG. 5E depicts another type of sensor that is generally not worn by an individual but is referred to herein as a "diagnostic device". However, like other sensors, diagnostic devices may measure one or more environmental conditions and store corresponding environmental measurements in analog or digital form.

While the depicted diagnostic device 533 is not worn by an individual, it may generate and store a sensor-individual correlator for association with environmental measurements taken in connection with a specific individual. For example, in one embodiment, the diagnostic device 533 may be a blood pressure meter that is configured to store as environmental measurements blood pressure data for various individuals. Each set of environmental measurements (e.g., blood pressure data) may be stored and associated with a sensor-individual correlator.

The depicted diagnostic device 533 is configured to transmit a sensor signal comprising sensor information packets to a sensor receiver 566. The sensor information packets may comprise one or more of the sensor UID, the additional stored data, the environmental measurements, and/or the sensor-individual correlator as discussed above. The sensor receiver 566 may associate some or all of the data from the sensor information packets with other stored data in the sensor receiver 566 or with data stored or received from other sensors, diagnostic devices, RF location tags 502, or reference tags. The sensor receiver 566 transmits a sensor receiver signal to a receiver hub/locate engine 508.

Another type of sensor shown in FIG. 5E is a triangulation positioner 543. A "triangulation positioner" is a type of sensor that senses position. The depicted triangulation positioner 543 includes a sensor UID, additional stored sensor data, and environmental measurements as discussed above.

In some embodiments, a triangulation positioner (also known as a global positioning system (GPS) receiver) receives clock data transmitted by one or more geostationary satellites (a satellite in a known or knowable position) and/or one or more ground based transmitters (also in known or knowable positions), compares the received clock data, and computes a "position calculation". The position calculation may be included in one or more sensor information packets as environmental measurements.

In another embodiment, a triangulation positioner comprises one or more cameras or image-analyzers that receive emitted or reflected light or heat, and then analyzes the received images to determine the location of an individual or sensor. Although a triangulation positioner may transmit data wirelessly, it is not an RF location tag because it does not transmit blink data or a tag signal that can be used by a receiver hub/locate engine 508 to calculate location. In contrast, a triangulation positioner senses position and computes a position calculation that may then be used as environmental measurements by the receiver hub/locate engine 508.

In one embodiment, a triangulation positioner could be combined with an RF location tag or reference tag (not shown). In such embodiments, the triangulation positioner could compute and transmit its position calculation via the RF location tag to one or more receivers. However, the receiver hub/locate engine would calculate tag location based on the blink data received as part of the tag signal and not based solely on the position calculation. The position calculation would be considered as environmental measurements and may be included in associated sensor information packets.

As will be apparent to one of ordinary skill in the art, position calculations (e.g., GPS receiver position calculations) are not as accurate as the location calculations (e.g., UWB waveform based location calculations) performed by receiver hub/locate engines structured in accordance with various embodiments of the invention. That is not to say that position calculations may not be improved using known techniques. For example, a number of influences, including atmospheric conditions, can cause GPS accuracy to vary over time. One way to control this is to use a differential global positioning system (DGPS) comprising one or a network of stationary triangulation positioners that are placed in a known position, and the coordinates of the known position are stored in memory as additional stored sensor data. These triangulation positioners receive clock data from geostationary satellites, determine a position calculation, and broadcast a difference between the position calculation and the stored coordinates. This DGPS correction signal can be used to correct for these influences and significantly reduce location estimate error.

Another type of sensor shown in FIG. 5E is a proximity detector 553. A "proximity detector" is a type of sensor that senses identity within an area (e.g., a local area) that is small with respect to the monitored area 100 of FIG. 1. Many different ways of sensing identity (e.g., a unique ID or other identifier for a sensed object or individual) would be apparent to one of ordinary skill in the art in view of this disclosure including, without limitation, reading a linear bar code, reading a two-dimensional bar code, reading a near field communication (NFC) tag, reading an RFID tag such as a UHF tag, HF tag, or low frequency tag, an optical character recognition device, a biometric scanner, or a facial recognition system.

In some embodiments, a proximity detector senses an attribute of an individual (or an individual's wristband, tag, label, card, badge, clothing, uniform, costume, phone, ticket, etc.). The identity sensed by a proximity detector may be stored locally at the proximity detector 553 as shown and transmitted as environmental measurements via one or more sensor information packets to a sensor receiver 566.

In some embodiments, a proximity detector 553 may have a defined position, which is often stationary, and may be associated with a location in the monitored area 100 of FIG. 1. For example, a proximity detector 553 could be located at a finish line of a race track, an entrance gate of a stadium, with a diagnostic device, at a goal line or goal post of a football field, at a base or home plate of a baseball diamond, or a similar fixed location. In such embodiments where the proximity detector is stationary, the position coordinates of the proximity detector and a sensor UID could be stored to a monitored area database (not shown) that is accessible by one or more of the receivers 506, 566, the receiver hub/locate engine 508, and/or other components of the receiver processing and analytics system 110. In embodiments where the proximity detector is movable, a position calculation could be determined with a triangulation positioner, or the proximity detector could be combined with an RF location tag and located by the receiver hub/locate engine 508. While shown as separate fields for illustration purposes in FIG. 5E, identify information and position calculation could comprise part of the additional stored sensor data, the environmental measurements, or both.

In one embodiment, the proximity detector could be associated with a reference tag (e.g., tag 104 of FIG. 1)

whose position is recorded in the monitored area database. In other embodiments, the proximity detector is movable, such that it may be transported to where it is needed. For example, a proximity detector 553 could be located on a medical cart, first down marker, a diagnostic device, goal post, or carried by a paramedic or security guard. In an embodiment where the proximity detector 553 is movable it would typically be associated with an RF location tag or triangulation positioner so that location (for an RF location tag) or position (for a triangulation positioner) can be determined at the time identity is sensed.

In the embodiment where the proximity detector includes an RF location tag, the receiver hub/locate engine 508 would locate the associated RF location tag, and a tag data/sensor data filter would associate the tag location data for the associated RF location tag as the position of the proximity detector, while determining the identity of an associated individual from any received sensor information packets. In the alternate embodiment where the proximity detector includes a triangulation positioner, the triangulation positioner would compute a position calculation that could be stored as additional stored sensor data and/or environmental measurements, and transmitted as one or more sensor information packets. In one embodiment, sensor information packets for a proximity detector may include both sensed identity information and a position calculation.

Another type of sensor shown in FIG. 5E is a proximity label 563. A proximity label has a fixed position and an identification code (e.g., a sensor UID). The proximity label 563 may further comprise additional stored sensor data as shown. The depicted proximity label 563 is configured to be read by proximity detector 553. In some embodiments, proximity detector 553 may be further configured to write information to proximity label 563.

A proximity label 563 may be a sticker, card, tag, passive RFID tag, active RFID tag, NFC tag, ticket, metal plate, electronic display, electronic paper, inked surface, sundial, or otherwise visible or machine readable identification device as is known in the art. The coordinates of the position of the proximity label 563 are stored such that they are accessible to the receive hub/locate engine 508. For example, in one embodiment, the position coordinates of a proximity label 563 could be stored in a field database or monitored area database accessible via a network, or stored locally as additional stored data in the proximity detector 553.

In some embodiments, a position of the proximity label 563 is encoded into the proximity label 563 itself. For example, coordinates of a position of the proximity label 563 could be encoded into a passive RFID tag that is placed in that position. As another example, the coordinates of a position of the proximity label 563 could be encoded into a printed barcode that is placed in that position. As another example, a proximity label 563 comprising a NFC tag could be encoded with the location "end zone", and the NFC tag could be placed at or near an end zone at Bank of America stadium. In some embodiments, the stored coordinates of the proximity label 563 may be offset from the actual coordinates of the proximity label 563 by a known or determinable amount.

In one embodiment, a proximity label 563 such as an NFC tag may be encoded with a position. When a sensor such as a proximity detector approaches the NFC tag it may read the position, then transmit the position in a sensor information packet to the sensor receiver 566' and eventually to the receiver hub/locate engine 108. In another embodiment, a proximity label 263 such as a barcode label may be encoded with an identification code. When a smartphone with a proximity detector (such as a barcode imager) and a triangulation positioner (such as a GPS chip, GPS application, or similar device) approaches the barcode label it may read the identification code from the barcode, determine a position calculation from received clock data, then transmit the identity and the position calculation to sensor receiver 566' and eventually to the receiver hub/locate engine 106 as part of one or more sensor information packets.

In the depicted embodiment, triangulation positioner 543 and proximity detector 553 are each configured to transmit sensor signals carrying sensor information packets to sensor receiver 566'. The depicted sensors 543, 553, like any sensor discussed herein, may transmit sensor signals via wired or wireless communication protocols. For example, any proprietary or standard wireless protocol (e.g., 802.11, Zigbee, ISO/IEC 802.15.4, ISO/IEC 18000, IrDA, Bluetooth, CDMA, or any other protocol) could be used for the sensor signals. Alternatively or additionally, any standard or proprietary wired communication protocol (e.g., Ethernet, Parallel, Serial, RS-232, RS-422, USB, Firewire, I$^2$C, etc.) may be used. Similarly, sensor receiver 166', and any receiver discussed herein, may use similar wired and wireless protocols to transmit receiver signals to the receiver hub/locate engine.

In one embodiment, upon receiving sensor signals from the triangulation positioner 543 and the proximity detector 553, the sensor receiver 566' may associate some or all of the data from the received sensor information packets with other data stored to the sensor receiver 566', or with data stored or received from other sensors (e.g., sensor 503), diagnostic devices 533, RF location tags 502, or RF reference tags 504. Such associated data is referred to herein as "associated sensor data". In the depicted embodiment, the sensor receiver 566' is configured to transmit some or all of the received sensor information packets and any associated sensor data to the receiver hub/locate engine 508 at part of a sensor receiver signal.

In one embodiment, a smartphone comprising a proximity detector (such as a barcode imager) and a triangulation positioner (such as a GPS chip) may associate an identification code determined from a barcode with a position calculation from received clock data as associated sensor data and transmit a sensor information packet that includes such associated sensor data to the receiver hub/locate engine 508. In another embodiment, the smartphone could transmit a first sensor information packet including the identification code and the smartphone's unique identifier to another sensor receiver, the smartphone could transmit a second sensor information packet including the position calculation and the smartphone's unique identifier to the sensor receiver, and the sensor receiver could associate the position calculation with the identification code based on the common smartphone unique identifier and transmit such associated sensor data to the receiver hub/locate engine 508. In another embodiment, the sensor receiver could determine a first time measurement associated with the first sensor information packet and a second time measurement associated with the second sensor information packet that, in conjunction with the sensor UID, could be used, by the receiver hub/locate engine 508, to associate the first sensor information packet with the second sensor information packet.

In one embodiment, the receiver hub/locate engine 508 receives receiver signals from the receiver 506 and sensor receiver signals from the sensor receivers 566, 566'. In the depicted embodiment, receiver 506 may receive blink data from the RF location tag 502 and transmits to the receiver hub/locate engine 508 some or all of the blink data, perhaps with additional time measurements or signal measurements. In some embodiments, time measurements or signal measurements may be based on a tag signal received from an RF reference tag (e.g., reference tag 104 of FIG. 1). The receiver hub/locate engine 508 collects the blink data, time measurements (e.g. time of arrival, time difference of arrival, phase), and/or signal measurements (e. g. signal strength, signal direction, signal polarization, signal phase) from the receivers 506 and computes tag location data for the tags 502 as discussed above in connection with FIG. 1. In some embodiments, the receivers 506 may be configured with appropriate RF filters, such as to filter out potentially interfering signals or reflections proximate the field of play or other area to be monitored.

The receiver hub/locate engine 508 may also access stored data or clock data from local storage and from a network location. The receiver hub/locate engine 508 uses this information to determine tag location data for each RF location tag. It may also associate data derived or extracted from tag signals transmitted from one or more RF location tags with information or data derived or extracted from sensor signals transmitted from one or more sensors.

In addition to the TOA or TDOA systems previously described, other real-time location systems (RTLS) such as received signal strength indication based systems could potentially be implemented by a receiver hub/locate engine 108. Any RTLS system using RF location tags, including those described herein, could require considerable processing by the receiver hub/locate engine 108 to determine the tag location data from the blink data received from the tags. These may require time measurement and/or signal measurement in addition to blink data, which preferably includes a tag UID. In contrast, in other systems, such as global position systems (GPS) systems, location data is determined based upon the position calculation transmitted from a GPS transmitter (also referred to as a GPS receiver or GPS tag) which includes calculated information about the location where the tag was positioned (i.e., coordinates determined at the tag via satellite signal triangulation, etc.) when the position calculation was determined or stored. Thus, GPS information typically refers to additional information that is transmitted along with a GPS transmitter ID before the transmission is received by a sensor receiver.

A GPS host device or back-end server may receive the GPS information and simply parse the position calculation (as opposed to calculating the position information at the host device) and the GPS transmitter ID into a data record. This data record may be used as a GPS position calculation, or it could be converted to a different coordinate system to be used as a GPS position calculation, or it could be processed further with DGPS information to be used as a GPS position calculation.

Returning to FIG. 5C, the depicted RF location tag 102 is used to convey (sometimes called backhaul) sensor information packets to a receiver 106. In some embodiments, while not shown, multiple sensors 203 may transmit sensor signals carrying sensor information packets to RF location tag 102. Such received sensor information packets may be associated with blink data that is transmitted to receiver 106.

In one embodiment, the receiver hub/locate engine 108 may parse sensor information packets from received tag data packets and associate such sensor information packets with the RF location tag 102 that transmitted the sensor information packet. Thus, the receiver hub/locate engine 108 may be able to determine tag location data, which may comprise a location and other data (e.g., tag data, tag UID, tag-individual correlator, sensor-individual correlator, additional stored sensor data, environmental measurements, tag-sensor correlator, identity information, position calculation, etc.) from one or more tags or sensors. Such data and information may be transmitted to the receiver processing and analytics system 110.

In some embodiments, once the receiver hub/locate engine 108 determines a location estimate of an RF location tag 102 at the time epoch of the tag signal, the receiver hub/locate engine 108 can also associate a location estimate with the tag data packet included in the blink data of such tag signal. In some embodiments, the location estimate of the tag signal may be used as tag location data for the tag data packet. In some embodiments a Geographical Information System (GIS) may be used by the receive hub/locate engine 108 to refine a location estimate, or to map a location estimate in one coordinate system to a location estimate in a different coordinate system, to provide a location estimate for the tag data packet.

In one embodiment, the location estimated for the tag data packet may be associated with any data in the tag data packet, including a tag UID, other tag data, and, if included, one or more sensor information packets, including sensor UID, additional stored sensor data, and environmental measurements. Since environmental measurements may include a position calculation from a triangulation positioner (e.g., a GPS device), the receiver hub/locate engine 108 could parse the position calculation and use it to refine a location estimate for the tag data packet.

Preferably, the receiver hub/locate engine 108 may access an individual database to determine tag-individual correlators or sensor-individual correlators. Individual data (e.g., an individual profile) may be stored in a server, in tag memory, in sensor memory, or in other storage accessible via a network or communication system, including tag data or additional stored sensor data as explained previously.

In some embodiments, by comparing data accessed using a sensor-individual correlator, the receiver hub/locate engine 108 may associate an individual with a sensor information packet received from a sensor, and/or may associate an individual with such sensor. Because the receiver hub/locate engine 108 may associate a sensor position estimate with a sensor information packet, the receiver hub/locate engine 108 may also estimate an individual position for the associated individual.

In another embodiment, by comparing data accessed using a tag-sensor correlator, the receiver hub/locate engine 108 may associate a sensor with a tag data packet received from an RF location tag 102. Because the receiver hub/locate engine 108 may associate a location estimate with a tag data packet, the receiver hub/locate engine 108 may also create a sensor location estimate for the associated sensor. By comparing a location estimate for an RF location tag with a sensor location estimate or a sensor position estimate, the receiver hub/locate engine 108 may associate an RF location tag with a sensor, or may associate a tag data packet with a sensor information packet. The receiver hub/locate engine 108 could also determine a new or refined tag-sensor correlator based on this association.

In still another embodiment, by comparing a location estimate for an RF location tag with an individual location estimate or an individual position estimate, the receiver hub/locate engine 108 may associate an RF location tag with an individual, or may associate a tag data packet with an individual. The receiver hub/locate engine 108 could also determine a new or refined tag-individual correlator based on this association.

In one embodiment, by comparing a location estimate for a sensor with an individual location estimate or an individual position estimate, the receiver hub/locate engine 108 may associate a sensor with an individual, or may associate a sensor information packet with an individual. The receiver hub/locate engine 108 could also determine a new or refined sensor-individual correlator based on this association.

Data derived or extracted from tag signals transmitted from one or more RF location tags is referred to herein as "tag derived data" and shall include, without limitation, tag data, tag UID, tag-individual correlator, tag-sensor correlator, tag data packets, blink data, time measurements (e.g. time of arrival, time difference of arrival, phase), signal measurements (e. g., signal strength, signal direction, signal polarization, signal phase) and tag location data (e.g., including tag location estimates). Tag derived data is not derived by the RF location tag, but rather, is derived from information transmitted by the RF location tag. Information or data derived or extracted from sensor signals transmitted from one or more sensors is referred to herein as "sensor derived data" and shall include, without limitation, sensor UID, additional stored sensor data, sensor-individual correlator, environmental measurements, sensor information packets, position calculations (including sensor position estimates), position information, identity information, tag-sensor correlator, and associated sensor data. Data derived or extracted from stored individual data is referred to herein as "individual profile information", "participant profile information", or simply "profile information" and shall include, without limitation tag-individual correlator, sensor-individual correlator, identity information, name, uniform number and team, biometric data, tag position on individual. In various embodiments, the receiver hub/locate engine 108 may transmit tag derived data, sensor derived data, individual profile information, various combinations thereof, and/or any information from the GIS, the field database, the monitored area database, and the individual database to the receiver processing and analytics system 110.

Additional UWB transmission architectures that may in some embodiments be used for communications with the motion data controlled variable blink rate RF tags discussed herein, are described in greater detail in U.S. Pat. No. 9,002,485, titled "Method, Apparatus, And Computer Program Product For Performance Analytics Determining Play Models And Outputting Events Based On Real-Time Data For Proximity And Movement Of Objects," which is incorporated by reference in its entirety.

In some embodiments, the tag signals transmitted from the RF tags may be processed to determine tag derived data for performance analytics. For example, the processing may be performed by receiver hub 108 and/or receiver processing and distribution system 110 to provide programmatic determination, analysis, tracking, and/or presentation of player activities, game events, among other things. Additional details regarding techniques for providing performance analytics based on tag signals are described in greater detail in U.S. Pat. No. 9,002,485, incorporated by reference above.

FIG. 6 shows a schematic block diagram of example circuitry 600, some or all of which may be included in an RF tag (e.g., RF tags 102, 200, and/or 300), receiver 106, receiver hub 108, and/or receiver processing and distribution system 110. In accordance with some example embodiments, circuitry 600 may include various means, such as one or more processors 602, memories 604, communications modules 606, and/or input/output modules 608.

As referred to herein, "module" may include hardware, software and/or firmware configured to perform one or more particular functions. In this regard, the means of circuitry 600 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 604) that is executable by a suitably configured processing device (e.g., processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments, processor 602 may comprise a plurality of processing means. The plurality of processing means may be embodied on a single computing device or may be distributed across a plurality of computing devices collectively configured to function as circuitry 600. The plurality of processing means may be in operative communication with each other and may be collectively configured to perform one or more functionalities of circuitry 600 as described herein. In an example embodiment, processor 602 may be configured to execute instructions stored in memory 604 or otherwise accessible to processor 602. These instructions, when executed by processor 602, may cause circuitry 600 to perform one or more of the functionalities described herein.

Whether configured by hardware, firmware/software methods, or by a combination thereof, processor 602 may comprise an entity capable of performing operations according to embodiments of the present invention while configured accordingly. Thus, for example, when processor 602 is embodied as an ASIC, FPGA or the like, processor 602 may comprise specifically configured hardware for conducting one or more operations described herein. As another example, when processor 602 may be embodied as an executor of instructions, such as may be stored in memory 604, the instructions may specifically configure processor 602 to perform one or more algorithms, methods or operations described herein. For example, processor 602 may be configured to execute operating system applications, firmware applications, media playback applications, media editing applications, among other things.

Memory 604 may comprise, for example, volatile memory, non-volatile memory, or some combination thereof. Although illustrated in FIG. 6 as a single memory, memory 604 may comprise a plurality of memory components. The plurality of memory components may be embodied on a single computing component or distributed across a plurality of computing components. In various embodiments, memory 604 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 604 may be configured to store information, data, applications, instructions, or the like for enabling circuitry 600 to carry out various functions in accordance with example embodiments discussed herein. For example, in at least some embodiments, memory 604 may be configured to buffer input data for processing by processor 602. Additionally or alternatively, in at least some embodiments, memory 604 may be configured to store program instructions for execution by processor 602 and/or data for processing by processor 602. Memory 604 may store information in the form of static and/or dynamic information. This stored information may be stored and/or used by circuitry 600 during the course of performing its functionalities.

In some embodiments, such as when circuitry 600 is embodied in an RF tag (e.g., RF tag 200 shown in FIG. 2), one or more processors 602 and/or memories 604 may be included in controller 202, motion sensor 204, and/or UWB transmitter 206.

Communications module 606 may be embodied as any component or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device, such as, for example, a second circuitry 600 and/or the like. In some embodiments, communications module 606 (like other components discussed herein) can be at least partially embodied as or otherwise controlled by processor 602. In this regard, communications module 606 may be in communication with processor 402, such as via a bus. Communications module 606 may include, for example, an antenna, a (e.g., UWB) transmitter, a receiver, a transceiver, network interface card and/or supporting hardware and/or firmware/software for enabling communications. Communications module 606 may be configured to receive and/or transmit any data that may be stored by memory 604 using any protocol that may be used for communications. Communications module 606 may additionally and/or alternatively be in communication with the memory 604, input/output module 608 and/or any other component of circuitry 600, such as via a bus. Communications module 606 may be configured to use one or more communications protocols such as, for example, UWB (e.g., IEEE 802.15.4), near field communication (NFC), Bluetooth, Wi-Fi (e.g., a 802.11 protocol, etc.), radio frequency systems (e.g., 900 MHz, 1.4 GHz, and 5.6 GHz communication systems), infrared, mobile broadband, GSM, GSM plus EDGE, CDMA, quad-band, and other cellular protocols, VOIP, and/or any other suitable protocol.

Input/output module 608 may be in communication with processor 602 to receive an indication of an input and/or to provide an audible, visual, mechanical, or other output. In that sense, input/output module 608 may include means for performing analog-to-digital and/or digital-to-analog data conversions. Input/output module 608 may include support, for example, for a display, touchscreen, keyboard, button, click wheel, mouse, joystick, an image capturing device, microphone, speaker, biometric scanner, and/or other input/output mechanisms. In some embodiments, such as when circuitry 600 may be implemented as an RF tag, input/output module 608 may include one or more sensors, such as motion sensor 304 and/or sensors 312 as shown in FIG. 3.

In embodiments where circuitry 600 may be implemented as a system, server or database, aspects of input/output module 608 may be reduced as compared to embodiments where circuitry 600 may be implemented as an end-user machine or other type of device designed for complex user interactions. In some embodiments (like other components discussed herein), input/output module 608 may even be eliminated from circuitry 600. Alternatively, such as in embodiments wherein circuitry 600 is embodied as a server or database, at least some aspects of input/output module 608 may be embodied on an apparatus used by a user that is in communication with circuitry 600. Input/output module 608 may be in communication with memory 604, communications module 606, and/or any other component(s), such as via a bus. Although more than one input/output module and/or other component can be included in circuitry 600, only one is shown in FIG. 6 to avoid overcomplicating the disclosure (e.g., like the other components discussed herein).

In some embodiments, the example processes and algorithms discussed herein can be performed by circuitry 600. For example, non-transitory computer readable storage media can be configured to store firmware, one or more application programs, and/or other software, which include instructions and other computer-readable program code portions that can be executed to control processors of the components of circuitry 600 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 602, to produce a machine, such that the computer program product includes the instructions which execute on the computer or other programmable data processing apparatus to create a means for implementing the functions specified in the flowchart block or block diagrams.

These computer program instructions may also be stored in a non-transitory computer-readable storage device (e.g., memory 604) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Variable Rate Ultra-Wideband Communications

FIG. 7 shows a flowchart of an example method 700 for communicating with a wireless receiver, in accordance with some embodiments. Method 700 may be performed by an RF tag (e.g., RF tag 102, 200, 300 and/or other suitably configured and/or fabricated devices), such as by processing circuitry and/or a controller, to communicate UWB tag signals at variable blink rates with one or more receivers 106. In some embodiments, multiple RF tags 102 may be configured to concurrently perform method 700 within a monitored area 125, as shown in FIG. 1.

Method 700 may begin at 702 and proceed to 704, where processing circuitry of an RF tag may be configured to receive one or more motion data vales from a motion sensor. The motion data values may be generated by a motion sensor, and may be examples of the environmental measurements discussed above. In some embodiments, controller 202 and/or UWB transceiver 206 may be configured to receive the one or more motion data values from motion sensor 204. Motion sensor 204 may be configured to generate the motion data values and provide the motion data values to the processing circuitry of RF tag 200.

As discussed above, in some embodiments, the motion sensor may include an accelerometer, gyroscope, and/or compass configured to measure motion of the RF tag. While control of the blink rate is discussed herein as being based on motion data values from a motion sensor, in some embodiments, the blink rate may be additionally or alternatively controlled by one or more other measured values from one or more other types of sensors.

At 706, the processing circuitry of the RF tag may be configured to determine a blink rate for a UWB transmitter based on the one or more motion data values. As such, the blink rate may be determined as a variable blink rate having a frequency (e.g., defining broadcast intervals for transmissions of blink data) that depends on the one or more motion data values. For example, the UWB transmitter may be configured to transmit blink data at a first blink rate or a second blink rate, wherein the first blink rate is different than the second blink rate, or a third blink rate that is different from the first blink rate and the second blink rate, etc.

While one or more different types of motion sensors and/or accelerometers may be used, in some embodiments, the RF tag may include a three axis accelerometer configured to generate motion data values including an X axis acceleration value, the Y axis acceleration value, and the Z axis acceleration value. FIG. 11 shows an example of motion data 1100 generated over time by an RF tag, in accordance with some embodiments. Motion data 1100 may include X axis acceleration values 1102, Y axis accelerations values 1104, and Z axis acceleration values 1106. Each of the acceleration values 1102-1106 is measured and plotted on a −2 to +2 g-force scale.

Motion data 1100 shows example motion data values that are characteristic of an object (e.g., a person) traversing at increasing speeds between periods of stoppage in motion, where the motion sensor is located within the shoulder region of the shoulder pads as shown in FIG. 4A for RFID tag 102. The orientation of the motion sensor results in most of the acceleration being detected in the Z axis acceleration values 1106. In some embodiments, the motion data may indicate events and/or actions of interest. For example, the motion data captured within time 1108 indicates the object is walking. In another example, within time 1110, the axis acceleration values indicate that the object has stopped moving. In yet another example, within time 1112, the axis acceleration values indicate that the object is jogging, running, or otherwise moving at a rate that is greater than within time 1108 as indicated by the increased amplitude of the axis acceleration values within time 1112. As discussed in greater detail below, the events and/or actions defined by motion data values are referred to herein as "motion signatures." Thus the motion data values within times 1108, 1110, and 1112 may each be associated with or indicate a motion signature for walking, standing still, and running, respectively.

FIG. 12 shows an example of motion data 1200 generated over time by a second RF tag, in accordance with some embodiments. Motion data 1200 is captured concurrently with motion data 1100, except using an RF tag that is disposed at the back of the shoulders approximately near the scapula. Here, the RF tag associated with motion data 1200 is at a different orientation from the RF tag that generated motion data 1100. Motion data 1200 may include X axis acceleration values 1202, Y axis accelerations values 1204, and Z axis acceleration values 1206. The different orientation of the RF tag placed on the object results in most of the acceleration being detected by X axis acceleration values 1202 (e.g., rather than the Z axis acceleration values 1106 as discussed above for motion data 1100).

The processing circuitry may be further configured to determine an acceleration magnitude value based on one or more of (e.g., all) the X axis acceleration value, the Y axis acceleration value, and the Z axis acceleration value. For example, the acceleration magnitude value may be determined as the square root of the sum of each of the X axis acceleration, the Y axis acceleration, and the Z axis acceleration values squared.

In another example, the acceleration magnitude value may be determined as the sum of the absolute values of each of the X axis acceleration, the Y axis acceleration, and the Z axis acceleration values. FIG. 13 shows an example of acceleration magnitude values 1300 of a radio frequency tag, in accordance with some embodiments. Here, acceleration magnitude values 1300 are determined based on the sum of the absolute values of the X axis acceleration values 1102, Y axis accelerations values 1104, and Z axis acceleration values 1106 of motion data 1100 shown in FIG. 11.

In some embodiments, motion signatures may be defined based on acceleration magnitude values. With reference to FIG. 13, the motion data values within times 1108, 1110, and 1112 may each be associated with or indicate a motion signature for walking, standing still, and running, respectively.

In some embodiments, the acceleration magnitude values may be determined from multiple sensors/RFID tags having different orientations and locations on the object. These acceleration magnitude values (and/or their axis acceleration values) may be programmatically combined in various ways to determine more fine detailed activity and/or motion signatures. For example, motion data associated with an RFID tag on the shoulder region may indicate that a player is raising his arms, while motion data associated with an RFID tag on the chest region may indicate that the player is also jumping in the air. Thus a motion signature associated with a player jumping to attempt a football catch may include the particular combination of motion data values and/or acceleration magnitude values from the RFID tags located at the chest and shoulder regions.

The processing circuitry may be further configured to determine the blink rate based on the acceleration magnitude value. For example, the RF tag may include mapping (e.g., stored in a memory) data that associates acceleration magnitude values with various predetermined blink rates. In some embodiments, the RF tag may be configured to operate in a plurality of states, each state associated with a different blink rate determined based on the motion data values. For example, in a first state where the motion data values indicate that the RF tag is at rest, the blink rate may be set to off or at a very low transmit rate. In a second state where the motion data values indicate the RF tag is moving slowly, the blink rate may be set to a low transmit rate. In a third state where the motion data values indicate the RF tag is moving quickly, the blink rate may be set to a fast transmit rate. In some embodiments, blink rates may vary from 0 Hz (e.g., when the RF tag has been deactivated and/or otherwise set to not transmit blink data) to up to 200 Hz (e.g., when the RF tag has been activated and/or when motion data suggests that an associated object has moved).

In some embodiments, the blink data may include a blink rate status change indication. For example, upon determining to change the blink rate, the blink rate status change indication may be included with the blink data for one or more (e.g., 3) pulses of blink data transmission at the updated blink rate. The blink status change indication may be used to more precisely determine the start and/or stop of a monitored activity and/or event. In the context of a football game, for example, a blink status change indication that the blink rate has been changed to the fast transmit rate may indicate that a play has begun on the field.

In some embodiments, the RF tag may include a user input device such as a switch, button, etc. used for controlling the blink rate. Via the user input device, a user wearing the RF tag may be able to turn the RF tag on/off, change the blink rate, and/or to send status information within one or more pulses of the blink data. The RF tag may include an external light emitting diode (LED) and/or other display device configured to provide feedback as to the action the user has taken.

At 708, the processing circuitry may be configured to determine blink data. The blink data may be sent via the tag signal transmitted by the RF tag, such as at regular polling intervals as defined by the blink rate. As discussed above, the blink data may include characteristics of the tag signal and/or a pattern, code, alphanumeric, character string, or trigger that allow the tag signal to be recognized by receiver 106 so the location of the RF tag 102 may be determined. Blink data may additionally or alternatively comprise one or more tag data packets such as the tag identifier, tag data, and/or tag-individual correlator. In some embodiments, the blink data may also include sensor data, such as the motion data values generated by the motion sensor and/or any other sensor data generated by one or more other sensors included with and/or in communication with the RF tag.

In some embodiments, the blink data may further include orientation status change information. For example, the accelerometer may be configured to provide 9D/6D/4D orientation detection such that a change in the orientation of the RF tag may be detected based on the motion data values. In response to determining a change in the orientation, the RF tag may be configured to include the orientation status change indication with the blink data for one or more pulses.

In some embodiments, the processing circuitry may be configured to determine some or all portions of the blink data based on accessing the blink data from a memory of the RF tag. For example, blink data such as the tag identifier may be programmed, coded, and/or otherwise stored by the RF tag and accessed for transmission of the stored blink data with the tag signal to one or more receivers 106.

At 710, the processing circuitry may be configured to control the UWB transmitter to wirelessly transmit the blink data at the blink rate. For example, the blink data and blink rate may be incorporated within an electronic signal that is generated by UWB transmitter 206 and provided to antenna 208 for the UWB transmission of the tag signal. In that sense, the processing circuitry may control the UWB transmitter to transmit that blink data at a first blink rate, a second blink rate, or a third blink rate, etc. based on the one or more motion data values. The tag signal including the blink data at the blink rate may be received by one or more receivers 106 for programmatic determination (e.g., based on tag derived data determined from the received tag signal), analysis, tracking, and/or presentation of activities, events, among other things associated with participants wearing RF tags. Method 700 may then proceed to 712 and end. In some embodiments, the blink data may be transmitted via a UWB tag signal having a bandwidth of greater than at least one of 500 MHz and 20% of a center frequency of the tag signal.

As discussed above, the blink data transmitted by the RF tag may include motion data, such as axis acceleration values and/or acceleration magnitude values. In some embodiments, the RF tag may be configured to use a buffer model for transmitting motion data as blink data. For example, the motion sensor may be configured to collect motion data at 50 Hz for 5 seconds with a blink rate of 10 Hz, resulting in 250 data points that take 25 seconds to fully transmit for analysis. As such, the buffered model allows for finer detailed data to be collected over time than would be otherwise possible at a particular blink rate. Once the motion data is collected, it may be subsequently processed to provide fine detailed analysis and activity determination.

FIG. 8 shows a flowchart of an example method 800 for communicating with a wireless receiver, in accordance with some embodiments. For example, method 800 may be performed after and/or concurrently with method 700 by the RF tag to communicate UWB tag signals at variable blink rates with one or more receivers 106.

Method 800 may begin at 802 and proceed to 804, where processing circuitry of the RF tag may be configured to receive one or more motion data values from a motion sensor. At 806, the processing circuitry may be configured to determine an acceleration magnitude value based on the one or more motion data values. Some or all of the discussion at 704 and 706 of method 700 may be applicable at 804 and 806. For example, the acceleration magnitude value may be based on one or more directional magnitude values generated by an accelerometer. Alternatively or additionally, the accelerometer may be configured to determine and/or generate the acceleration magnitude value and/or an acceleration vector value, which may be provided to the processing circuitry.

At 808, the processing circuitry may be configured to determine whether there was a change in the acceleration magnitude value. The processing circuitry may be configured to monitor the acceleration magnitude values and/or motion data values over time for changes. The changes may be caused, for example, by the movements of objects wearing RF tag 102 in the course of a monitored activity or performance. For example, an object may begin motion from a standstill, which may cause the motion to be detected by the motion detector and reflected (e.g., as a stream of data) in the acceleration magnitude values and/or motion data values.

In response to determining a change in the acceleration magnitude value, method 800 may proceed to 810, where the processing circuitry may be configured to determine an acceleration magnitude threshold value. The acceleration magnitude threshold value may define a minimum acceleration magnitude value needed to initiate and/or continue the transmission of the tag signal. In some embodiments, the acceleration magnitude threshold value may be stored in the RF tag, such as in a memory. In some embodiments, the acceleration magnitude value may further be associated and/or include a duration threshold value, indicating duration of time for which a measured acceleration magnitude must exceed the acceleration magnitude threshold value in order to be considered as having exceeded the acceleration magnitude threshold value. With reference to FIG. 13, for example, acceleration magnitude threshold value 1302 may be defined at 0.2 g. Therefore, acceleration magnitude values 1300 that are greater than 0.2 g may exceed acceleration magnitude threshold value 1302 while acceleration magnitude values 1300 that are less than 0.2 g may fail to exceed acceleration magnitude threshold value 1302.

In some embodiments, such as when a sensor other than a motion sensor is used to control the variable blink rate, the processing circuitry may be configured to compare sensor data values with a corresponding sensor data threshold value. For example, where a proximity sensor (e.g., an NFC sensor) is used, the sensor data may be compared with a threshold such that the RF tag broadcasts when the proximity sensor is within or outside of a threshold distance (e.g., as determined by received signal strength of the NFC signals) from another proximity sensor and/or RF tag (e.g., worn by a different object).

At 812, the processing circuitry may be configured to determine whether the acceleration magnitude value exceeds the acceleration magnitude threshold value. The acceleration magnitude threshold value may be calibrated to the acceleration magnitude values generated by the motion sensor. For example, an individual who is seated or otherwise stationary may only generate acceleration magnitude values that are less than the acceleration magnitude threshold value. Conversely, an individual who is walking, running, jumping, and/or otherwise in motion may generate acceleration magnitude values that are greater than the acceleration magnitude threshold value. In some embodiments, the processing circuitry may be configured to determine whether a plurality of acceleration magnitude values has exceeded the acceleration magnitude threshold for a duration defined by the duration threshold value.

In response to determining that the acceleration magnitude value exceeds the acceleration magnitude threshold value, method 800 may proceed to 814, where the processing circuitry may be configured to adjust the blink rate based on the acceleration magnitude value. For example, the mapping data associating acceleration magnitude values with various predetermined blink rates may be used to determine an adjusted blink rate based on the change in the acceleration magnitude value relative to a prior acceleration magnitude value. In some embodiments, the RF tag may include one or more of a predefined blink rate states, such as an off/low blink rate, an intermediate blink rate, and a high blink rate.

At 816, the processing circuitry may be configured to control the UWB transmitter to wirelessly transmit the blink data at the blink rate. The discussion above at 710 of method 700 may be applicable at 816. Method 800 may then proceed to 818 and end.

Returning to 812, in response to determining that the acceleration magnitude value fails to exceed the acceleration magnitude threshold value, method 800 may proceed to 820, where the processing circuitry may be configured to control the UWB transmitter to stop wirelessly transmitting the blink data. Alternatively, the processing circuitry may be configured to adjust the blink rate when the acceleration magnitude value fails to exceed the acceleration magnitude threshold value, such as to lower the blink rate. Method 800 may then return to 806, where the processing circuitry may be configured to continue to determine (e.g., subsequent) acceleration magnitude values for control of the blink rate.

Returning to 808, in response to determining a lack of change in the acceleration magnitude value, method 800 may proceed to 816, where the processing circuitry may be configured to continue to control the UWB transmitter to transmit the blink data at the (e.g., unadjusted) blink rate. In some embodiments, the processing circuitry may be configured to determine the lack of change based on comparing a difference between two (e.g., sequential and/or otherwise time-separated) acceleration magnitude values with a change threshold value. When the difference fails to exceed the changed threshold value, the processing circuitry may be configured to determine a lack of (e.g., sufficient) change in the two acceleration magnitude values. For example, the change threshold value may be defined by a margin of error of the motion sensor and/or may be set to a higher value, such as to reduce the frequency of blink rate adjustments.

In some embodiments, the processing circuitry of the RF tag may be configured to adjust the blink rate based on the motion data values captured over a period of time. The period of time may be predefined and may be used to prevent excessively frequent and/or unwanted changes to the blink rate that may otherwise occur.

As discussed above, the processing circuitry may be configured to detect one or more motion signatures based on received motion data values over time from one or more motion sensors. A motion signature may define an event and/or action that can be performed by the object equipped with or otherwise associated with the RF tag detectable by the motion sensor and that can be used as a basis for adjusting the blink rate. In the example of a monitored football game, an individual can be determined to be running (i.e., a "running" motion signature) based on motion data values over time, resulting in an increased blink rate, or can be determined to be seated (i.e., a "seated" motion signature)

or otherwise uninvolved with the monitored activity of interest, resulting in a decreased blink rate.

Other motion signatures may be defined based on the context of the monitored activity. For example, motion signatures may be defined to correspond with the movement of a player at the beginning of a football play (i.e., a play start event) as a basis for initiating and/or increasing the blink rate. Motion signatures may be defined to correspond with the movement of a player at the end of a football play (i.e., a play end event) as a basis for halting or reducing the blink rate. In another example, a motion signature may be defined to correspond with a player taking a seat (e.g., on a bench) as a basis for stopping or decreasing the blink rate.

In some embodiments, a motion signature may include and/or be based on a multiple (e.g., a stream) of motion data values captured over time. Virtually any type of motion that can be detected by the motion sensor (e.g., over time) can be used to define a motion signature. The processing circuitry may be configured to determine a live motion signature based on the motion data values received from the motion sensor, and to compare the live motion signature with one or more stored motion signatures.

In response to detecting a motion signature (e.g., that a live motion signature matches or sufficiently corresponds with a stored motion signature), the processing circuitry may be configured to adjust the blink rate accordingly. For example, a motion signature may be defined by motion data values indicating that the object has begun movement above a threshold value, followed by subsequent motion data values indicating that movement above the threshold value has been maintained for a predetermined duration of time. Similarly, a motion signature may be defined by motion data values indicating that the object has come to a rest or has not moved sufficiently to exceed a threshold amount, followed by subsequent motion data values indicating that the movement below the threshold amount has been maintained predetermined duration of time. In that sense, a motion signature may include and/or define an inactivity time within which a blink rate can be unchanged despite detected a movement that would otherwise cause an adjusted blink rate. In some embodiments, a motion signature may include a plurality and/or sequence of motion data threshold values and their associated duration values. Method 800 may then proceed to 818 and end.

FIG. 9 shows a flowchart of an example method 900 for remote system control of an RF tag blink rate, in accordance with some embodiments. Method 900 may allow for the blink rate of an RF tag to be controlled by an RF locating system, such as by one or more of receiver 106, receiver hub 108, and/or receiver processing and distribution system 110 of RF locating system 100 shown in FIG. 1. Method 900 may be performed by an RF tag (e.g., RF tag 102, 200, 300 and/or other suitably configured and/or fabricated devices), such as by processing circuitry and/or a controller. In some embodiments, method 900 may be performed with one or more of methods 700 and 800 by the RF tag.

Method 900 may begin at 902 and proceed to 904, where the processing circuitry of the RF tag may be configured to receive blink rate control data. The blink rate control data may be sent from receiver hub 108 and/or receiver processing and distribution system 110 via one or more transmitters Similar to receivers 106 shown in FIG. 1, the one or more transmitters may be disposed at or near monitored area 125 to provide the blink rate control data to tags 102. In some embodiments, receivers 106 may include transmitters and/or may be transceivers.

In some embodiments, the blink rate control data may be received by antenna 308 and/or UWB transceiver 306 (or a UWB receiver, such as when RF tag 300 does not include a transceiver and/or includes a separate UWB transmitter and UWB receiver) of RF tag 300. Alternatively or additionally, in some embodiments, the blink rate control data may be received via a front end 212 and/or 314, such as from a non-UWB transmitter using technologies including Bluetooth, WiFi, near field communication, and/or among other things. Here, RF tags may be programmed prior to a monitored activity in alternative or addition to real-time remote system control via UWB communications.

At 906, the processing circuitry of the RF tag may be configured to control the UWB transmitter to stop or start wirelessly transmitting the blink data based on the blink rate control data. For example, the tag location system may be allowed to turn off and on the various tags 102 within monitored area 126 as desired, such as to conserve RF tag power consumption, reduce channel capacity usage, reduce tag signal collisions and interference, among other things. Some example criteria that may be used to determine whether a tag is to be turned on or off are discussed in greater detail below in connection with method 1000 and FIG. 10. In some embodiments, the blink rate control data may indicate an acceleration magnitude threshold value and/or one or more other applicable blink rate control threshold values.

At 908, the processing circuitry may be configured to determine whether the blink rate control data indicates a particular blink rate. In addition or alternative to RF locating system providing binary on/off control of blink rates and/or the control threshold value(s), the system may also be allowed to provide blink rate control data that directly controls the blink rate of a particular RF tag.

In response to determining that the blink rate control data indicates a particular blink rate, method 900 may proceed to 910, where the processing circuitry may be configured to determine a blink rate for the UWB transmitter based on the blink rate control data. The blink rate may be set to the particular blink rate defined by the blink rate control data. In some examples, the blink rate control data may indicate a blink rate that is different from the blink rate indicated by the motion data values generated by the motion sensor. The processing circuitry may be configured to prioritize motion data values over blink rate control data in the event of an inconsistency with respect to the blink rate, or vice versa. In some embodiments, the blink rate control data may include mapping data indicating a different association between the motion data values and/or acceleration magnitude values with the variable blink rates. The processing circuitry may be configured to determine the blink rate based on the blink rate control data by updating the (e.g., stored) mapping data.

At 912, the processing circuitry may be configured to control the UWB transmitter to wirelessly transmit blink data at the blink rate. The discussion at 710 of method 700 may be applicable at 912. Method 900 may then proceed to 914 and end.

Returning to 908, in response to determining that the blink rate control data fails to indicate a particular blink rate, method 900 may proceed to 916, where the processing circuitry may be configured to determine the blink rate for the UWB transmission by performing method 700 and/or 800. For example, the blink rate may be determined based on the motion data values generated by the motion sensor. Method 900 may then proceed to 912 and end at 914.

FIG. 10 shows a flowchart of an example method 1000 for remotely controlling the blink rate of an RF tag, in accordance with some embodiments. Method 1000 may allow for remote control of the blink rate of one or more RF tags. For example, the blink rate of an RF tag may be set based on factors alternative or in addition to various sensor data generated by sensors of the RF tag. Method 1000 may be performed by one or more components of an RF locating system, such as receivers 106, receiver hub 108, and/or receiver processing and distribution system 110 shown in FIG. 1 and/or other suitable devices, systems, or apparatus. In some embodiments, some or all of the steps of method 1000 may be performed by the RF tag, such as with processing circuitry of the RF tag.

Method 1000 may begin at 1002 and proceed to 1004, where one or more receivers may be configured to receive blink data at variable blink rates via UWB tag signals sent from an RF tag. For example, receivers 106 shown in FIG. 1 may be configured to receive the tag signals from RF tag 102. In some embodiments, the one or more receivers may be further configured to provide the blink data to receiver hub 108 and/or receiver processing and distribution system 110.

At 1006, an apparatus (e.g., receiver hub 108 and/or receiver processing and distribution system 110) may be configured to determine tag derived data and/or tag location data based on the blink data. For example, the tag derived data may include data derived or extracted from the tag signal and/or blink data and may include tag data, tag identifier, tag-individual correlator, tag-sensor correlator, tag data packets, blink data, time measurements (e.g. time of arrival, time difference of arrival, phase), signal measurements (e.g., signal strength, signal direction, signal polarization, signal phase), environmental measurements (e.g., including motion data values) and/or tag location data (e.g., including tag location estimates), etc. The tag location data may indicate the location of the RF tag and may be determined based in the UWB tag signal as described above.

At 1008, the apparatus may be configured to determine blink rate control data for the RF tag based on the tag derived data and/or tag location data. As discussed above, the blink rate control data may control whether the RF tag should initiate or stop transmissions and/or may indicate a particular blink rate at which to transmit the blink data. RF tags may be remotely activated or deactivated for any suitable purpose. They may be activated, for example, to monitor one or more particular objects that are of interest at a particular time. Similarly, objects attached with RF tags that are not of interest at a particular time may have their RF tags turned off (or lowered in blink rate) to conserve channel capacity for the RF tags of interest, among other things (e.g., lower power consumption by the RF tags, reduce signal collisions and interference, etc.).

In some embodiments, the blink rate control data may be determined based at least in part on the tag location data. For example and with reference to FIG. 1, the tag location data may indicate that a particular player attached with the tag is on the sideline, off the field, or otherwise not of interest with respect to the monitored activity (e.g., a football game). Here, the blink rate control data may be generated and provided to such RF tags such that these RF tags stop broadcasting tag signals and/or reduce their blink rates. Tag location data may also indicate that another player attached with a tag is on the field, in the huddle, at the line of scrimmage, or otherwise of interest with respect to the monitored activity. Here, the blink rate control data may be generated and provided to such RF tags such that these RF tags initiate broadcasting if off and/or increase their blink rates.

In some embodiments, the blink rate control data may be determined based at least in part on participant role data. For example, the participant role may include participant profile data such as the role of the participant in the game or sporting event (e.g., what position a player is assigned), participant identifying data (e.g., name, age, etc.) biometric data, participant analysis data, team ID, performance statistics, and/or the like. The apparatus may be configured, based on generating appropriate blink rate control data, to turn RF tags on or off based on the identity of the object attached with each RF tag and/or the role of the object within the context of a monitored activity. For example, RF tags associated with players that are not involved on a play (e.g., defensive players when the offense is on the field) may be turned off. In another example, a player's RF tag(s) may be turned on when the player enters the field and/or otherwise is determined to be of interest.

In some embodiments, the blink rate control data sent to an RF tag may include tag location data and/or participant role data. For example, the processing circuitry of the RF tag may be configured to determine whether the object is of interest based on the tag location data and/or participant role data, and control the blink rate of the UWB accordingly.

At 1010, the apparatus may be configured to provide the blink rate control data to the RF tag. The discussion at 904 of method 900 may be applicable at 1010. For example, the blink rate control data may be sent as via UWB transmission, such as from one or more transceivers and/or transmitters located near monitored area 125 to a UWB receiver and/or transceiver 306 of RF tag 300.

At 1012, the apparatus may be configured to determine whether monitoring is complete. For example, the determination may be based on one or more predefined trigger events such as the end of a game, end of an overtime game (e.g., score is tied at the end of regulation time), end of a quarter, timeout, among other things.

In response to determining that monitoring has not been completed, method 1000 may return to 1004, where the apparatus may continue to receive blink data at variable blink rates from RF tags. In response to determining monitoring is complete, method 1000 may proceed to 1014 and end.

Activity Determination

FIGS. 14A-18 show flowcharts of examples of methods 1400-1800 that may be used in providing performance analytics in accordance with some embodiments. Methods 1400-1800 may be performed by performance analytics system, which can include a receiver processing and distribution system 110 with various processing engines that receive blink data from hubs and use the blink data to programmatically determine events of monitored activities. Additional details regarding performance analytic systems, applicable in some embodiments, are discussed in U.S. Pat. No. 9,002,485, incorporated by reference above.

Figure 14A:
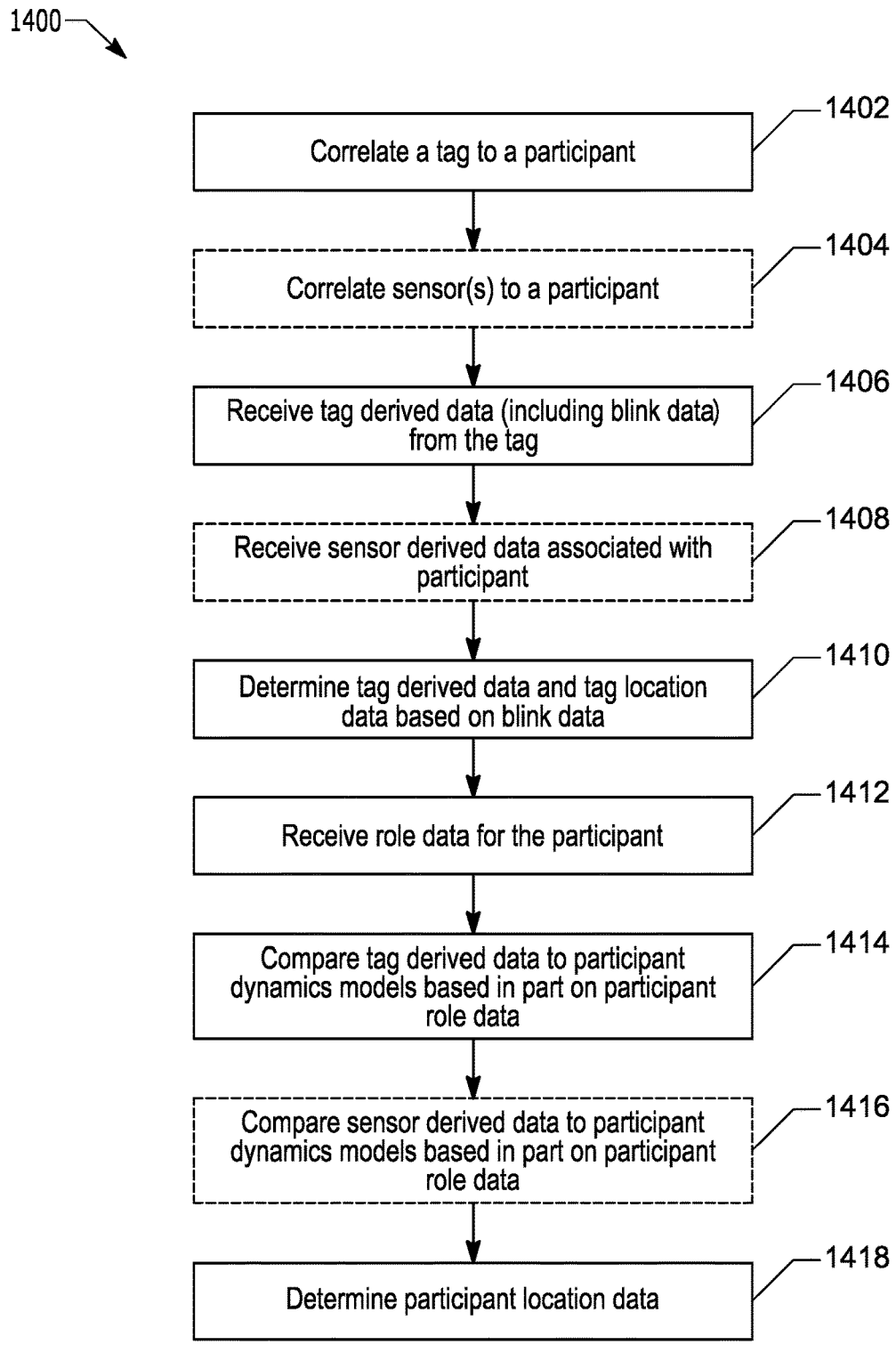

FIG. 14a illustrates a flowchart of an exemplary method 1400 for performance analytics using a locating system in accordance with some embodiments. The process may start at 1402, where one or more tags (e.g., tags 102 as shown in FIG. 11) may be correlated to an object, such as a participant (e.g., a player, official, ball, etc.) of an activity. Additionally, in some embodiments, one or more sensors (e.g., sensors 204 as shown in FIG. 2, and sensors 304 and 312 and shown in FIG. 3) may be correlated to a participant at 1404. The tags 102 (and optionally sensors) may be attached to participants, such as to players, officials, balls, field markers, penalty flags, other game equipment, and reference markers on a field of play (e.g., boundary defining reference markers). For example, in the case of players or officials, the tags and/or sensors may be attached to equipment, uniforms, etc., worn or carried by the players or officials.

At 1406, blink data is received from the one or more tags 102. Additionally, in some embodiments, other tag derived data and sensor derived data, such as from the sensors associated with the participant, may be received with the blink data or separate from the blink data at 1408. In some embodiments, the sensor derived data may include motion data values from motion sensors.

At 1410, tag location data is determined (e.g., perhaps by receiver hub/locate engine 108) from the blink data. Role data for the participant is received at step 1412.

In some embodiments, each participant may be associated with one or more tags 102 and/or one or more sensors (e.g., multiple tags 102 and sensors may be attached to an individual player's equipment, such as to provide more accurate location and multi-dimensional location or orientation data). A filter of system 110 may process the incoming stream of tag location data to identify tags 102 that are associated with a given participant (e.g., multiple tags attached to a player, a ball, an official, etc.). The filter may correlate the tag location data associated with multiple tags 102 where the multiple tags 102 are associated with the same participant (e.g., player or official), such as to provide more accurate data regarding the activities of a participant. Once the tag location data is correlated to a given participant, it may be routed to an appropriate engine (e.g., a player dynamics engine, official dynamics engine, ball engine, field marker engine, etc. for a football game activity) based at least in part on the received role data and such correlation. Additionally, in some embodiments, sensor derived data from multiple sensors (including motion data values from motion sensors) that are associated with a given participant may be correlated in a similar fashion.

In embodiments where the tag location data is routed to a player dynamics engine, the player dynamics engine (e.g., of system 110) may receive the stream of participant correlated tag derived data, and optionally, other tag/sensor derived data, from the filter. In other embodiments, depending on the type of participant, the below process may be performed by other appropriate engines such as the official dynamics engine, the ball engine, the field marker engine, etc.

At 1414, the player dynamics engine may compare the tag derived data and the received player role data to a plurality of player dynamics/kinetics models to determine player dynamics (e.g., multi-dimensional player location information) for each participant (e.g., player).

Additionally, in some embodiments, the received sensor derived data may be used in the comparison to a plurality of player dynamics/kinetics models to determine player dynamics at 1416. In some embodiments, at least a portion of the received sensor derived data may include motion data values captured by a motion sensor of a tag 102. The motion data values may be compared with motion signatures to determine player dynamics at 1416. For example, each motion signature may also be associated a particular dynamics.

At 1418, the player dynamics engine may determine player location data for each player (e.g., player dynamics or multi-dimensional player location information), such as location, change in location, orientation, velocity, acceleration, deceleration, or the like. The player dynamics engine may then provide an output stream of the player location data, such as to a team formation engine, a play engine, an event engine, or the like.

Figure 14B:
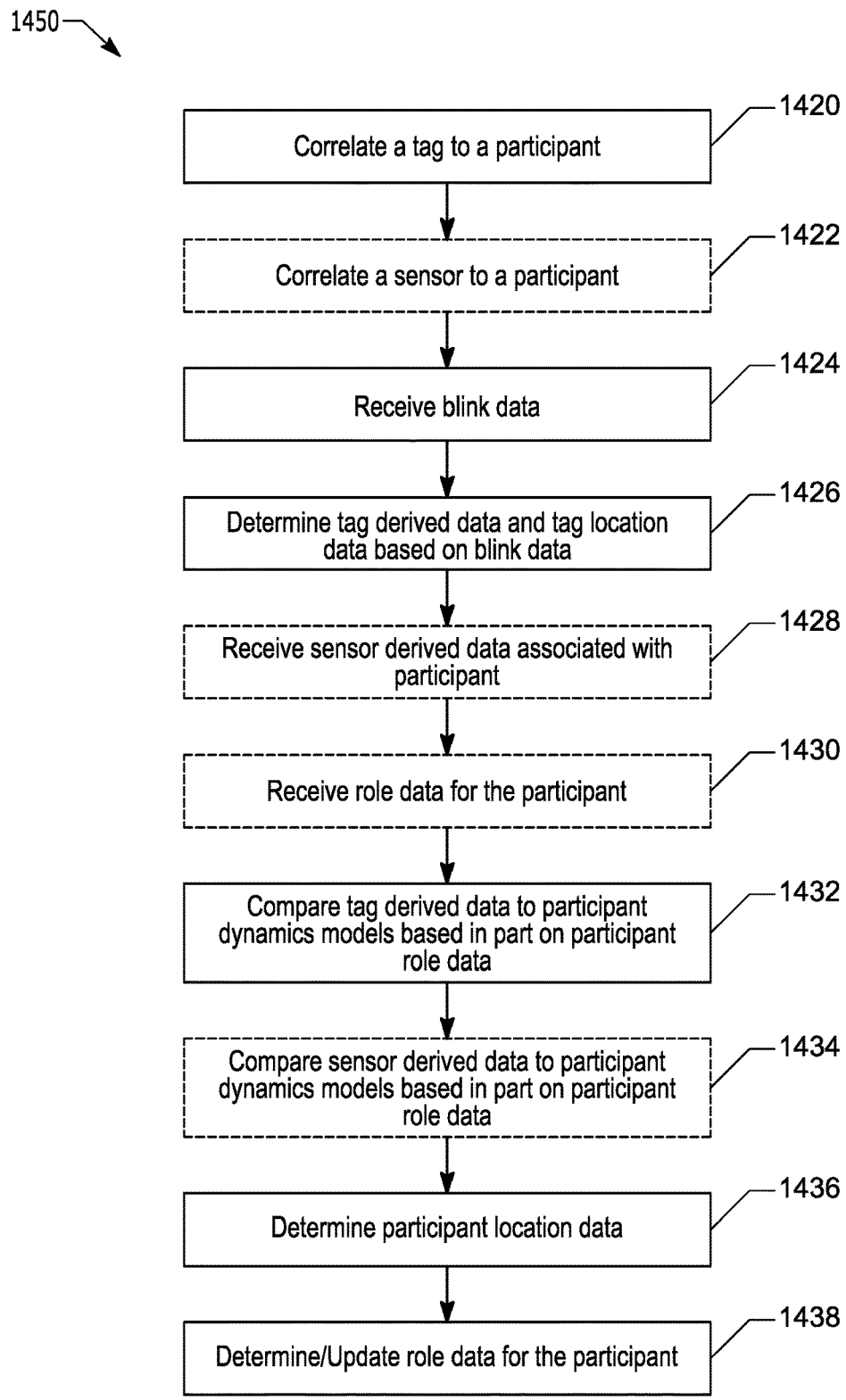

FIG. 14B illustrates a flowchart of another exemplary method 1450 for performance analytics using a locating system in accordance with some embodiments. The process 1450 may start at 1420, where one or more tags (e.g., tags 102) may be correlated to a participant (e.g., a player, official, ball, etc.). Additionally, in some embodiments, one or more sensors (e.g., sensors 204) may be correlated to a participant at 1422.

At 1424, blink data is received from the one or more tags 102. Additionally, in some embodiments, other tag derived data and sensor derived data, such as from sensors 204 associated with the participant, may be received with the blink data or separate from the blink data at 1428. Tag location data is determined (e.g., perhaps by receiver hub/locate engine 108) from the blink data at step 1426.

At 1430, a player dynamics engine may receive tag derived data for the tags 102 where the tag derived data may be indicative of a player location (e.g., as opposed to an official location, a field marker location, etc.). Additionally, in some embodiments, other tag and sensor derived data, such as from sensors 204 associated with the player, may be received with the blink data or separate from the blink data at 1428.

In some embodiments, at 1430, the player dynamics engine may optionally receive player role data for the player, such as by comparing a tag identifier of the tag derived data to a database of player roles.

At 1432, the player dynamics engine may then compare the tag derived data (and optionally the player role data) to a plurality of player dynamics/kinetics models to determine player dynamics (e.g., multi-dimensional player location information) for each player. Additionally, in some embodiments, the received sensor derived data may be used in the comparison to a plurality of player dynamics/kinetics models to determine player dynamics at 1434. In some embodiments, the motion data values generated by the motion sensors on a tag 102 and received as blink data may be compared with motion signatures.

At 1436, the player dynamics engine may determine player location data for each player, such as location, change in location, orientation, velocity, acceleration, deceleration, or the like.

At 1438, the player role data may be created or updated, such as in a player role database, based on the player location data. For example, if participant role data for the particular participant already exists in a participant role database, the participant role data may be updated or changed based on an analysis of the participant location data. If participant role data for a particular participant does not exist in the participant role database, a new participant role data entry may be created for that particular participant and stored to the database. As such, the performance analytics system may learn about participant roles as a result of analyzing the participant dynamics (participant location data).

In some embodiments, the participant role data (e.g., player role data) may comprise participant profile data such as the role of the participant in the game or sporting event (e.g., what position a player is assigned), biometric data, participant analysis data, team ID, performance statistics, and/or the like. For example, the player role data may additionally include data regarding a player's normal gait, the pattern a player typically runs, how long on average it takes a player to start from a line of scrimmage, etc. Some embodiments may learn and update one or more portions of the player role data based on the analysis of the participant location data. For example, the performance analytics system may identify that a player's assigned position may have changed based on the changes in the player location data and the player dynamics, or the system may identify a player's typical gait or typical running pattern by analyzing the player location data (and/or other tag/sensor derived data), and then update the player role data accordingly.

Figure 15:
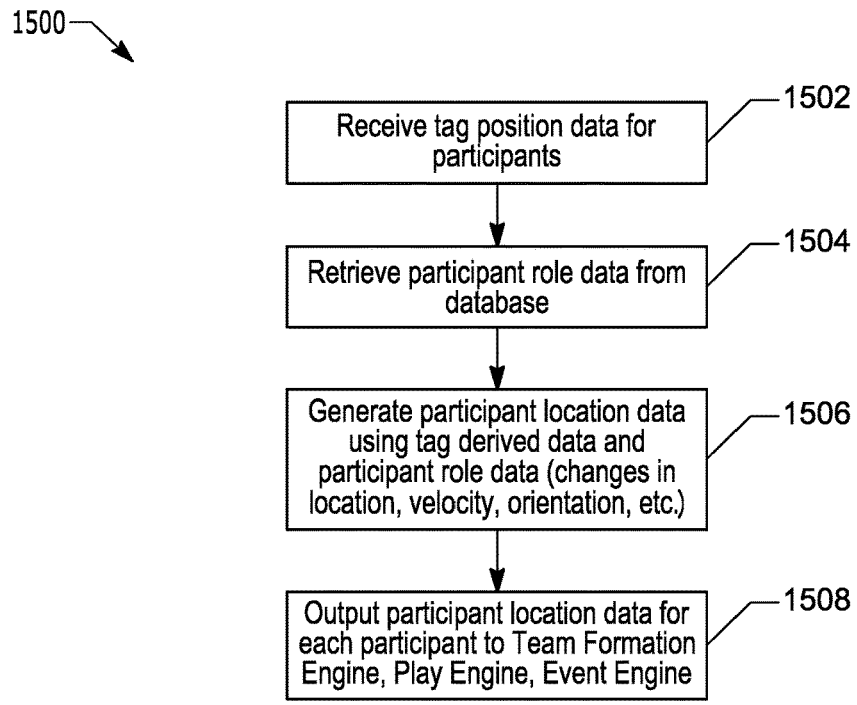

FIG. 15 illustrates a flowchart of an exemplary method 1500 for a player dynamics (e.g., of a system 110) in accordance with some embodiments. The process may start at 1502, where tag location data is received for tags 102. In some embodiments, such tag location data may be determined by a receiver hub/locate engine 108 based on blink data transmitted by the tags 102. Additionally, in some embodiments, other tag and sensor derived data (e.g., including motion data values), such as from sensors 204, may be received with the tag location data or separately from the tag location data. At 1504, the player dynamics engine may retrieve player role data from a database based on the tag ID (or participant ID) of the tag derived data. At 1506, the player dynamics engine may use the player role data, player dynamics/kinetics models (e.g., from one or more databases of player dynamics/kinetics models), motion signatures, the tag location data, and, optionally, the other tag derived data and/or sensor derived data to determine player dynamics (e.g., multi-dimensional player location information) for each particular player, such as location, change in location, velocity, acceleration, deceleration, orientation, or the like. At 1508, the player dynamics engine may provide an output stream of the player dynamics over time (e.g., participant location data), such as to a team formation engine, a play engine, an event engine, or the like.

Figure 16:
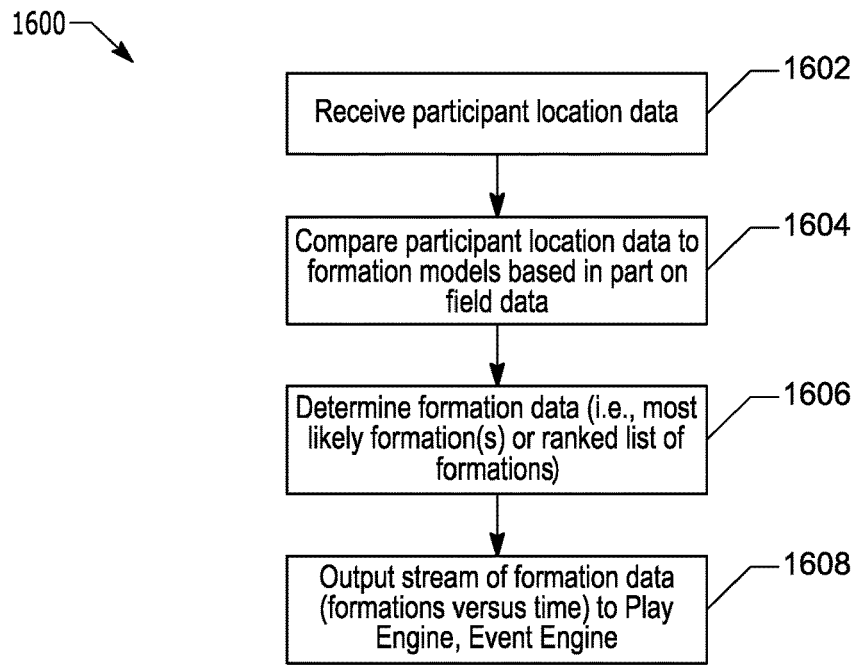

FIG. 16 illustrates a flowchart of an exemplary method 1600 for a team formation engine (e.g., of a system 110) in accordance with some embodiments. The method 1600 may start at 1602, where a player dynamics data stream (e.g., player location data) is received (e.g., from a player dynamics engine), which may comprise blink data, tag location data, sensor data, and other player dynamics data for a plurality of players. At 1604, a team formation engine may retrieve field data and formation models from one or more databases and compare the player dynamics data stream, in conjunction with the field data, to the plurality of formation models. The team formation engine may analyze the data stream of player dynamics over time to determine a probable formation, or set of probable formations, (e.g., the likelihood that a particular formation is occurring or forming) at 1606. For example, the team formation engine may determine the most probable team formation (or ranked list of probable formations) at a particular point in time. At 1608, the team formation engine may provide an output stream of the formations versus time (e.g., formation data), such as to a play engine, an event engine, or the like.

Figure 17:
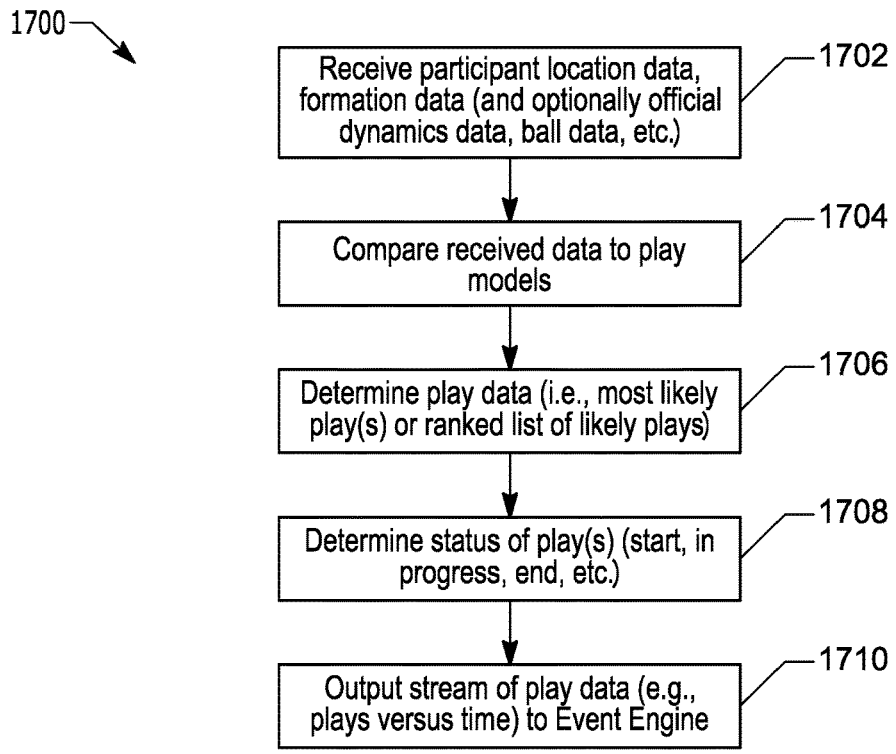

FIG. 17 shows a flowchart of an exemplary method 1700 for a play engine (e.g., of system 110) in accordance with some embodiments. The process may start at 1702, where a player dynamics data stream (e.g. player location data) and team formations versus time data stream (e.g., formation data) are received (e.g., from a player dynamics engine and a team formation engine, respectively). In some embodiments, additional data may be received, such as an official dynamics data stream, a ball versus time data stream, a field marker data stream, and/or the like to further improve play determination accuracy or assist in generating play data. At 1704, the play engine may retrieve play models from one or more databases and compare the received data streams to the plurality of play models. The play engine may analyze the data streams in conjunction with the play models to determine a probable play, or set of probable plays, at 1706. At 1708, the play engine may analyze the data stream to determine the status of the particular play, such as play start, in progress, play stop, or the like. In determining that a play has formed, started, ended, etc., the play engine may weigh and analyze the received data streams and compare to the play models to generate a ranked list of one or more probable play events and include an associated probability that the received data matches each particular model or pattern. At 1710, the play engine may provide an output stream of the plays versus time (e.g., play data), such as to an event engine, or the like.

Figure 18:
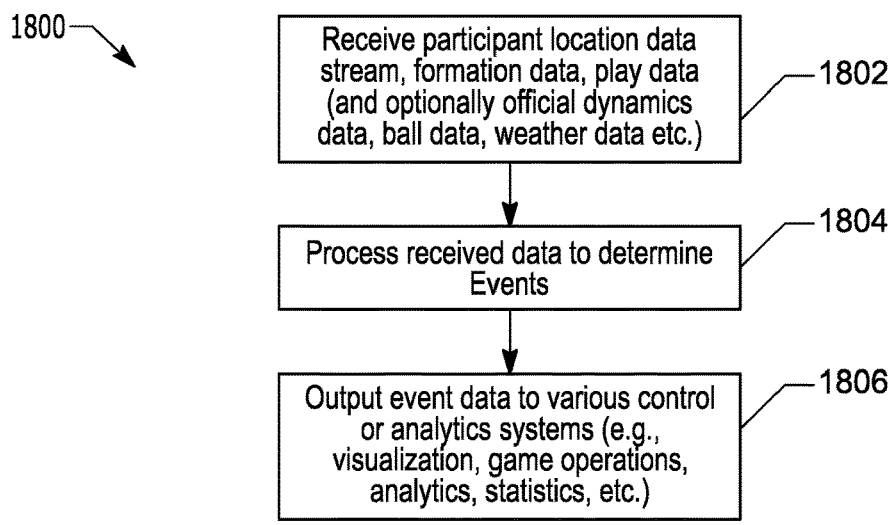

FIG. 18 illustrates a flowchart of an exemplary method 1800 for an event engine (e.g., of system 110) in accordance with some embodiments. The method 1800 may start at 1802, where a player dynamics data stream (e.g., player location data), team formations versus time data stream (e.g., formation data), and a plays versus time data stream (e.g., play data) are received (e.g., from a player dynamics engine, a team formation engine, and a play engine, respectively). In some embodiments, additional data streams may be received, such as an official dynamics data stream, a ball versus time data stream, a field marker data stream, a weather data stream, and/or the like to assist in generating event data streams.

At 1804, the event engine may process the received data streams to determine and generate events during, or in conjunction with, a game. In some embodiment, the event data may be determined based on the comparing the tag location data and motion data to motion signatures At 1806, the event engine may provide output streams of the event data to various storage, analysis, and/or control systems, such as, without limitation, to a historical data store, a visualization system, a game operations system, a camera control system, a team analytics system, a league analytics system, a statistics system, an XML feed/IM feed system, and/or the like. In some embodiments, the event engine may be configured to determining a blink rate for an ultra-wideband (UWB) transmitter of the tag 102 based on the event data. For example, the event data may indicate that the object is walking, running, jumping, etc. Different events defined by the event data may be associated with different blink rates. The UWB receiver of the tag 102 may be configured to receive blink rate control data that defines the blink rate, and may set its blink rate accordingly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus for determining event data, comprising:
processing circuitry configured to:
correlate at least one RF tag to a participant;
correlate at least one motion sensor of the at least one RF tag to the participant;
receive blink data transmitted by the at least one tag;
determine tag location data based on the blink data;
receive motion data originating from the at least one motion sensor; and
determine the event data based on the comparing the tag location data with kinetic models and the motion data with motion signatures.

2. The apparatus of claim 1, wherein the processing circuitry is further configured to:
determine a blink rate for an ultra-wideband (UWB) transmitter of the at least one RF tag based on the event data; and
provide blink rate control data defining the blink rate to the at least one RF tag.

3. The apparatus of claim 2, wherein:
the motion data includes an X axis acceleration value, a Y axis acceleration value, and a Z axis acceleration value; and
the processing circuitry is further configured to:
determine an acceleration magnitude value based on one or more of the X axis acceleration value, the Y axis acceleration value, and the Z axis acceleration value; and
determine the blink rate based on the acceleration magnitude value.

4. The apparatus of claim 1, wherein the blink data includes at least one of a blink rate status change indication or an orientation status change indication.

5. The apparatus of claim 1, wherein the processing circuitry configured to compare the motion data with the motion signatures includes the processing circuitry being configured to:
determine a live motion signature based on the motion data received from the at least one motion sensor;
compare the live motion signature with the motion signatures, wherein the motion signatures each includes one or more motion data threshold values and associated duration values; and
in response to identifying a match between the live motion signature and a first motion signature, determine the event data based at least in part on the first motion signature.

6. A method for determining event data, comprising:
correlating, by processing circuitry of an apparatus, at least one RF tag to a participant;
correlating, by the processing circuitry, at least one motion sensor of the at least one RF tag to the participant;
receiving, by the processing circuitry, blink data transmitted by the at least one RF tag;
determining, by the processing circuitry, RF tag location data based on the blink data;
receiving, by the processing circuitry, motion data originating from the at least one motion sensor; and
determining, by the processing circuitry, the event data based on the comparing the RF tag location data with kinetic models and the motion data with motion signatures.

7. The method of claim 6 further comprising, by the processing circuitry:
determining a blink rate for an ultra-wideband (UWB) transmitter of the at least one RF tag based on the event data; and
providing blink rate control data defining the blink rate to the at least one RF tag.

8. The method of claim 7, wherein:
the motion data includes an X axis acceleration value, a Y axis acceleration value, and a Z axis acceleration value; and
the method further includes, by the processing circuitry:
determining an acceleration magnitude value based on one or more of the X axis acceleration value, the Y axis acceleration value, and the Z axis acceleration value; and
determining the blink rate based on the acceleration magnitude value.

9. The method of claim 6, wherein the blink data includes at least one of a blink rate status change indication or an orientation status change indication.

10. The method of claim 6, wherein comparing the motion data with the motion signatures includes:
determining a live motion signature based on the motion data received from the at least one motion sensor;
comparing the live motion signature with the motion signatures, wherein the motion signatures each includes one or more motion data threshold values and associated duration values; and
in response to identifying a match between the live motion signature and a first motion signature, determining the event data based at least in part on the first motion signature.

11. A system for determining event data, comprising:
a plurality of RF tags; and
an apparatus including processing circuitry configured to:
correlate at least one RF tag of the plurality of RF tags to a participant;
correlate at least one motion sensor of the at least one RF tag to the participant;
receive blink data transmitted by the at least one RF tag;
determine tag location data based on the blink data;
receive motion data originating from the at least one motion sensor; and
determine the event data based on the comparing the tag location data with kinetic models and the motion data with motion signatures.

12. The system of claim 11, wherein the processing circuitry is further configured to:
determine a blink rate for an ultra-wideband (UWB) transmitter of the at least one RF tag based on the event data; and
provide blink rate control data defining the blink rate to the at least one RF tag.

13. The system of claim 12, wherein:
the motion data includes an X axis acceleration value, a Y axis acceleration value, and a Z axis acceleration value; and
the processing circuitry is further configured to:
determine an acceleration magnitude value based on one or more of the X axis acceleration value, the Y axis acceleration value, and the Z axis acceleration value; and
determine the blink rate based on the acceleration magnitude value.

14. The system of claim 11, wherein the blink data includes at least one of a blink rate status change indication and an orientation status change indication.

15. The system of claim 11, wherein the processing circuitry configured to compare the motion data with the motion signatures includes the processing circuitry being configured to:
- determine a live motion signature based on the motion data received from the at least one motion sensor;
- compare the live motion signature with the motion signatures, wherein the motion signatures each includes one or more motion data threshold values and associated duration values; and
- in response to identifying a match between the live motion signature and a first motion signature, determine the event data based at least in part on the first motion signature.

16. The system of claim 11, wherein the at least one RF tag includes:
- the at least one motion sensor;
- an ultra-wideband (UWB) transmitter configured to transmit the blink data at variable blink rates; and
- tag processing circuitry configured to:
- receive the motion data from the at least one motion sensor;
- determine a blink rate for the UWB transmitter based on the motion data values; and
- control the UWB transmitter to wirelessly transmit the blink data at the blink rate.

17. The system of claim 16, wherein the at least one motion sensor includes an accelerometer configured to generate the motion data.

18. The system of claim 16, wherein the UWB transmitter is configured to wirelessly transmit the blink data via a tag signal having a bandwidth of greater than at least one of 500 MHz and 20% of a center frequency of the tag signal.

19. The system of claim 16, wherein the at least on RF tag further includes a receiver configured to receive blink rate control data from the apparatus; and
- the tag processing circuitry is further configured to determine the blink rate for the UWB transmitter based on the blink rate control data.

20. The system of claim 16, wherein the tag processing circuitry is further configured to:
- determine a live motion signature based on the motion data;
- compare the live motion signature with one or more motion signatures, wherein the one or more motion signatures each includes one or more motion data threshold values and associated duration values; and
- in response to identifying a match between the live motion signature a first motion signature, control the UWB transmitter to wirelessly transmit the blink data at the blink rate.

* * * * *

UNITED STATES PATENT AND TRADEMARK OFFICE
CERTIFICATE OF CORRECTION

PATENT NO. : 9,953,196 B2  
APPLICATION NO. : 15/397504  
DATED : April 24, 2018  
INVENTOR(S) : Belinda Turner et al.

It is certified that error appears in the above-identified patent and that said Letters Patent is hereby corrected as shown below:

In the Claims

In Claim 19, at Column 52, Line 8 replace "The system of claim 16, wherein the at least on RF tag" with --The system of claim 16, wherein the at least one RF tag--

Signed and Sealed this
Fourth Day of September, 2018

Andrei Iancu
*Director of the United States Patent and Trademark Office*